(12) United States Patent
Samavati et al.

(10) Patent No.: US 10,176,629 B2
(45) Date of Patent: Jan. 8, 2019

(54) DIGITAL EARTH SYSTEM FEATURING INTEGER-BASED CONNECTIVITY MAPPING OF APERTURE-3 HEXAGONAL CELLS

(71) Applicant: the PYXIS innovation inc., Kingston (CA)

(72) Inventors: Faramarz Famil Samavati, Calgary (CA); Ali Mahdavi-Amiri, Calgary (CA)

(73) Assignee: Global Grid Systems Inc., Calgary (CA)

( * ) Notice: Subject to any disclaimer, the term of this patent is extended or adjusted under 35 U.S.C. 154(b) by 256 days.

(21) Appl. No.: 14/207,932

(22) Filed: Mar. 13, 2014

(65) Prior Publication Data

US 2014/0267261 A1    Sep. 18, 2014

Related U.S. Application Data

(60) Provisional application No. 61/791,630, filed on Mar. 15, 2013.

(51) Int. Cl.
*G06K 9/00* (2006.01)
*G06T 17/20* (2006.01)
*G06T 17/05* (2011.01)

(52) U.S. Cl.
CPC .............. *G06T 17/20* (2013.01); *G06T 17/05* (2013.01)

(58) Field of Classification Search
CPC .... G06T 17/20; G06T 17/05; G06F 17/30241
See application file for complete search history.

(56) References Cited

U.S. PATENT DOCUMENTS 6,359,629 B1 *  3/2002  Hopcroft ................. G06T 15/40
                                                                  345/423
7,340,001 B2 *  3/2008  Smith .................. H04B 14/004
                                                                  342/361

(Continued)

FOREIGN PATENT DOCUMENTS

WO    WO2005013200    2/2005
WO    WO2011053728    5/2011

OTHER PUBLICATIONS

Vince A., 2006. Indexing the Aperture 3 Hexagonal Discrete Global Grid. J. Vis. Comun. Image Represent., 17 (6), 1227{1236.

(Continued)

*Primary Examiner* — Aaron W Carter
(74) *Attorney, Agent, or Firm* — Bereskin & Parr LLP

(57) ABSTRACT

A digital Earth system based upon a hexagonal subdivision of a polyhedron representation of the Earth utilizes a computer-implemented method for assigning identifiers. The method comprises defining a tessellation of hexagonal cells, the tessellation having a first axis and a second axis, the first axis being perpendicular to a first side of the hexagonal cells, the second axis being 120 degrees from the first axis and being perpendicular to a second side of the hexagonal cells; selecting an origin cell for the tessellation and assigning a unique identifier comprising a first value and a second value thereto; and assigning a unique identifier to each cell other than the origin cell, the unique identifier for each of these cells comprising a first vector value and a second value, the first vector value and the second vector value being indicative of the location of the cell to the origin cell along the first and second axis respectively.

2 Claims, 38 Drawing Sheets

(56) References Cited

U.S. PATENT DOCUMENTS

| | | | |
|---|---|---|---|
| 2005/0193365 A1 | 9/2005 | Sahr | |
| 2006/0265197 A1* | 11/2006 | Peterson | G06F 17/30241 703/2 |
| 2008/0258915 A1* | 10/2008 | Vennelakanti | G06Q 10/06 340/568.1 |
| 2009/0195358 A1* | 8/2009 | Vennelakanti | G06K 7/0008 340/10.1 |
| 2012/0206494 A1* | 8/2012 | Sahr | G06F 17/30333 345/660 |
| 2014/0267261 A1* | 9/2014 | Samavati | G06T 17/20 345/423 |

OTHER PUBLICATIONS

Vince, A. and Zheng, X., 2009. Arithmetic and Fourier transform for the PYXIS multi-resolution digital Earth model. Int. J. Digital Earth, 2 (1), 59{79.

Burt, P.J., 1980. Tree and Pyramid Structures for Coding Hexagonally Sampled Binary Images. Computer Graphics and Image Processing, 14, 271-280.

Middleton, L. and Sivaswamy, J., 2005. Hexagonal Image Processing: A Practical Approach (Advances in Pattern Recognition). Cover page and Chapter 3, The Proposed HIP Framework, pp. 27-69, Secaucus, NJ, USA: Springer-Verlag New York, Inc.

Lazardis, Progressive Approximate Aggregate Queries with a Multi-Resolution Tree Structure, SIGMOD 01 Proceedings of the 2001 ACM SIGMOD international conference on Management of Data, May 21-24, pp. 401-412, ACM, New York, NY, USA.

Garofalakis, M. N., and Gibbon, P. B. Approximate query processing: Taming the terabytes. In Proceedings of the 27th International Conference on Very Large Data Bases (VLDB) (2001).

Ben Jin, Tong Xiaochong, Chen Rongugguo, A Spatial Indexing Method for the Hexagon Discrete Global Grid System, Geoinformatics, 2010 18th International Conference, Jun. 18-20, 2010.

Sahr, Kevin, Location coding on icosahedral aperture 3 hexagon discrete global grids, Computers, Environment and Urban Systems, vol. 32, Issue 3, May 2008, pp. 174-187.

* cited by examiner

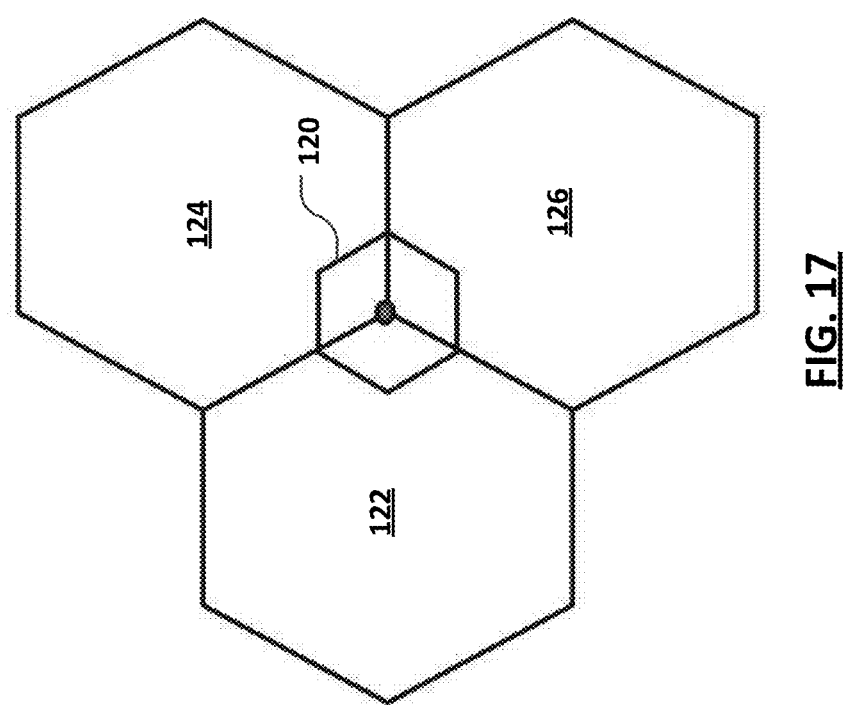

DIGITAL EARTH SYSTEM FEATURING INTEGER-BASED CONNECTIVITY MAPPING OF APERTURE-3 HEXAGONAL CELLS

RELATED APPLICATIONS

This application claims the benefit of U.S. Provisional Patent Application Ser. No. 61/791,630 filed on Mar. 15, 2013, and entitled "DIGITAL EARTH SYSTEM FEATURING INTEGER-BASED CONNECTIVITY MAPPING OF APERTURE-3 HEXAGONAL CELLS", the entire contents of which are hereby incorporated by reference herein for all purposes.

TECHNICAL FIELD

The embodiments described herein relate to systems and methods for storing geospatial data related to various geographical locations, and in particular to systems and methods for providing a discrete global grid system (DGGS) for storing the data.

INTRODUCTION

The Digital Earth framework refers to a framework for storing geospatial data. Geospatial data may include information that is associated with various geographical locations around the Earth. The Digital Earth allows users to access information associated with various locations around the Earth by manipulating a virtual representation of the Earth and zooming in and out of the virtual Earth to obtain a desired level of information.

To facilitate a Digital Earth framework, a virtual representation of the Earth may be partitioned into a number of discrete cells, each cell representing an area (for e.g. a location) on Earth. The data associated with the locations inside the cell is then associated with the cell representing that location. In other words, the cells are representative of an area containing points of interest.

There currently exist several methods in which the Earth may be partitioned into a number of discrete cells at different resolutions based on a polyhedral representation of the Earth. There are also different ways to divide up the faces of the polyhedral to form a plurality of cells associated with various locations on the Earth. As the data associated with the location is stored in association with the cells, it is desirable to identify the cells to facilitate subsequent retrieval of the cells and the data associated therewith. Efficient retrieval of the cells may help speed up essential operations such as neighbourhood finding, zooming in and/or zooming out.

Accordingly, there is a need for a Digital Earth framework that supports efficient retrieval of information associated with discrete cells of different resolutions.

BRIEF DESCRIPTION OF THE DRAWINGS

Some embodiments will now be described, by way of example only, with reference to the following drawings, in which:

FIG. 17 is a schematic diagram illustrating an exemplary case where cell that is located at a vertex of a plurality of cells that may have to be addressed by the server in FIG. 8;

DESCRIPTION OF SOME EMBODIMENTS

Figure 2:
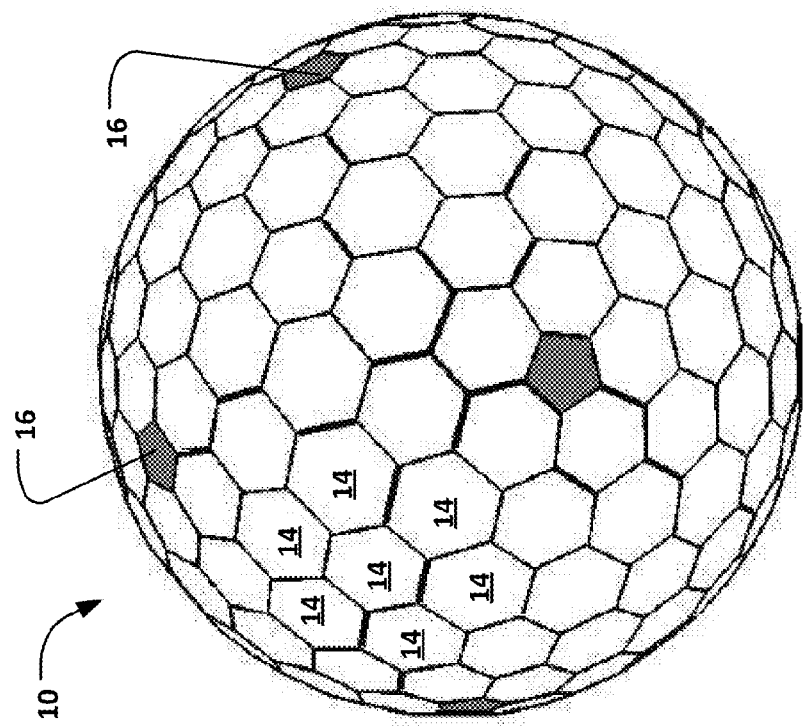
FIG. 2 is a schematic diagram illustrating partitioning of the faces of the truncated icosahedron shown in FIG. 1 into a tessellation of cells in a first resolution.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described, but rather as merely describing the implementation of various embodiments.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Geospatial from various geographical locations is collected and associated with virtual locations on the virtual representation of the Earth to create a Digital Earth. Geospatial data may be collected from various sources such as field surveys, remote sensing, and so on. The geospatial data associated various locations may then be assigned to cells in the virtual representation of the Earth that corresponds to appropriate locations associated with the geospatial data. This type of system for storing geospatial data may be referred to as a Discrete Global Grid System (DGGS).

Integrating and managing a large amount of geospatial data presents a number of challenges to various industries that are involved in creating a Digital Earth frame work (e.g. geoprocessing, cartography, and/or computer science industries). Some of the challenges are outlined herein below.

Selecting a Base Polyhedron

To assign various geospatial data from various locations on the Earth to a virtual Earth, it is first necessary to obtain a suitable virtual representation of Earth. Different types of polyhedral, such as the icosahedron, dodecahedron, octahedron, and cube, may be used to approximate the shape of the Earth. However, projecting a polyhedron onto a sphere-shaped object such as the Earth may result areal or angular distortion which may result in cells of the polyhedron representing different sizes in areas on the Earth. As such, it is desirable to select a polyhedron that has reduced angular distortion such that each cell of the polyhedron is generally associated with the same amount of area on Earth as other cells. That is, it is not desirable to have two cells in the same resolution, which are the same size, but represent differently sized areas on the Earth.

Figure 1:
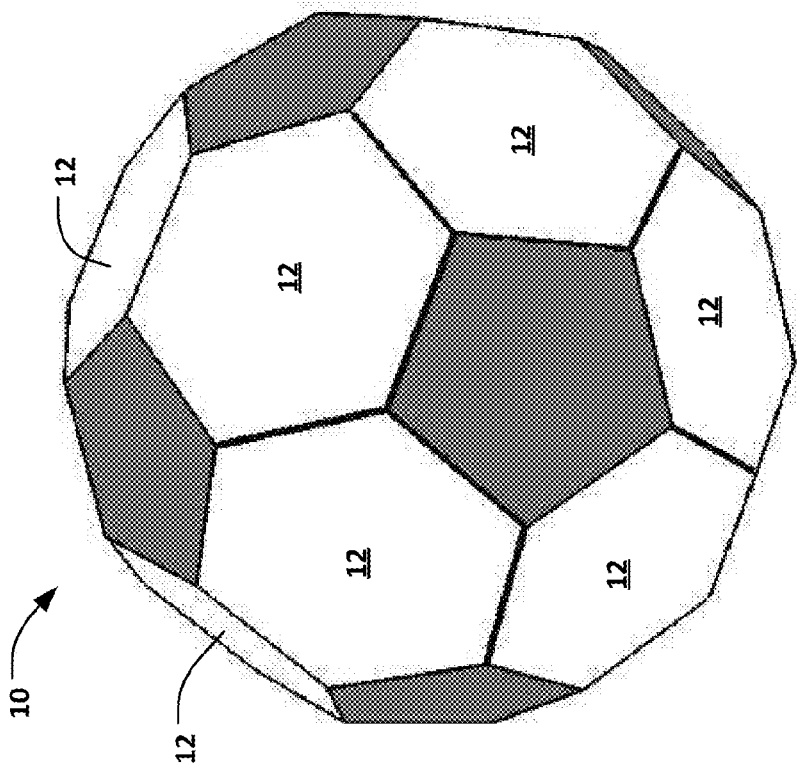
FIG. 1 is a schematic diagram illustrating a truncated icosahedron which may serve as a base polyhedron to obtain a virtual representation of the Earth according to some embodiments.

A good polyhedron that can be used to approximate the Earth, as determined based on the Snyder's equal area map projection, is the truncated icosahedron with angular deformation of less than 3.75° and icosahedron with less than 17.27°. The truncated icosahedron appears to be a more suitable option in comparison to other polyhedrons such as the cube, dodecahedron and icosahedron. An exemplary truncated icosahedron 10 is shown in FIG. 1.

Partitioning the Base Polyhedron

In addition to selecting a base polyhedron (e.g. the truncated icosahedron) to provide a base shape for the virtual Earth, it is also necessary to partition the surfaces of the polyhedral to form a number of cells representing various locations on Earth. That is, partitioning the virtual Earth to obtain a number of cells at various resolutions allow more accurate discretization, and provision different levels of details.

The virtual Earth may be partitioned in a number of ways. One way to do so is to partition the Earth along the latitude and longitude lines. Another way to partition the surface of the virtual Earth is to apply Voronoi cell partitioning. However, these types of partitioning of the virtual Earth produce cells that are of irregular size and/or shape. For example, latitudes at different distances from the equator will result in different distances. That is, the latitudes near the poles are shorter in terms of distance when compared to the latitudes near the equator. In other words, the distance between longitudes varies depending on their location on Earth. Similarly, Voronoi cell partitioning yield irregular sized and shaped cells.

Another way to partition the virtual Earth is to subdivide the faces of the truncated icosahedron approximation of the Earth. The truncated icosahedron's faces can be subdivided into, for example, hexagonal, triangular or quadrilateral shaped cells. Depending on the shape of the cells that the faces are subdivided into, the cells may be regularly shaped and/or have consistent neighbourhood definitions. Neighbourhood definition refers to the arrangement of neighbouring cells relative to a given cell. For instance, although the quadrilateral cells obtained from subdividing the cube have the regular shapes, they have inconsistent neighbourhood conditions at the corners. Moreover, quadrilateral cells have non-uniform adjacency definitions as each cell may have four or eight neighbouring cells.

Generally, it is desirable that cells have regular shapes as well as a consistent neighbourhood definition. Such characteristics are useful in a Digital Earth system. That is, regularity in cell shape simplifies the execution of one or more frequently used operations (e.g. neighbourhood finding) in the Digital Earth system such that they may be completed faster. Furthermore, regularity of cells also helps to create hierarchical representations that are necessary for applications that need to show the information in different levels of details.

Figure 4:
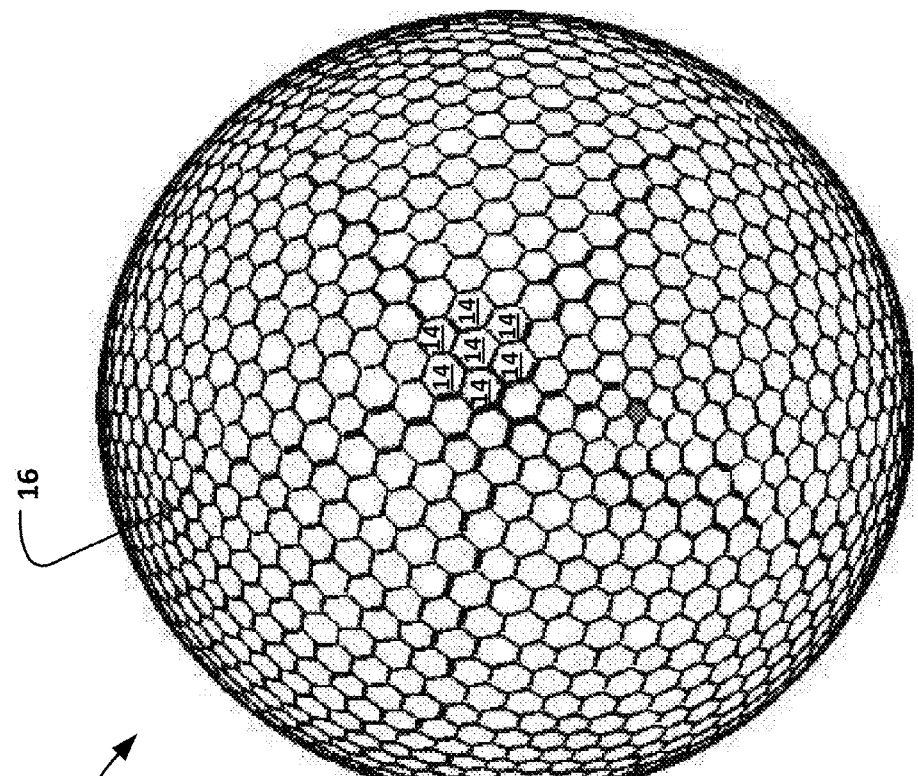
FIG. 4 is a schematic diagram illustrating partitioning of the faces of the truncated icosahedron shown in FIG. 2 into a tessellation of cells in a third resolution that is finer than the second resolution.
Figure 3:
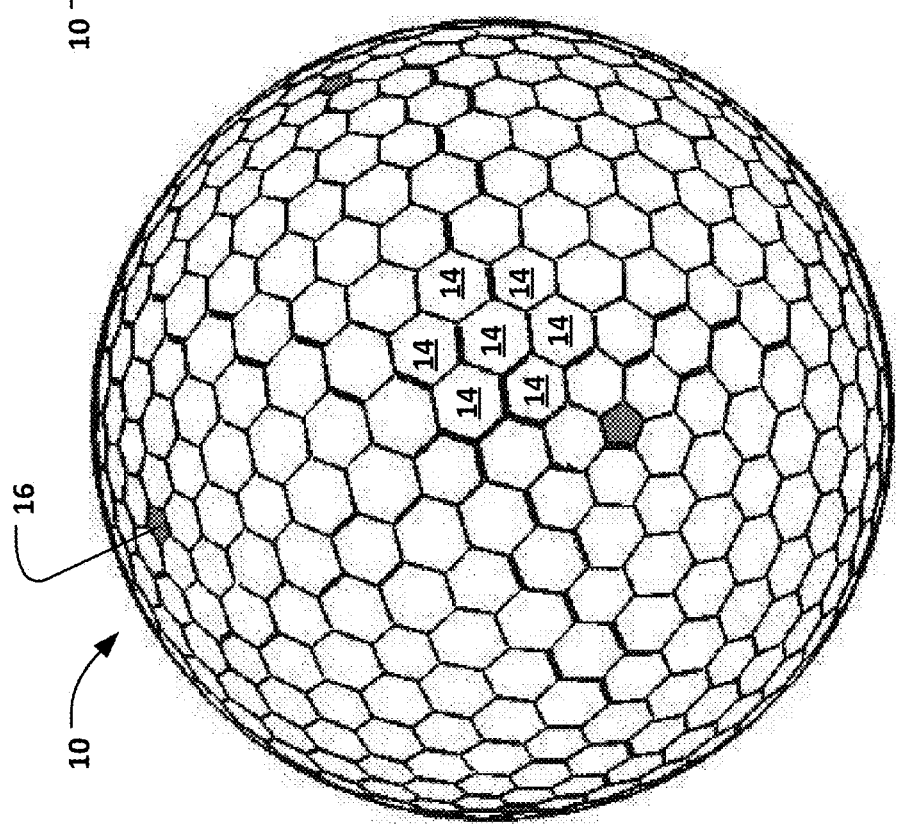
FIG. 3 is a schematic diagram illustrating partitioning of the faces of the truncated icosahedron shown in FIG. 2 into a tessellation of cells in a second resolution that is finer than the first resolution.

In comparison to the quadrilateral cells, the hexagonal cells have characteristics such as uniform adjacency and straightforward neighbourhood definitions. Hexagons shaped cells also appear frequently in nature. For example, hexagonal shape elements appear in honeycomb structures and in human's retina cells. Since the truncated icosahedron's faces are mostly comprised of hexagons (e.g. see hexagons 12 of truncated icosahedron 10) as shown in FIG. 2, the truncated icosahedron's faces could be divided into finer resolution hexagonal cells (e.g. cells 14) as shown in FIG. 2. However, the resulting cells 14 of subdividing the truncated icosahedron's faces are not completely regular due to the appearance of pentagonal cells 16. Nevertheless, the hexagonal subdivision appears to be more desirable over other alternatives as alternative shapes for subdividing cells also provide irregular representations, and in many cases, higher distortions. FIGS. 3 and 4 show resulting tessellation of cells in successive resolutions of the truncated icosahedron 10 shown in FIG. 2.

Refinement Between Resolutions

There are several methods that can be employed to refine the faces of a polyhedron. In other words, the faces of the hexagon could be divided into cells of various sizes depending on the desired resolution. In a relatively high (fine) resolution, each cell has a relatively smaller size and thus a larger number of cells are required to cover a given location on Earth. In contrast, in a relatively low (coarse) resolution, each cell has a relatively larger size and thus a smaller number of cells are required to cover the same location.

For hexagonal cells, the size of the cells in adjacent resolutions tessellations could be of 1-to-3 refinement (i.e. "aperture 3") or of a 1-to-4 refinement (i.e. "aperture 4"). That is, each cell in a coarse resolution has an area that is three times the size of the each cell in the successive finer resolution. Between the aperture 3 and aperture 4 configurations, the aperture 3 configuration has a slower area shrinkage rate. That is, the difference in area between cells of successive resolution is three times in the aperture 3 configuration while it is four times in an aperture 4 configuration. Having a lesser amount of area change between successive resolutions may provide a smoother transition between the resolutions in a Digital Earth system. As such, the aperture 3 configuration (i.e. the 1-to-3 refinement) tends to provide more visually appealing transitions between successive resolutions. Having a lesser amount of area change may also provide more accurate data representations. FIGS. 1 to 4 show the truncated icosahedron 10 whose vertices are located on a sphere with the same radius at four successive resolutions of the aperture 3 refinement.

Assigning Identifiers to Cells

After partitioning the surface of the truncated icosahedron to form a number of cells, it is necessary for the cells to be assigned identifiers such that it is possible to uniquely identify each cell. As the number of cells could be in tens or hundreds of thousands, it is desirable to have an identification system where cells could be located efficiently.

One approach is to apply the Quadtrees data structure to identify the cells at various resolutions. However, the Quadtrees data structure is a pointer-based data structure and this type of data structure (i.e. pointer-based data structures) may not be efficient as it is necessary to store node connectivity links between different resolutions. In order to overcome this inefficiency, pointer-less or indexing methods such as Morton indexing may be employed. Unfortunately, these indexing methods are not directly applicable for hexagonal cells due to the incongruent nature of the hexagonal shaped cells.

Figure 6:
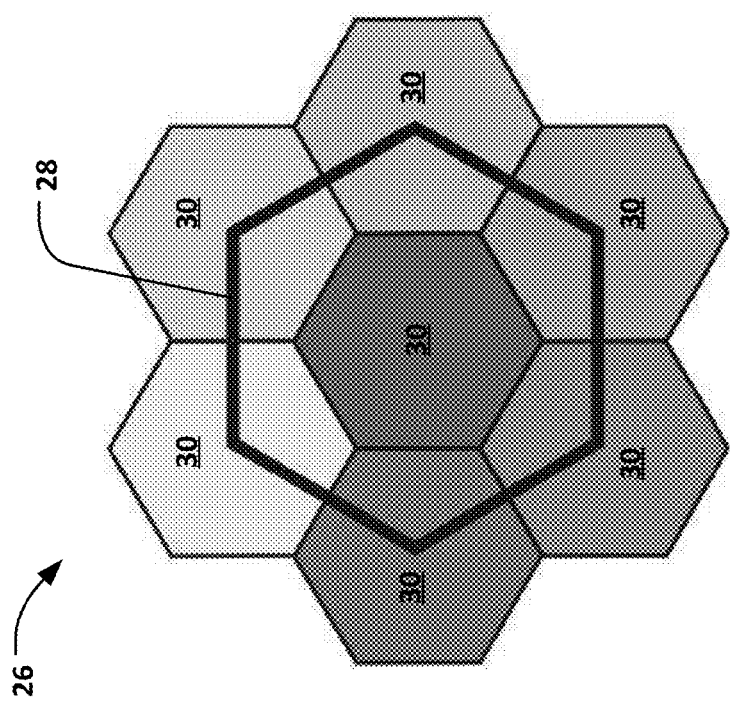
FIG. 6 is a schematic diagram illustrating incongruence of aperture three hexagonal cell partitioning that may be applied to the icosahedron shown in FIG. 1.
Figure 5:
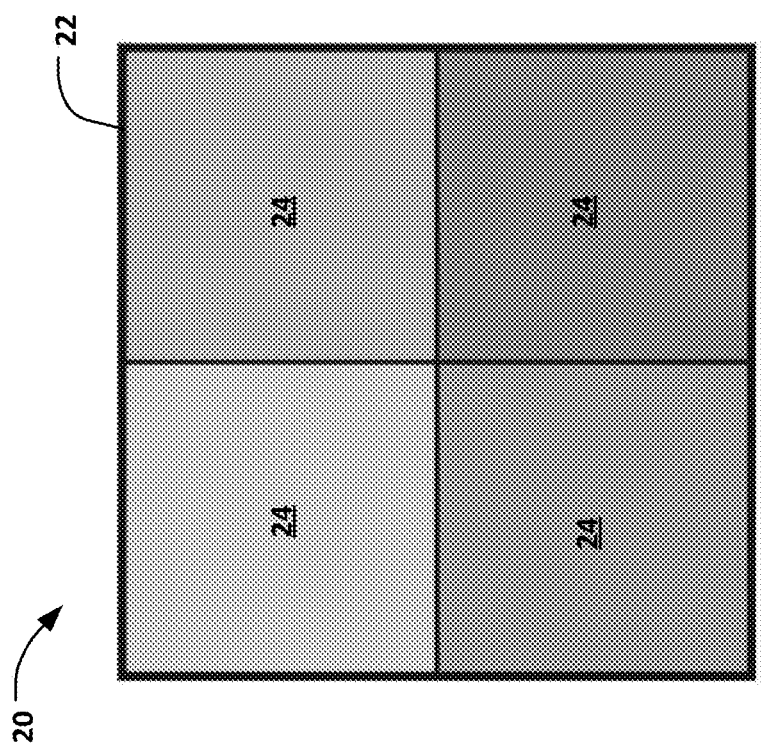
FIG. 5 is a schematic diagram illustrating congruency of quad cell partitioning.

A cell structure could be said to be congruent if and only if an area of each cell in a given coarse resolution exactly covers the combined area of a number of cells in the adjacent finer resolution. For example, the quad cell partition 20 shown in FIG. 5 is congruent because the coarse resolution cell 22 exactly covers the area of four cells 24 in the finer resolution. In contrast to the quad cell partition 20, the hexagonal cell partitions are not congruent. For example, the hexagonal cell partition 26, as shown in FIG. 6 is not congruent because the coarse resolution cell 28 does not exactly cover the finer resolution cells 30.

While the Quadtree based indexing can be applied to hierarchical hexagonal cells with slight modifications, it is not efficient in neighbourhood finding operations as there may not be any relationship between the identifier of a given cell and identifiers of neighbouring cells.

In addition to the Quadtrees based indexing, the cell identifiers for hexagonal shaped cells may be organized in other ways. For example, it is possible to index the aperture 3 hexagonal cells based on barycentric coordinates, using three components (a, b, c) to represent the barycentric coordinates of the cells. However, such indexing is designed for the octahedron and does not directly support the truncated icosahedron base polyhedron. Moreover, there may be isolated triangular or quadrilateral cells on which the same rules for hierarchical traversal or neighbourhood finding cannot be applied.

PYXIS Indexing

Figure 7:
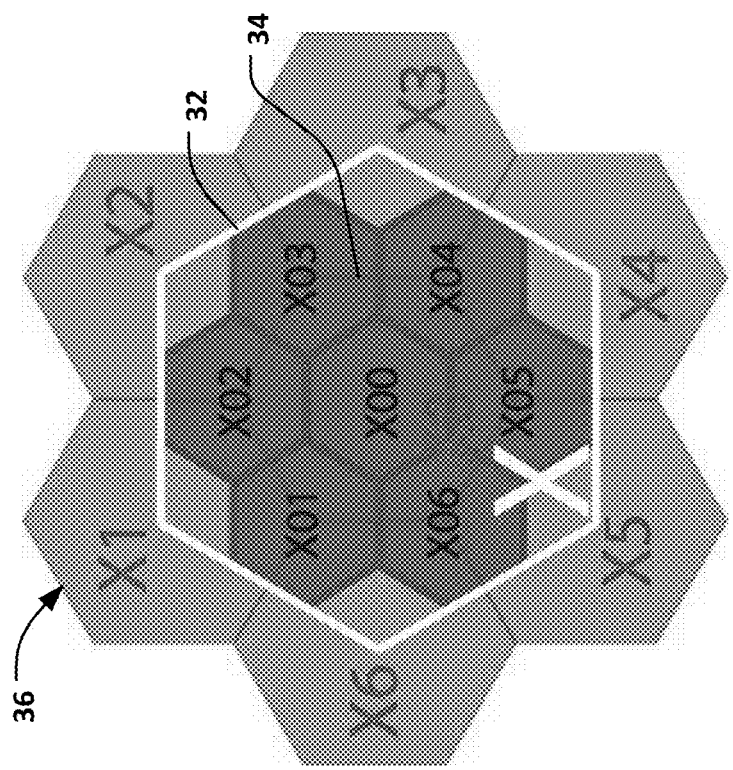
FIG. 7 is a schematic diagram illustrating identifiers assigned to various resolutions of aperture 3 hexagonal cells according to PYXIS indexing that may be applied to the truncated icosahedron shown in FIG. 1.

In another example, as described in U.S. Pat. No. 8,018,458 to Perry Peterson, identifiers may be assigned to various cells based on the parent-children relationship between cells ("PYXIS Indexing"). That is, identifier of parent cells in a coarse resolution are incorporated into the identifier child cells in a finer resolution. This, for example, could mean that the prefix of every fine resolution cell is the index of its parent. Referring to FIG. 7, illustrated therein are three resolutions of cells indexed according to PYXIS Indexing. As shown, cell 32 is in the most coarse resolution tessellation, and therefore has the largest cell size. The cell 32 is assigned the identifying value X. The cell 32 has one centroid child cell 34 and six vertex children. The centroid cell 34 has been assigned the index "X0" by appending the identifier "0" to the identifier of the parent cell "X". Similarly, the vertex children are assigned identifiers "X1" to "X6" by appending identifiers "1" to "6" to the index "X" of the parent cell 32. The cells 36 are the children cells of the parent cell "X0" and they have been assigned identifiers "X01" to "X06" by appending the identifiers "1" to "6" to the identifier "X0" of the parent cell 34. This way of assigning identifiers that includes the identifiers of parents may be referred to as "hierarchical indexing".

Hierarchical indexing such as the PYXIS Indexing is very effective at supporting the hierarchical traversal. Such a traversal involves finding a parent cell's index given a child cell's index and vice versa. However, they may not be as efficient at finding the neighbours of a given cell since neighbouring cells may have indices that are not related to each other. As determining neighbouring cells is an important operation in a Digital Earth system, it is desirable to provide a hexagonal indexing that is capable to supporting efficient neighbourhood finding operations in addition to efficient hierarchical traversal. Furthermore, it is desirable that the indexing supports conversion between hexagonal indices and traditional Cartesian coordinates since the Cartesian coordinates may be useful for some operations and applications such as projection and visualization.

In addition to hierarchical traversal and determination of neighbouring cells, determining whether a cell is "covered" by another cell at a coarser resolution is another operation that may be used in the Digital Earth system. As the fractal shapes of coarse cells differs between different resolutions using the PYXIS indexing method, the area covered by the coarse cell also differs between resolutions. Therefore, a specific point on the truncated icosahedron may be indexed by different coarse cells at different resolutions. This property may cause difficulties in finding a cell that spatially covers a point with a specific Cartesian coordinate. Indeed, this property makes the processes of conversion between the PYXIS index and a Cartesian coordinate system generally inefficient.

For example, consider indices of fine cells partially or completely covered by a coarse cell are needed. The area indexed by a coarse cell is a fractal-like shape (snowflake) with a complicated boundary. Therefore, it is difficult to determine whether a fine hexagon which is spatially covered by a type "A" hexagon has been indexed by the same cell or it has been indexed by a type "B" hexagon cell. The types "A" and "B" for hexagons cells refer to whether the cell is located at the centroid or at a vertex of its parent cell. If the cell is located at the centroid of its parent cell, it is a type "A" cell and it will have 7 children in the next resolution. Alternatively, if the cell is located at one of the vertices of its parent cell, the cell is a type "B" cell and it will only have one child in the next resolution. In other words, cells with seven children are type "A" cells and cells with only one child are type "B" cells.

Digital Earth System

Figure 8:
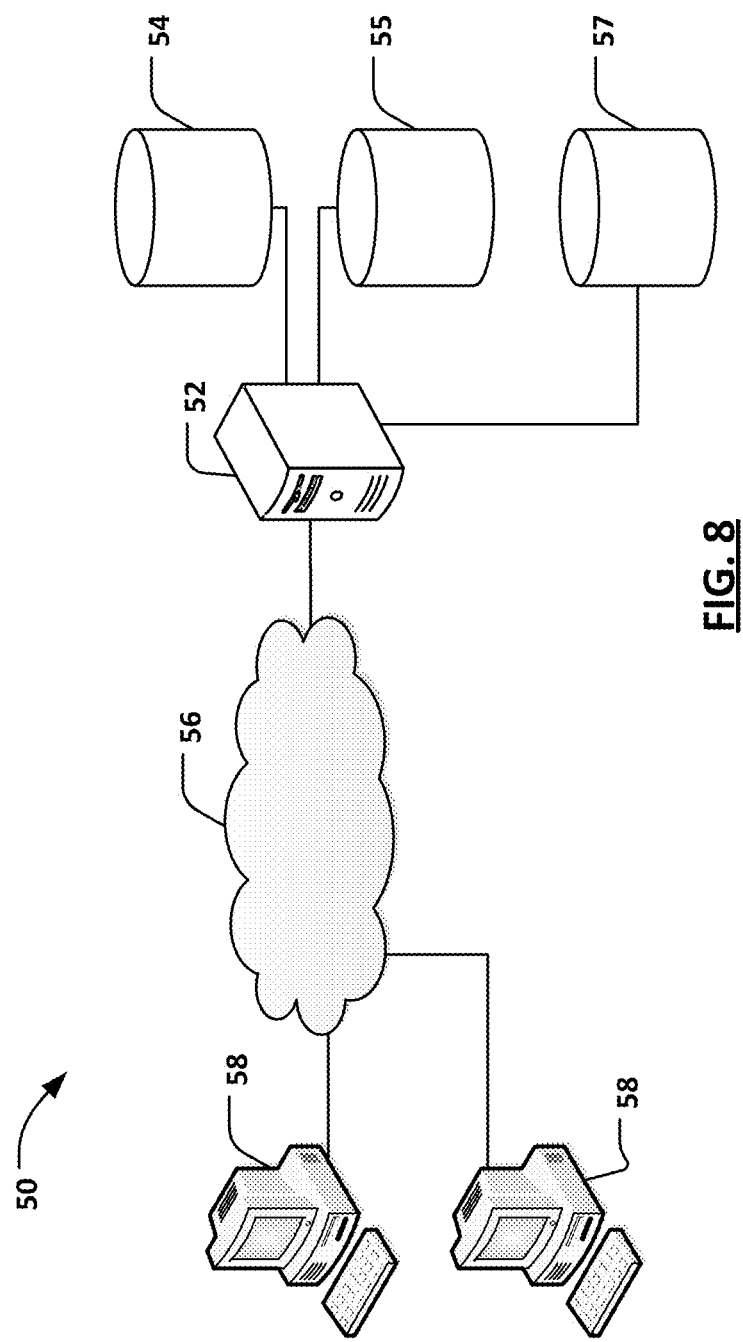
FIG. 8 is a schematic diagram illustrating a system for providing geospatial data based upon integer-based indexing of aperture-3 hexagonal cells in tessellations of various resolutions according to some embodiments.

Referring now to FIG. 8, illustrated therein is a Digital Earth system 50 featuring integer-based indexing for hexagonal grids. The system 50 comprises a server 52 and a data storage devices 54, 55 and 57 coupled to the server 52. The server 52 is in data communication with a network 56 which may be the Internet. Electronic devices 58 may access the geospatial data stored on the databases 54 and 55 through the network 56 and the server 52.

The server 52 includes at least one processor that is configured to provide a Digital Earth system. The processor may be configured to provide cells in the database 54 and/or 55.

In some embodiments, the database 54 may store geospatial data by associating the geospatial data with cells that represent locations of Earth. The cells may be obtained by partitioning a polyhedron representation of the Earth such as by partitioning a truncated icosahedron representation of the Earth into aperture-3 hexagons as described above. The cells in the database 54 are assigned integer-based identifiers, which may sometimes be referred to as "integer-based index", as described herein below.

In some embodiments, the database 55 may also store geospatial data by associating the geospatial data with cells that represents locations of Earth. Similar to the database 54, the cells may be obtained by partitioning a truncated icosahedron into aperture 3 hexagons. However, the cells in the database 55 are assigned PYXIS identifiers (i.e. PYXIS indexing).

In some embodiments, the database 57 may also store geospatial data by associating the geospatial data with a Cartesian coordinate system.

In some embodiments, the server 52 may be configured to receive queries from one or more electronic devices 58. The server 52 may also be configured to convert between various indexing systems to process the queries in one or more of the databases 54, 55, 57. In some cases, the processor may be configured to combine the results from two or more of the databases 54, 55, and 57 to respond to queries received.

In some embodiments, the server 52 may be configured to define a hierarchical series of tessellations of uniform hexagonal cells. Each tessellation of cells has a resolution that is indicative of area of each cell in the tessellation. Generally, a higher resolution represents finer cells and a lower resolution represents coarser cells. That is, each of the finer cells would have less area than each of the coarser cells. Accordingly, tessellations with finer (higher) resolution cells will contain more cells than tessellation with coarser (lower) resolution cells.

Each of the cells in each tessellation of each resolution is assigned a unique identifier (i.e. "indexed") such that data associated with each cell may be subsequently retrieved using the unique identifier. In some embodiments, the identifiers assigned to the cells may be integer-based identifiers as described with reference to FIGS. 10A-10D herein below. In some cases, the processor 56 may be configured to assign the integer-based identifiers.

Figure 9B:
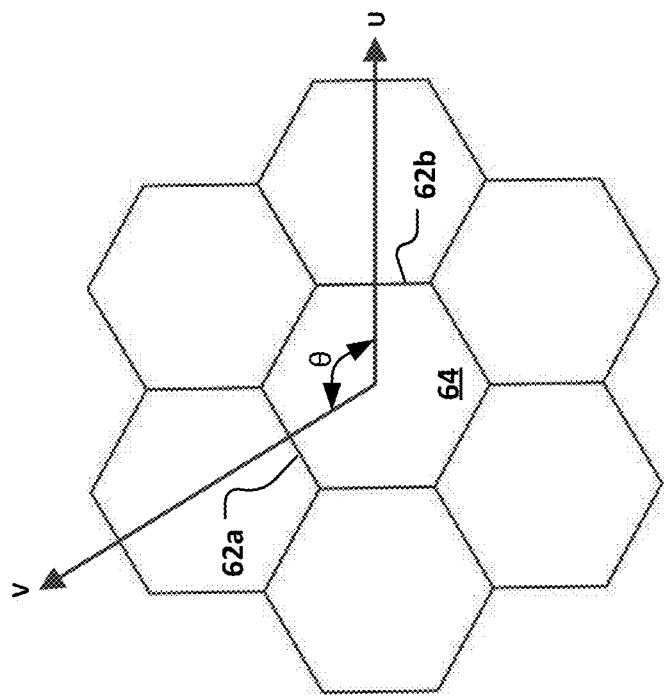
FIG. 9B is a schematic diagram illustrating orientation of the axes of the uniform hexagonal cells in a tessellation in an odd resolution referenced by the server in FIG. 8.
Figure 9A:
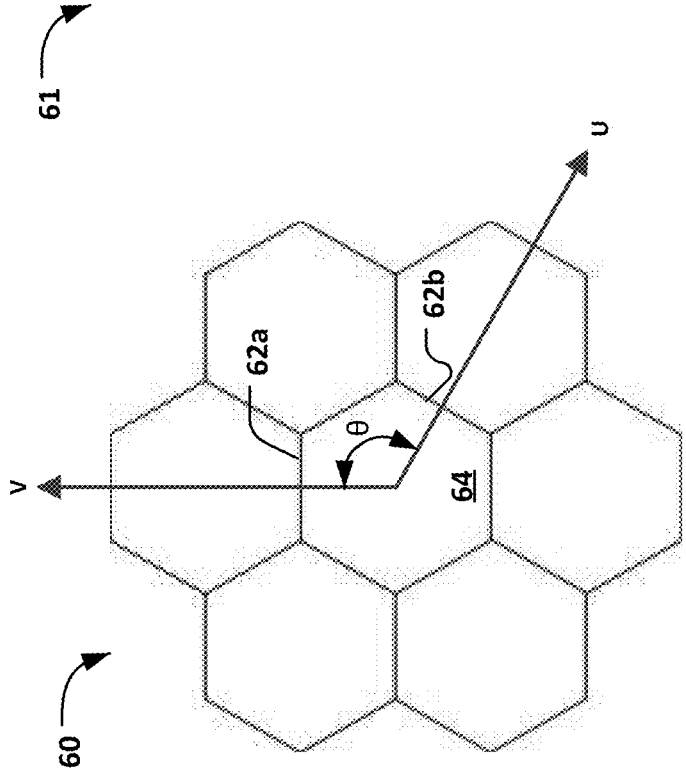
FIG. 9A is a schematic diagram illustrating orientation of the axes of the hexagonal cells in a tessellation in an even resolution referenced by the server in FIG. 8.

Referring now to FIGS. 9A and 9B, illustrated therein are two tessellations 60 and 61 of hexagonal cells. Each of the tessellations 60 and 61 has two axes: "u" and "v". The axes u and v run perpendicular to two of the sides 62a and 62b of a hexagonal cell 64 and are separated by an angle θ, which is 120 degrees. In contrast, in the Cartesian coordinate system, two main axes are at 90 degrees to one another. Having the axes at 120 degrees allow the position of the hexagons to be defined in step vectors along the "u" and "v" axes as described below with reference to FIGS. 10A and 10B.

The aperture 3 refinement between tessellations of adjacent resolutions yields tessellations of cells that have two alternating orientations. The first orientation of the cells and the second orientation of the cells differ by 30 degrees and the axes u and v between the two orientations is rotated by the same amount (30 degrees).

Each tessellation of cells will be oriented in one of the two ways described above in an alternating arrangement. For example, if a tessellation in an initial resolution "r" is oriented in the manner shown in FIG. 9A, then the tessellation in the next resolution "r+1" will be oriented in the other manner as shown in FIG. 9B. In other words, tessellations that are of odd resolutions will have one of the two orientations while the tessellations that are of even resolutions will have the other of the two orientations. For purposes of the description, the orientation shown in FIG. 9A is said to be for even resolutions while the orientation shown in FIG. 9B is for odd resolutions.

Figure 10B:
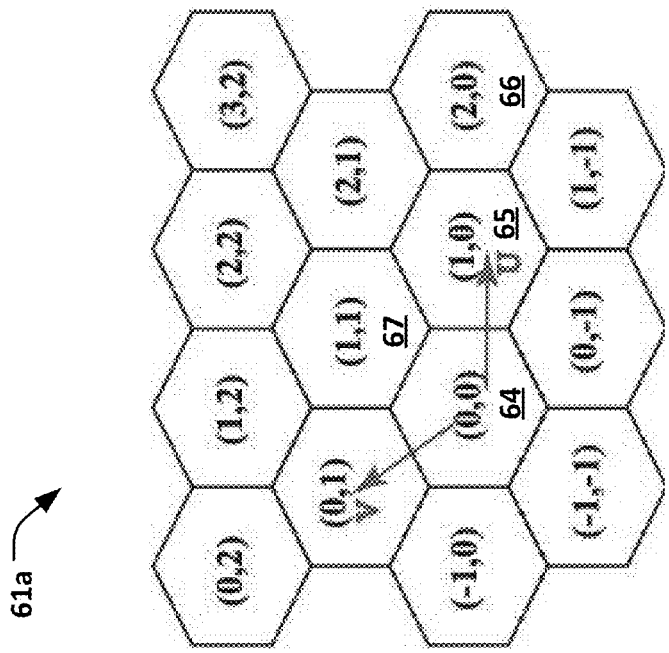
FIG. 10B is a schematic diagram illustrating integer-based identifiers including step vectors along u and v axes as shown in FIG. 9B.
Figure 10A:
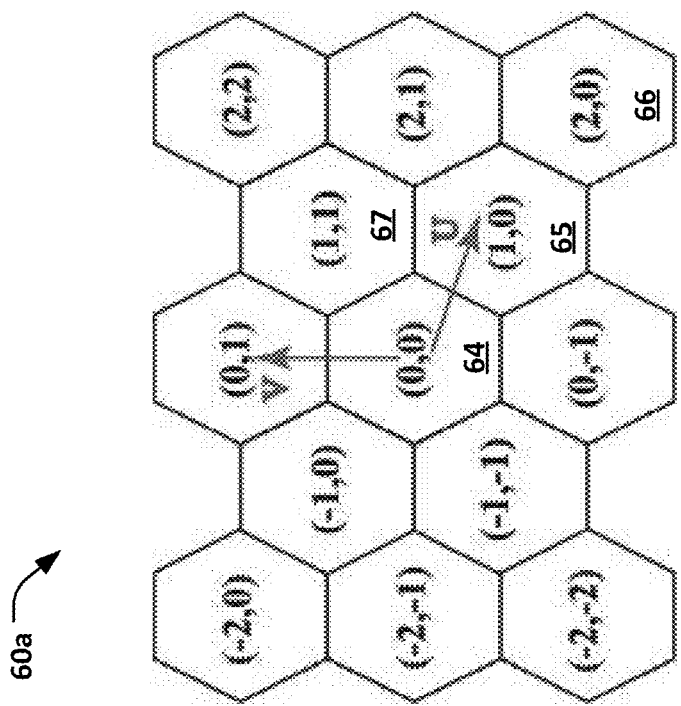
FIG. 10A is a schematic diagram illustrating integer-based identifiers including step vectors along u and v axes as shown in FIG. 9A.

Referring now to FIGS. 10A and 10B, illustrated therein are tessellations 60a and 60b that are expanded versions of the tessellations 60a and 60b respectively. Each of the cells in the tessellations 60a and 60b has been assigned an identifying value comprising a first vector value and a second vector value in the format (u, v), where "u" is the first vector value and "v" is the second vector value.

The values for u and v are described in steps vectors. A step vector in the "u" direction indicates a discrete distance $L_u$ along the u axis. A step vector in the "v" direction indicates a discrete distance $L_v$ along the v axis. The distance $L_u$ is the distance between centroid of neighbouring cells in the same resolution. For example, $L_u$ will be the distance between centroids of cells 64 and 65. The distance of $L_u$ and $L_v$ will differ from resolution to resolution as the area of each cell differ from resolution to resolution. For example, in a finer resolution where the area of the cells are smaller, the value of $L_u$ and $L_v$ would be less when compared to the same for coarser resolution where the area of the cells are larger.

As shown in FIGS. 10A and 10B, the origin cell 64 for each of the tessellations 60a and 60b has been selected and has been given the identifier value (0,0). The remaining cells are assigned identifier values comprising step vector values relative to the origin cell 64. As shown, the cell 65 has an identifying value of (1,0), as the cell 65 is located one step in the "u" direction and no changes in the "v" direction from the origin cell 64. Similarly cell 66 is assigned the identifying value (2,0) since it is located two steps in the "u" direction and no changes in the "v" direction from the origin cell 64. The cell 67 is assigned the identifier (1,1) since it is located one step in the "u" direction and one step in the "v" direction. The remaining cells, similar to the cells 65, 66, 67, are assigned identifiers that include a first vector value and a second vector value that are indicative of the location of the cells relative to the origin cell in the u and v axes.

While the identifier values comprising the step vectors in u and v directions are sufficient to uniquely identify the cells in a system where there is only one tessellation of cells in a single resolution, these values are not sufficient to uniquely identify cells in a system where there is a plurality of tessellations of cells in various resolutions. As such, a resolution value "r" has been included along with the u and v values to obtain the unique identifier $(u, v)_r$ for each cell. The resolution value r in the identifier for a given cell is indicative of the resolution of the tessellation that the cell is located at. The unique identifiers comprising the resolution value are illustrated with reference to FIGS. 10C and 10D.

Figure 10D:
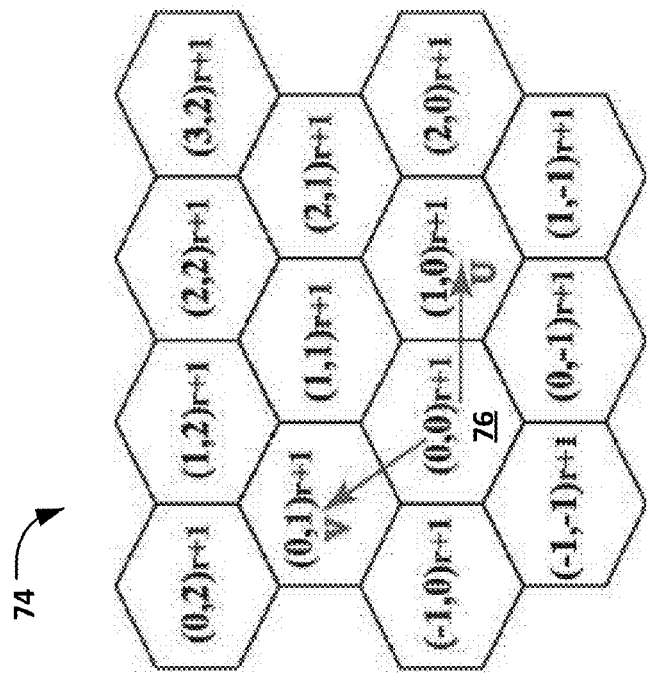
FIG. 10D is a schematic diagram illustrating integer-based identifiers including the step vectors shown in FIG. 10B and resolution r+1.
Figure 10C:
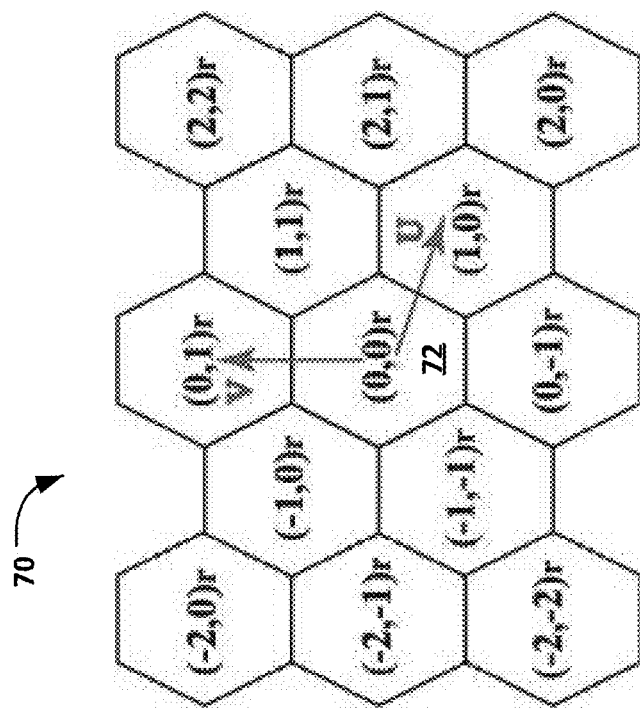
FIG. 10C is a schematic diagram illustrating integer-based identifiers including the step vectors shown in FIG. 10A and resolution r.

In FIG. 10C, a tessellation 70 having a resolution "r" is illustrated. The tessellation 70 has the cell 72 which is the origin cell for that tessellation. The remaining cells in the tessellation are assigned identifiers $(u, v)_r$, where u and v corresponding to the location of the cells relative to the origin cell 74 in terms of the step vectors in u axis and the v axis.

In FIG. 10D, a tessellation 74 that is in the next finer resolution r+1 than the tessellation 70 is illustrated. It should be understood that the tessellations 70 and 74 are not drawn to scale. If drawn to scale the area of each cell in tessellation 74 will be one third the area of each cell in the tessellation 70 (i.e. aperture-3 configuration). The tessellation 74 includes an origin cell 76 for that tessellation. The cells other than the origin cell 76 are assigned identifiers $(u, v)_{r+1}$, where u and v corresponding to the location of the cells relative to the origin cell 76 in terms of the step vectors in u axis and the v axis.

When the tessellations 70 and 72 are layered, the origin cells 72 and 76 would share the same centroid. In other words, the origin cell 76 would be the centroid child of the origin cell 72. Similarly if there are additional tessellations of finer resolutions than the resolution r+1, the origin cells for these resolutions will have the same centroid as the origin cell in the preceding resolution. For example, the origin cell in tessellation of resolution r+2, whose identifier would be $(0,0)_{r+2}$ would have the same centroid as the origin cell $(0,0)_{r+1}$. Similarly, origin cell $(0,0)_{r+3}$ would have the same centroid as the $(0,0)_{r+2}$ and so on.

After assigning identifying values $(u, v)_r$ to each of the cells the geospatial data may be associated with one or more cells corresponding to the location on Earth. The geospatial data may then be retrieved using the identifying values for the cells and provided upon request. To facilitate efficient retrieval of geospatial data associated with various cells, the server 52 may be configured to execute one or more of the following processes.

Finding Cartesian Location of a Cell

The server 52 may be configured to convert the identifier $(u, v)_r$ of a given cell to obtain a corresponding Cartesian location (i.e. Cartesian coordinates of the centroid of the cell). The Cartesian coordinates may be useful for implementing certain functions in a Digital Earth system such as data association and visualization. In some cases, some databases may have geospatial data associated with Cartesian coordinates. As such, obtaining corresponding Cartesian coordinates for the cells would allow data in such databases to be associated with the cells.

Consider a cell with index $(u, v)_r$. The Cartesian location (x, y) of this cell's centroid is desired. $(u, v)_r$ is a linear combination of two vectors, "u" and "V", along U and V axes at resolution r. Therefore, to determine (x, y) based on (u, v), the Cartesian values of unit vectors along U and V axes are initially determined and then multiplied in vectors u and v. In the even resolution case, since V and Y axes in hexagonal and Cartesian coordinates have the same direction and Y and X axes are independent, moving along the V direction has no effect on the x value. Therefore, x is only dependent on u. However, moving along the U direction influences both the x and y values. Consequently, y must be a combination of u and v values. Essentially, using simple trigonometry is enough for finding the relationship.

Figure 11:
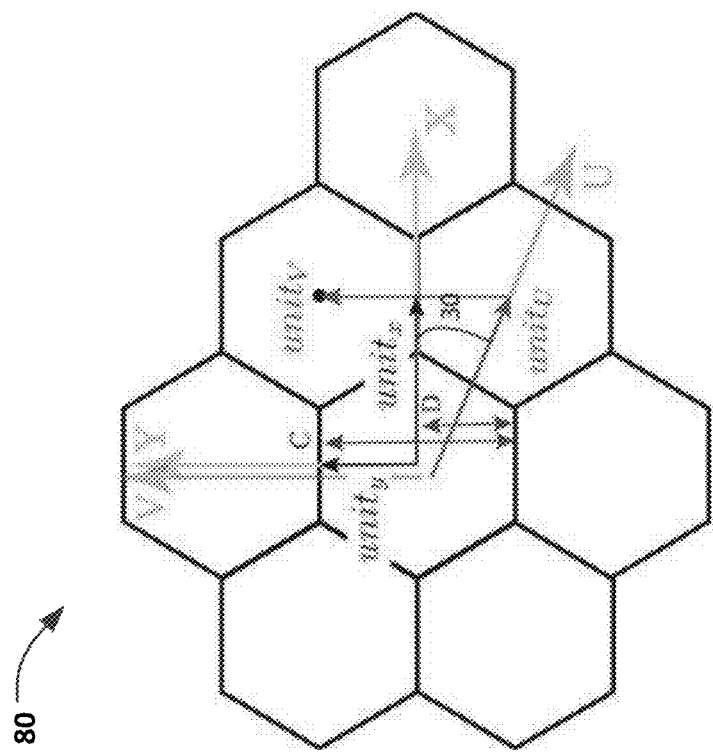
FIG. 11 is a schematic diagram illustrating the relationship between the axes for hexagonal cells shown in FIG. 9A and the axes in a Cartesian system.

Referring now to FIG. 11, illustrated therein is a tessellation 80 at an even resolution. The tessellation 80 includes unit vector u and unit vector v along U and V axes respectively. The length $L_r$ is the length of a hexagonal cell's edge at the even resolution r and unit vector x and unit vector y are unit vectors in the Cartesian coordinate. The unit vector x is independent of the unit vector v, therefore unit $x = \sqrt{3} L_r \cos(30°) = 3/2 L_r$. Therefore, $x = 3/2u\, L_r$. However, the unit vector y is dependent on the y components of both the unit vector u and the unit vector v. The y components of the unit vector u and unit vector v are depicted by vectors C and D in FIG. 11. Consequently, y is dependent on vectors vC and uD.

Given the above relationships, the value for $L_r$, x and y can be determined as follows:

$$L_r = 1/\sqrt{3^r} \qquad (1)$$

$$x = u\frac{3}{2}L_r \qquad (2)$$

$$y = vC - uD = v\sqrt{3}L_r - u\frac{\sqrt{3}}{2}L_r \qquad (3)$$

Figure 12:
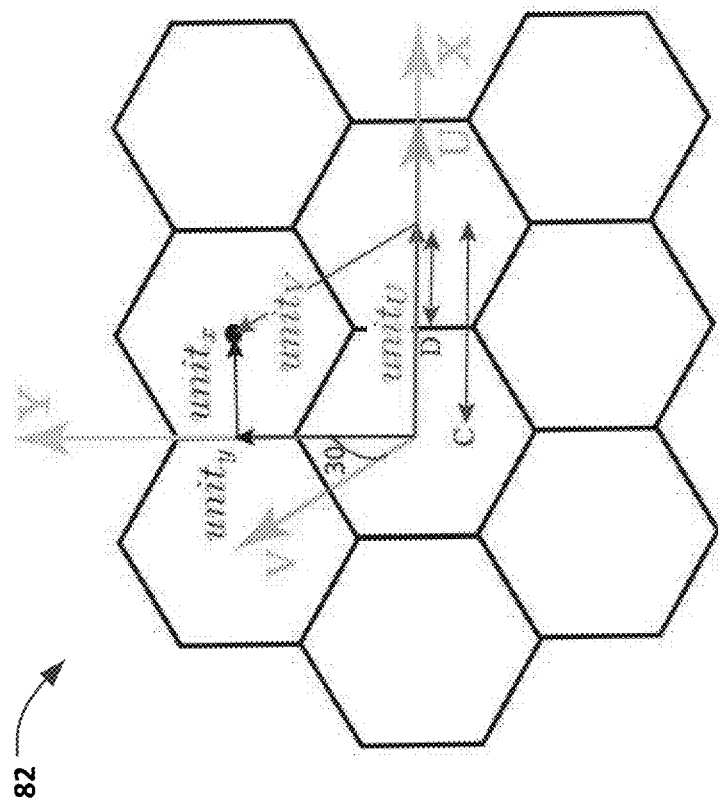
FIG. 12 is a schematic diagram illustrating the relationship between the axes for hexagonal cells shown in FIG. 9B and the axes in a Cartesian system.

Referring now to FIG. 12, illustrated therein is a tessellation 82 at an odd resolution. The difference in the odd resolution and the even resolution is that moving along V influences both the x and y values in the odd resolution tessellation. With the same reasoning, value of y is based on the value of v, and x is based on the values of both u and v. Lr has the same definition as at the even resolution as shown above for equation (1). The value for x and y in the odd resolution is as follows:

$$x = uC - vD = u\sqrt{3}L_r - v\frac{\sqrt{3}}{2}L_r \qquad (4)$$

$$y = v\frac{3}{2}L_r \qquad (5)$$

Finding Integer-Based Index from a Given Cartesian Location

The server 52 may also be configured to determine a cell including a point with a specific Cartesian coordinate as follows. That is, given a point with the Cartesian location of (x, y), the identifying value for a cell associated with the same location is determined. This differs from the reversing the process of determining a Cartesian coordinate corresponding to a vector-based identifier for a given cell described above in that the point (x, y) is not necessarily the centroid of the cell. The difference is that in the description above, the centroid was the base of conversion between Cartesian and hexagonal coordinates. Here, the Cartesian point (x, y) might not be a centroid and cells at different resolutions cover an area including many points. Consequently, the conversion needs to take this into consideration.

The equations (6), (7), (8) and (9) are obtained from the equations (2), (3), (4) and (5) respectively. The equation (6) and (7) described herein below are derived in a similar manner to the equations (8) and (9). The values for integer-based identifying values u and v at resolution r given a Cartesian coordinate (x, y) can be determined as follows.

Based on the equation (2) and (3) for even resolution tessellations, u and v values of the cell that includes the given x and y values can be determined respectively as follows.

$$x = u\frac{3}{2}L_r \Rightarrow u = \left\lfloor \frac{2}{3}\frac{x}{L_r} \right\rfloor \qquad (6)$$

$$y = v\sqrt{3}L_r - u\frac{\sqrt{3}}{2}L_r \Rightarrow$$

$$y + \frac{\sqrt{3}}{3}L_r X = \sqrt{3} L_r v \Rightarrow$$

$$v = \left\lfloor \frac{y + \sqrt{3}\, x}{L_r} \right\rfloor \Rightarrow$$

$$v = \left\lfloor \frac{\frac{\sqrt{3}}{3}y + \frac{y}{3}}{L_r} \right\rfloor \qquad (7)$$

Similarly, for odd resolution tessellations, u and v values of the cell that includes the given x and y values can be determined respectively as follows.

$$u = \left\lfloor \frac{\frac{\sqrt{3}}{3}x + \frac{y}{3}}{L_r} \right\rfloor \qquad (8)$$

$$v = \left\lfloor \frac{2}{3} \frac{y}{L_r} \right\rfloor \tag{9}$$

Figure 13:
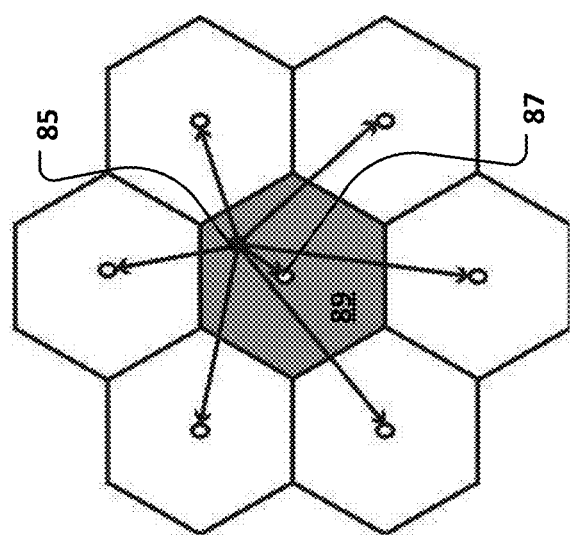
FIG. 13 is a schematic diagram illustrating the distances between centroid of neighbouring cells in the integer-based index referenced by the server in FIG. 8 and a point in the Cartesian coordinate.

Since the above discussions are based on the centroid of a cell and some measurement errors may occur because of the integer approximation of the floor function. To improve confidence in the accuracy of finding the cell covering a point, the neighbours of the cell (u, v)$_r$ obtained from equations (6) to (9) are checked to find the cell having the least distance to the point (x, y). In other words, to check the correctness of a selected cell, the distance between the point (x,y), and the centroids of the selected cell, and its neighbours are measured. The cell whose centroid has the least distance to the point (x, y) is the hexagon which covers this point. For example, as shown in FIG. 13, point 85 is closest to the centroid 87 of the cell 89. In some cases, the Cartesian point may be located on a vertex shared by multiple cells (i.e. there are more than one cell with the least distance to the point). In such cases, any one of the cells that has the least distance to the point (x, y) can be said to include that point.

Neighbourhood Finding

The identifying values for the neighbouring cells of a given cell can be determined based on the given cell's index as described herein below. Determining the identifying values of neighbouring cells of a given cell is one of the more frequently used operations in a Digital Earth system. Two cells are neighbours when they share an edge. In contrast to the quadrilateral cells, which have two different definitions for neighbourhood (four neighbours and eight neighbours), there is no ambiguity to the number of neighbours in hexagonal cells. All hexagonal cells, in both even and odd resolutions, have six neighbours.

Figure 14:
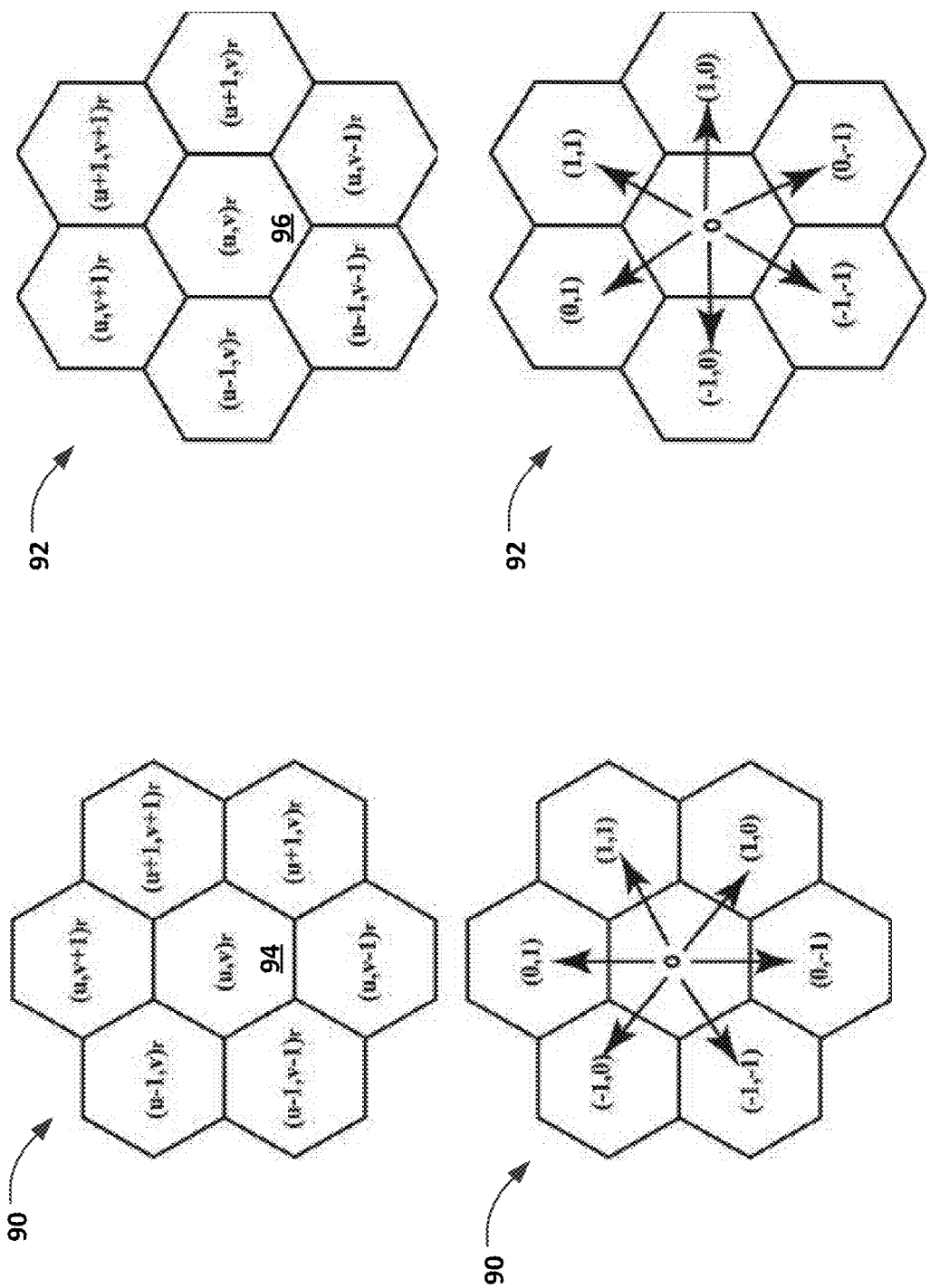
FIG. 14 is a schematic diagram illustrating various vectors in tessellations of odd and even resolutions shown in FIGS. 9A and 9B.

Referring now to FIG. 14, illustrated therein are six vectors for even resolution tessellation 90 and odd resolution tessellation 92, which may be referred to as "neighbourhood vectors", which can be added to the identifying value of given cells 94 and 96 to determine the identifying values for the neighbouring cells of the given cell 92 and 94. For example, the neighbours of a cell with index (u, v)$_r$ have the following identifying values: (u+1, v+1)$_r$, (u, v+1)$_r$, (u−1, v)$_r$, (u−1, v−1)$_r$, (u+1, v−1)$_r$ and (u+1, v)$_r$.

Figure 19:
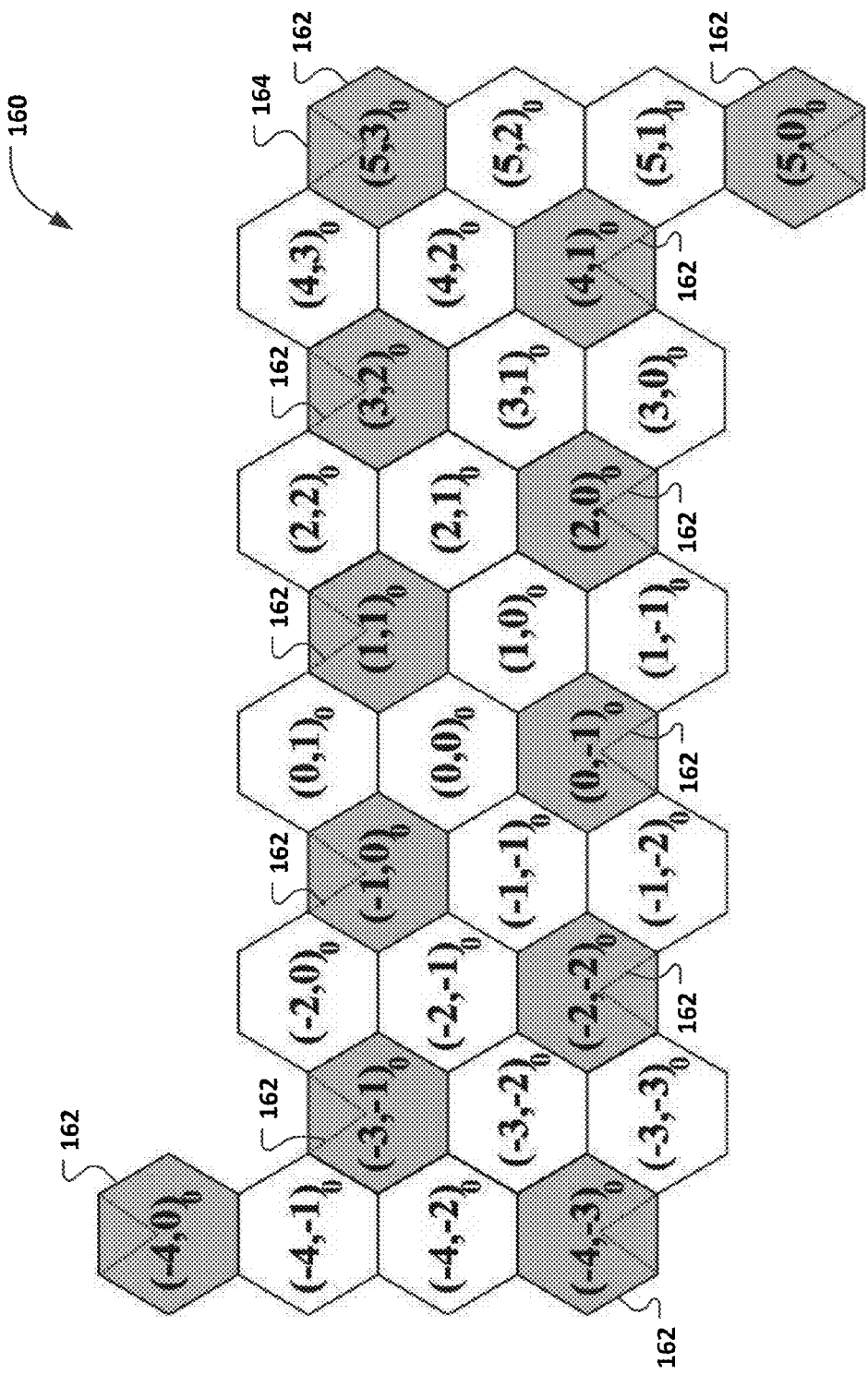
FIG. 19 is a schematic diagram illustrating aperture three hexagonal cell partitions in a first resolution of the unfolded truncated icoshedral shown in FIG. 1 assigned with integer-based unique identifiers.

The computational complexity for determining the neighbouring identifying values is order "1" (i.e. O(1)). The order of neighbourhood finding is O(1) because neighbours of any cell may be found by adding six neighbourhood vectors and performing such an operation does not become more complex regardless of the number of cells. If the truncated icosahedron is unfolded, for example as shown in FIG. 19, some cells are located on the boundary and all of these cells' neighbours cannot be found using neighbourhood vectors. Therefore, for the boundary cells, some calculations are needed that constantly increase the number of multiplications. However, this does not change the overall complexity of the determining a neighbouring cells. In contrast, systems with hierarchically based indices may have a higher complexity (e.g. O(r)) to perform the same operation.

Hierarchical Traversal

Another operation used in the Digital Earth systems is hierarchical traversal. Hierarchical traversal refers to the process of identifying the cells at finer (child cells) or coarser (parent cells) resolutions that are associated with the same and/or similar geographic location as a given cell. This allows a user, for example, to "zoom-in" to a particular location or "zoom-out" of the particular location.

Moving from Coarse Resolution to Finer Resolution

Consider a hexagonal cell with index (u, v)$_r$. Hierarchical traversal could refer to determining the identifying values for the parent or parents of this cell at resolution "r−k" and/or the child or the children of this cell of this cell at resolution "r+k".

Figure 15:
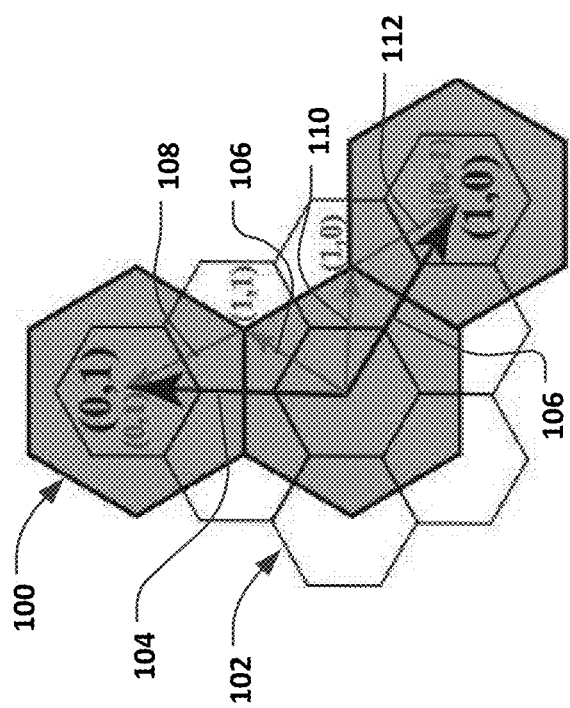
FIG. 15 is a schematic diagram illustrating the relationship between vectors in resolution r and vectors in resolution r+1 when r is in a tessellation of even resolution in the integer-based index referenced by the server in FIG. 8.

Determining the identifying values for the children of a given cell in an even resolution tessellation will now be described with reference to FIG. 15. In FIG. 15, as the given cell is at an even resolution tessellation 100, the child is at an odd resolution tessellation 102.

The vectors (0,1) and (1,0) in the tessellation 100 as indicated by reference numerals 104 and 106 respectively span the space of more than one cell in the tessellation 102. The vector (0,1) indicated by reference numeral 104 can be defined as a combination of vectors (1,1) and (0,1) in the tessellation 102 as indicated by reference numerals 106 and 108 respectively. Similarly, the vector (1,0) indicated by reference numeral 106 can be defined as a combination of vectors (1,0) and (0,−1) in the tessellation 102 as indicated by reference numerals 106 and 108 respectively. Accordingly, the centroid child of cell (1,0)$_r$ and (0,1)$_r$ can be determined as follows.

$$(1,0)_r = (1,0)_{r+1} + (0,-1)_{r+1} = (1,-1)_{r+1} \tag{10}$$

$$(0,1)_r = (1,1)_{r+1} + (0,1)_{r+1} = (1,2)_{r+1} \tag{11}$$

The above equations (10) and (11) indicate that moving one step at the U direction of the coarse resolution (e.g. in tessellation 100) is equal to moving one step at the V direction and one step at the −U direction of the next finer resolution (e.g. tessellation 102). Based on these two equations, the vector (a,b)$_r$ (when r is an even value) is equal to vector (c,d)$_{r+1}$ such that:

$$(a,b)_r = a(1,0)_r + b(0,1)_r = a(1,-1)_{r+1} + b(1,2)_{r+1} = (a+b, 2b-a)_{r+1} = (c,d)_{r+1} \tag{12}$$

Figure 16:
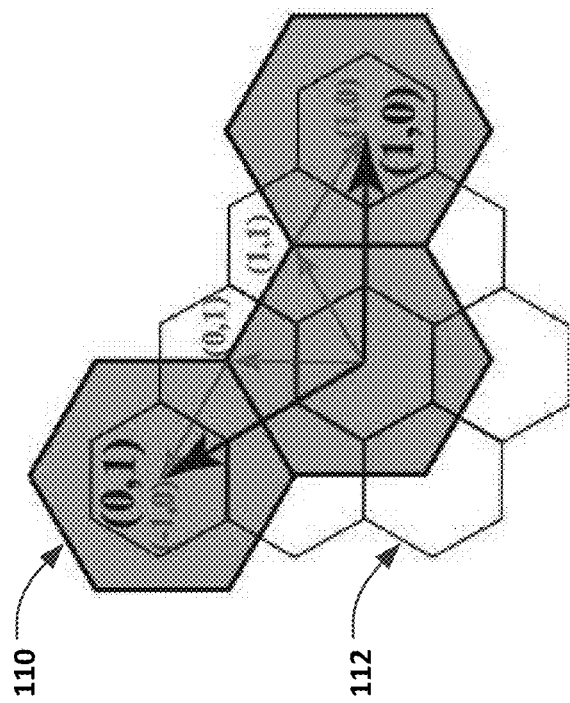
FIG. 16 is a schematic diagram illustrating the relationship between vectors in resolution r and vectors in resolution r+1 when r is in a tessellation of odd resolution in the integer-based index referenced by the server in FIG. 8.

Referring now to FIG. 16, illustrated therein is a given cell in an odd resolution tessellation 110. As the given cell is at an odd resolution tessellation 110, the centroid child is located at an even resolution tessellation 112.

Equations (13) and (14) below show the relationships between main vectors and equations (15) shows coarse vector (a, b)$_r$ and its equivalent vector at resolution r+1 ((c, d)$_{r+1}$).

$$(1,0)_r = (1,0)_{r+1} + (1,1)_{r+1} = (2,1)_{r+1} \tag{13}$$

$$(0,1)_r = (0,1)_{r+1} + (-1,0)_{r+1} = (-1,1)_{r+1} \tag{14}$$

$$(a,b)_r = a(1,0)_r + b(0,1)_r = a(2,1)_{r+1} + b(-1,1)_{r+1} = (2a-b, a+b)_{r+1} = (c,d)_{r+1} \tag{15}$$

In order to define a straightforward hierarchical traversal relationship for more than one resolution, a method for determining the identifying values of the child cell at two finer resolutions is provided. Then, it is expanded to determine hierarchical traversals at other number of finer resolutions. In the case where resolution k is even, (the proof of the odd case is derived similarly), based on the above equations, the grandchild (i.e. the cell that has the same centroid point as the given cell at two finer resolutions) of the given cell can be determined as follows.

$$(a,b)_k = (a+b, 2b-a)_{k+1} = (2(a+b)-(2b-a), (a+b)+(2b-a))_{k+2} = (3a, 3b)_{k+2} = (c,d)_{k+2} \tag{16}$$

Therefore, after two steps of subdivision, lengths of vectors are divided by three. This is expected since the aperture 3 ($\sqrt{3}$) subdivision is being used. With the same reasoning, it is possible to determine the identifying value for a child cell in more than one finer resolution tessellations. For example, jumping four resolutions, the centroid child of a cell with index $(a, b)_r$ has index $(3^2a, 3^2b)_{r+4}$.) In general, the centroid child of cell $(a, b)_r$ has the index $$(3^{\frac{k}{2}}a, 3^{\frac{k}{2}}b)_{r+k}$$

at resolution k. If k is odd, then $$(3^{\frac{k-1}{2}}a, 3^{\frac{k-1}{2}}b)_{r+k-1}$$

for jumping k−1 resolutions and the equation (12) or (15) for the last step hierarchical traversal.

Based on the above description, it is possible to calculate the identifying value of centroid children of a given cell at all resolutions. It is also possible to jump two or more resolutions multiplying indices into three or powers of three.

Moving from a Fine Resolution to a Coarser Resolution

In some cases, it may be desirable to determine the identifying value of the parent of a given cell. That is, given a cell located at a tessellation having a resolution r, it may be desirable to determine the identifying value of the parent cell that is located above the given cell in the coarser resolution tessellation (r−k).

If the fine cell is a centroid child of a coarse parent, it is sufficient to find the cell at the coarse resolution including the centroid of the fine cell using the equations (6) to (9). The Cartesian coordinates of the centroid are computed using the equations (1) to (5). Consequently, if the centroid child has the index $(a, b)_r$ and its parent at the resolution r−k is needed, first, the Cartesian coordinates of the child's centroid with the index $(a, b)_r$ are computed using the equations (1) to (5). Then, the cell including the centroid at resolution r−k is found based on Equations (6) to (9).

In some cases, the given cell is a vertex cell (i.e. located at the vertex of the parent and not at the centroid), the given cell has three different possible parent cells in the adjacent coarser resolution tessellation that partially cover the cell. For example, as shown in FIG. 17, the given cell 120 is a vertex cell and has three different possible parent cells 122, 124, 126. In such cases, the identifying value of all three possible parent cells may first be determined.

Figure 18:
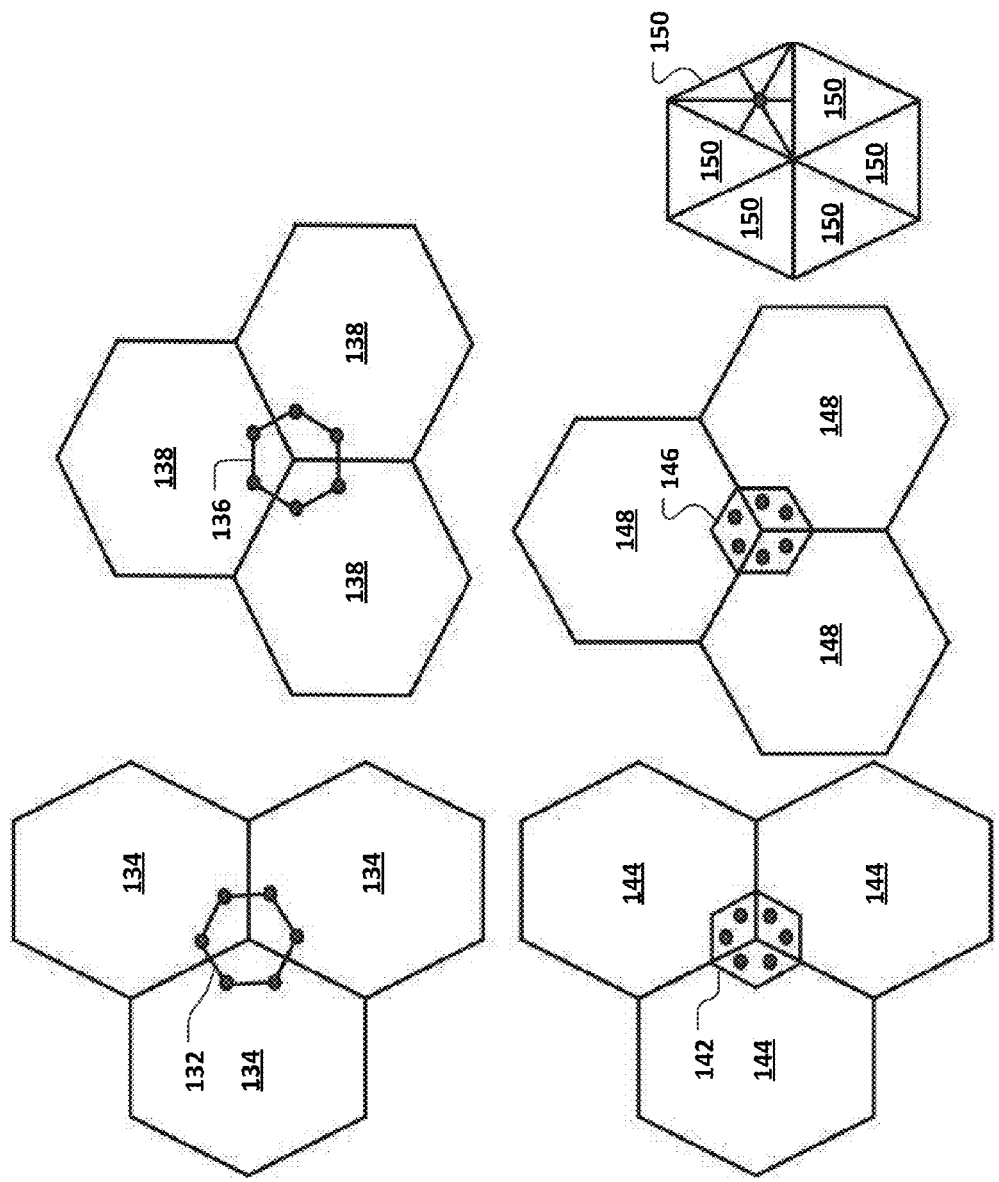
FIG. 18 is a schematic diagram illustrating exemplary cases that may have to be addressed by the server in FIG. 8 where the possible parent cells of a given cell can be determined by performing a neighbourhood check of the coarse cells.

In some cases, it may be possible to determine the possible parent cells of the given cell by performing a neighbourhood check of the coarse cells, for example as described above with reference to FIG. 13. That is, if the distances between the centroid of the given fine cell and the centroids of three neighbouring cells are equal, then all of the coarse cells having an equal distance to the centroid of the fine cell are considered as the possible parent cells of the given fine cell. This method may not be very reliable because of computational errors especially at very high resolutions. The following method may provide a more robust way of determining the possible parent cells of a given cell. The method is described with reference to FIG. 18. The server 52 may be configured to execute this method to determine the possible parent cells of a given cell.

In some cases, the given cell is at the odd resolution and its parent cell is at an even resolution or the given cell is at an even resolution and its parent cell is at an odd resolution. That is, the given cell and the parent cell are in resolutions that do not match (i.e. if the given cell is in an odd resolution then the parent is in an even resolution and vice versa). For example the given cell 132 is in an odd resolution tessellation while the possible parent cells 134 are in an even resolution tessellation. In another example, the given cell 136 is in an even resolution tessellation while the possible parent cells 138 are in an odd resolution tessellation.

In other cases, both the given cell and the parent cells are at the even or odd resolutions. That is, the given cell and the parent cell are in the matching resolutions. For example, both the given cell 142 and the possible parent cells 144 are in even resolution tessellations. In another example, both the given cell 146 and the possible parent cells 148 are in odd resolution tessellations.

In the cases where the given cell is at the odd resolution different resolutions, the parent cell or cells which cover vertices of the given cell are computed.

In the cases where the given cell and the parent cells have matching resolutions, the cells or cell which cover the centroids of six triangles 150 in the given hexagon cell 152 are computed. For example, any centroid has a Cartesian coordinate (x, y). The Cartesian coordinate can be used to determine $(u, v)_r$ of that cell using equations (6), (7), (8), and (9).

Indexing on the Truncated Icosahedron

The above description shows how identifying values could be assigned to hexagon cells on a plane. However, as the Earth is a sphere, and a truncated icosahedron is being used to represent the Earth, the truncated icosahedron is "unfolded" to form a plane such that the above described ways of identifying the cells can be applied.

An unfolded truncated icosahedron has 20 hexagonal faces and 12 pentagonal faces. However the indexing method described above is based on hexagonal cells. Therefore, the rules of hexagonal coordinates are not applicable for all the cells resulting from subdivision of the truncated icosahedron. That is, the pentagonal faces needs to be addressed such that the above described indexing method for hexagonal cells of assigning hexagonal coordinates are functional.

There are more than one way to unfold the truncated icosahedron have all its faces on a plane. To facilitate application of the above described indexing system, the truncated icosahedron is unfolded such that the pentagons are located at the boundaries. The pentagons at the boundaries are then considered as hexagons that are missing one edge. On the edge that does not exist, there is no neighbouring cell. FIG. 19 shows an unfolded truncated icosahedron 160 in which pentagons 162 are located on the boundaries. Note that each of the pentagons 162 illustrated in the FIG. 19 include the imaginary edge 164 to assist with visualization them as hexagons with a missing edge.

Figure 20:
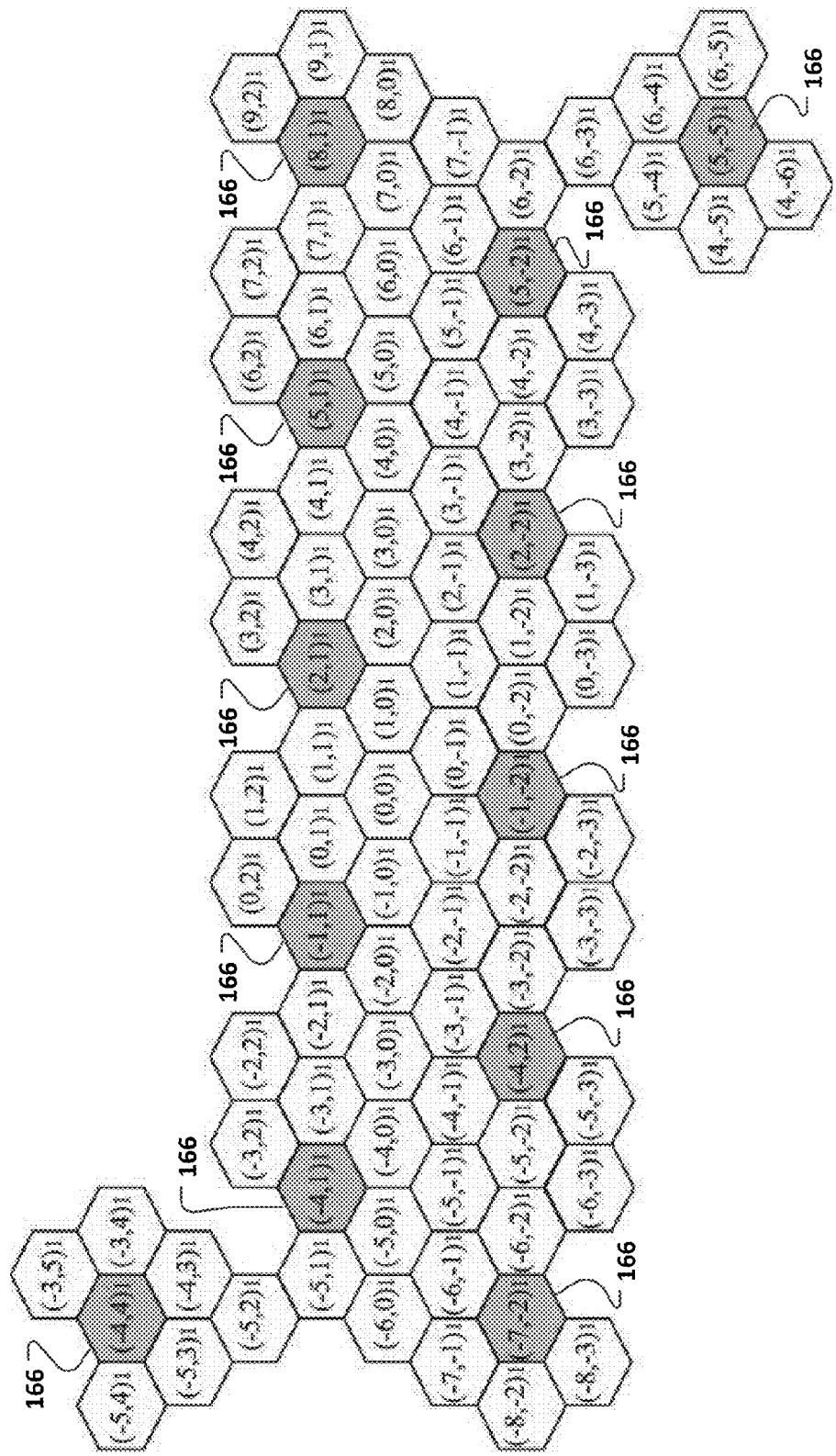
FIG. 20 is a schematic diagram illustrating aperture three hexagonal cell partitions in a finer resolution than the resolution shown in FIG. 19.

FIG. 19 only illustrates the tessellation of cells at the first resolution. There are many ways to unfold the truncated icosahedron at other subsequent resolutions. It is possible to apply the algorithm used by PYXIS as described in U.S. Pat. No. 8,018,458 to unfold further resolutions. For example, FIG. 20 shows an unfolded truncated icosahedron at a second resolution tessellation based on the rule that faces of type A create one child and faces of type B create seven children. The cells are assigned integer-based identifying values as described herein above. The grey hexagons 166 located on the boundary are pentagons.

Figure 21:
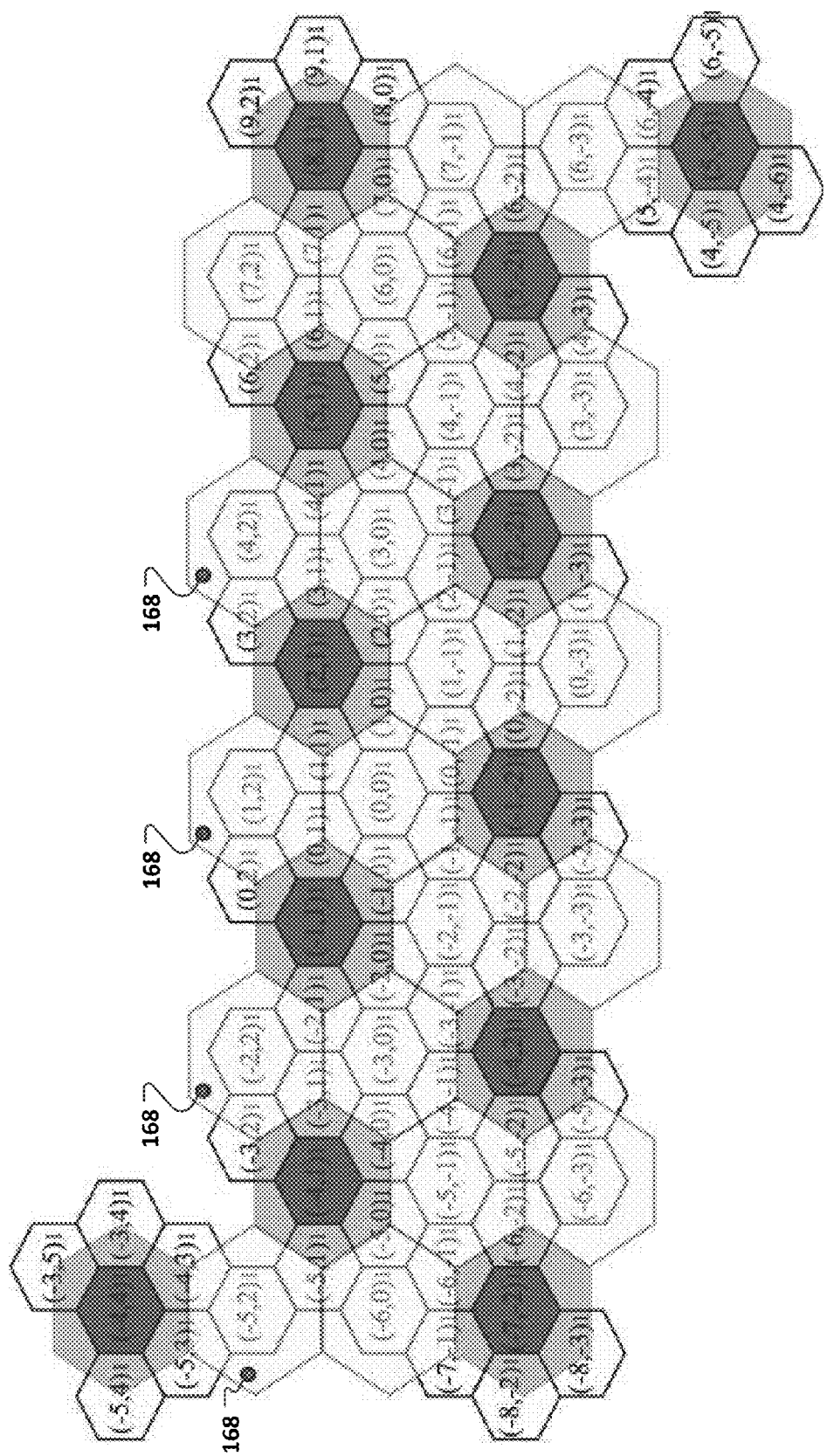
FIG. 21 is a schematic diagram illustrating the tessellation shown in FIG. 19 layered with the tessellation shown in FIG. 20 to illustrate how some points may fall outside of cells in tessellations of some resolutions.

After providing several tessellations of finer and finer resolutions, the unfolded truncated icosahedron develops into a fractal-like shape. Fractal-like coverage may not be appropriate for the indexing method for at least two reasons. First, the space covered by the cells may differ from resolution to resolution. Accordingly, some points that belong to cells of one resolution may be out of the cells at another resolution. For example, FIG. 21 illustrates truncated icosahedron and its faces' indices at the first and second resolutions. Points 168 are points which exist at the first resolution but not at second resolution. This may be problematic because after several resolutions there are some fine cells that are entirely out of cells at coarser resolutions and finding the parent of such cells using the equations (6) to (9) may not be possible or be computationally expensive.

In general, the PYXIS definition for children of a coarse cell may not desirable since it considers the fine cells as the children of a coarse cell that are not physically covered by that coarse cell. As a result, a search on the cells that are between of the fine and coarse resolutions in the hierarchy is required. To avoid such ambiguity, all the fine cells that are covered by a coarse cell are considered to be its children. Then the equations (6) to (9) could be applied for hierarchical traversal.

A second reason why the fractal coverage may not be desirable is that handling the cells on the boundary is difficult for fractal-like coverage since they do not have a predictable and straightforward boundary shape at different resolutions.

Figure 22:
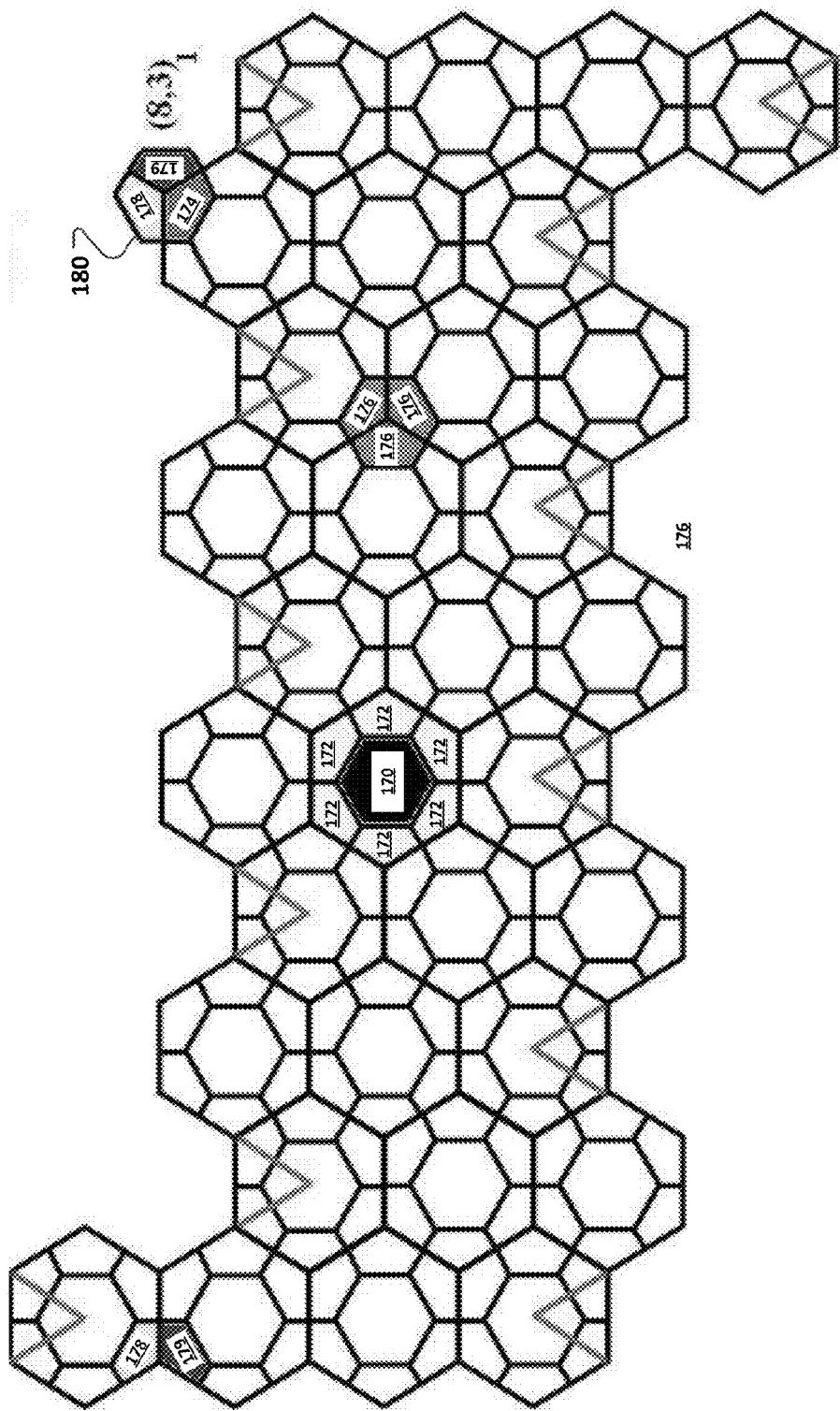
FIG. 22 is a schematic diagram illustrating the unfolded truncated icosahedron shown in FIG. 19 at a second resolution when the second resolution is generated using the shape of the first resolution.

To avoid having fractal-like coverage, subsequent resolutions of the truncated icosahedron are unfolded based on its shape at the first resolution. FIG. 22 illustrates the truncated icosahedron at the second resolution using the shape of the first resolution. The cell 170 is a full cell and the pentagonal shapes 172 are partial cells created by a cell at the first resolution. The partial cells 176 make a full cell in both 3D and unfolded truncated icosahedron. The partial cells 174, 178, and 179 are located on the boundary. The partial cells 174, 178 and 179 become adjacent to each other to form a full cell 180 when the truncated icosahedron is folded. (i.e. in the 3D truncated icosahedron).

Using this method of unfolding the truncated icosahedron, the space covered by cells remains the same at all resolutions therefore there is no point that belongs to one cell at one resolution and does not belong to the cells of another resolution.

Partial Cells and Boundary Cases

Referring again to FIG. 22, the partial cells (e.g. partial cells 174, 178, 179) are portions of vertex children of a first resolution hexagon. If a child hexagon is covered by three different coarse cells at the first resolution, it is divided into three partial cells. Using partial cells as an element of the subdivided truncated icosahedron, every cell at the first resolution covers some full and partial cells. Moreover, having such a definition we can avoid fractal coverage for subsequent resolutions and finding all possible parents of a cell is easier.

Figure 23:
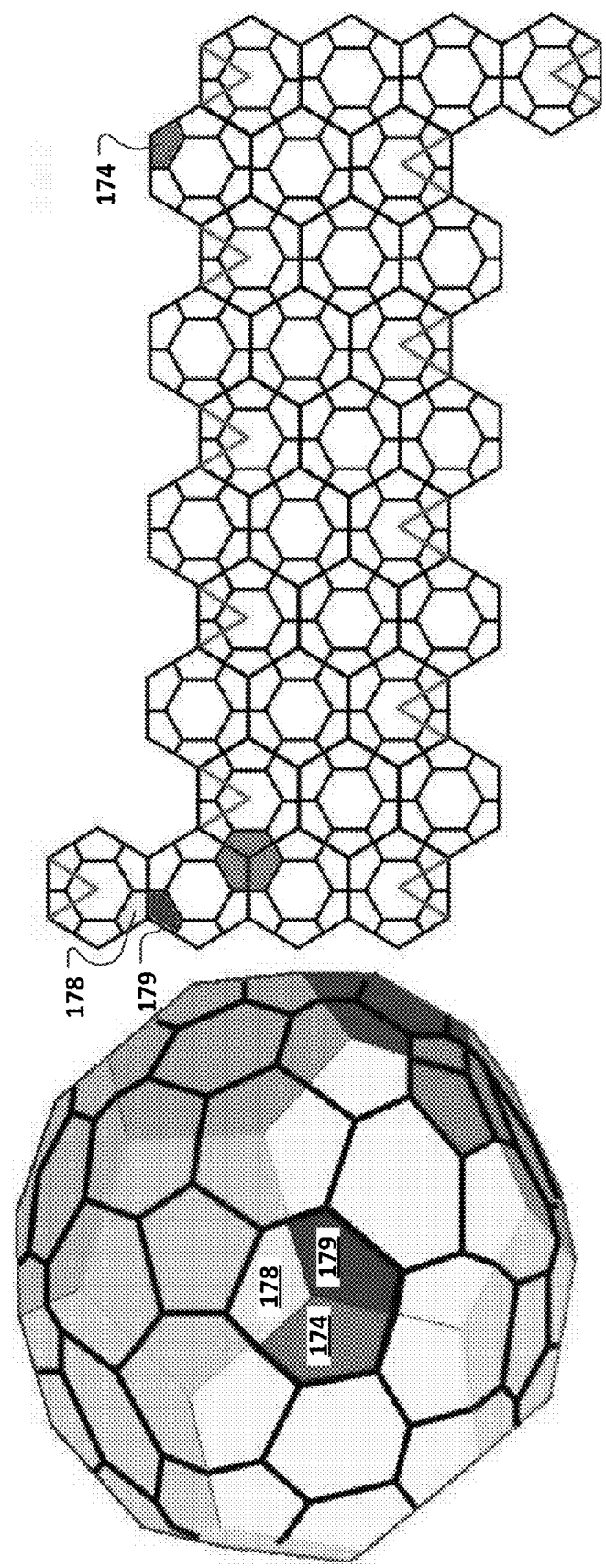
FIG. 23 is a schematic diagram illustrating the locations of the cells of truncated icosahedron in FIG. 22 when the plane shown therein is folded.

Consider the partial cell 174 in FIG. 22. It is part of the cell with index $(8,3)_1$. Cell $(8,3)_1$ is not completely on the area covered by 32 faces of the unfolded truncated icosahedron. The partial cell 174 and two other partial cells 178, 179 connect to form a complete cell on the 3D truncated icosahedron, for example as shown in FIG. 23.

Figure 24:
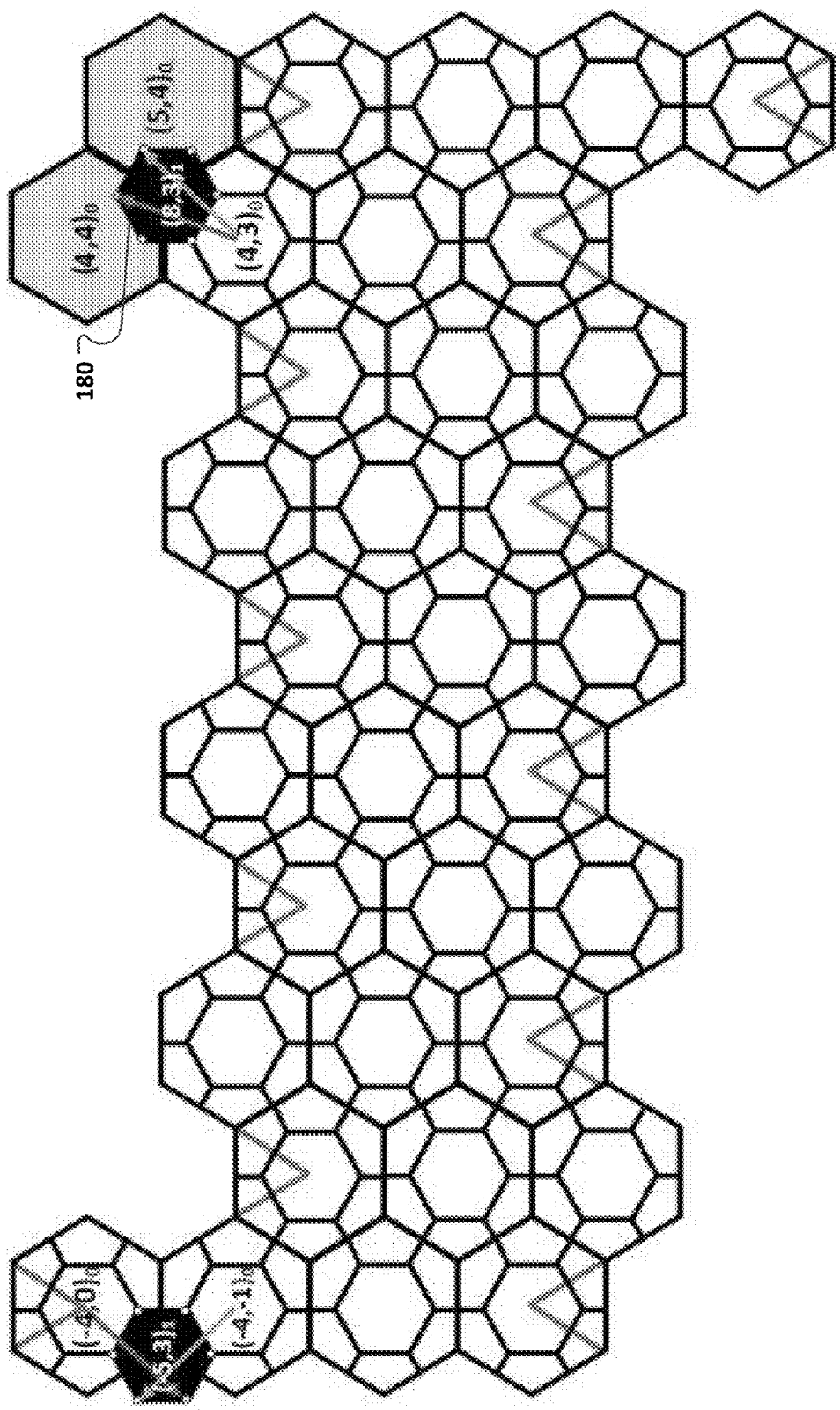
FIG. 24 is a schematic diagram illustrating how the connected partial cells shown in FIGS. 22 and 23 may be located.

Finding connected partial cells are important operations for neighbourhood finding since every neighbour of a 3D cell is located beside a different partial cell. In addition, to find all parents of a vertex child, it is required to find all partial cells since every partial cell represents a different parent. The objective, therefore, is to find the indices (identifying values) of the partial cells 178 and 179 given the index of the partial cell 174 $(8, 3)_1$. To determine the indices for partial cells 178 and 179, it is first determined whether the partial 174 is on the boundary. Then the other adjacent partial cells in the 3D truncated icosahedron (i.e. the partial cells 178 and 179) are identified. This will now be described with reference to FIG. 24.

In general, to determine whether a cell is on the boundary or not, the first resolution parents of the cell must be computed. If all parents are amongst of the original 32 faces of the truncated icosahedron, then this cell resides in the interior. Otherwise it lies on the boundary. Consider cell $(8,3)_1$ indicated by reference numeral 180. The identifying value of the parent of the cell 180 is determined, for example, by using the method described herein above. The cell 180 has three parents with indices $(4,3)_0$, $(5,4)_0$ and $(5,5)_0$. However, only cell $(4,3)_0$ is among the indices of 32 faces of the truncated icosahedron from the first resolution. As such, it could be determined that the cell $(8,3)_1$ is located on the boundary.

The next issue involves determining adjacent partial cells on the 3D truncated icosahedron. Consider a cell located on the boundary, such as $(8,3)_1$ in the FIG. 24. Cell $(8,3)_1$ is a child of $(4,3)_0$ as described above. Since this unfolded truncated icosahedron is not unique, the cell $(4,3)_0$ is not on the boundary. In other words, instead of having hexagons cells $(-4,0)_0$ and $(-4, -1)_0$, there are cells $(5,4)_0$ and $(4,4)_0$ at the first resolution. Therefore, the cell $(-4,-1)_0$ is replaced with cell $(5,4)_0$. The cell $(5,4)_0$ could be referred to as the "second position" or "virtual position" of cell $(-4, -1)_0$. Extrapolating this concept, the virtual cells could be used to determine which partial cells are connected to each other in the 3D truncated icosahedron. The virtual cells are also beneficial for finding neighbours of boundary hexagonal cells.

To find these virtual positions a look-up table such as Table 1 provided herein below could be used. Consider the first row of the table. Let the selected hexagon (i.e. hexagon whose data should be retrieved) has a partial cell on $(4,3)_0$. If another partial cell of this hexagon is on $(3,3)_0$ then it is outside of the original 32 faces of the first resolution and its virtual position is on the cell $(2,2)_0$. In other words, from the position of a hexagon Table 1, the virtual positions of partial hexagons outside of the initial 32 initial faces can be computed. For example, since $(8,3)_1$ belongs to $(4,3)_0$, the neighbouring cells have virtual positions $(4,3)_0$ $(-4, -1)_0$ instead of $(5,4)_0$, and $(-4,0)_0$ instead of $(4,4)_0$.

In order to find the partial cell on cell $(-4, -1)_0$ in the truncated icosahedron, first one point on the $(5,4)_0$ is selected (i.e. one of the vertices which is on the cell $(5,4)_0$), and the vector which connects the centroid of the $(4,3)_0$ and the vertex (FIG. 24) is selected. This vector is rotated 90 degrees and added to the centroid of cell $(-4, -1)_0$. The cell which includes this point is computed using the equations (6) to (9). The partial cell which is on the area of 32 faces of the first resolution should be picked as one of the partial cells attached to the partial cell of the cell $(8, 3)_1$. The case of the other partial cell is very similar. To obtain the rotation of the vectors, a coordinate for virtual hexagons that captures the rotations can be considered.

TABLE 1

| Virtual position of hexagons on the boundary based on their neighbours. | | |
|---|---|---|
| Planar hexagon | neighbour | Virtual position |
| $(4, 3)_0$ | $(3, 3)_0$ | $(2, 2)_0$ |
| | $(4, 4)_0$ | $(-4, 0)_0$ |
| | $(5, 4)_0$ | $(-4, -1)_0$ |

TABLE 1-continued

Virtual position of hexagons on the boundary based on their neighbours.

| Planar hexagon | neighbour | Virtual position |
|---|---|---|
| $(2, 2)_0$ | $(1, 2)_0$ | $(0, 1)_0$ |
|  | $(2, 3)_0$ | $(-4, 0)_0$ |
|  | $(3, 3)_0$ | $(4, 3)_0$ |
| $(0, 1)_0$ | $(-1, 1)_0$ | $(-2, 0)_0$ |
|  | $(0, 2)_0$ | $(-4, 0)_0$ |
|  | $(1, 2)_0$ | $(2, 2)_0$ |
| $(-2, 0)_0$ | $(-3, 0)_0$ | $(-4, -1)_0$ |
|  | $(-2, 1)_0$ | $(-4, 0)_0$ |
|  | $(-1, 1)_0$ | $(0, 1)_0$ |
| $(-4, -1)_0$ | $(-5, -1)_0$ | $(4, 3)_0$ |
|  | $(-3, 0)_0$ | $(-2, 0)_0$ |
|  | $(-5, -2)_0$ | $(5, 3)_0$ |
| $(5, 1)_0$ | $(4, 0)_0$ | $(3, 0)_0$ |
|  | $(6, 2)_0$ | $(-4, -3)_0$ |
|  | $(6, 1)_0$ | $(-3, -3)_0$ |
| $(3, 0)_0$ | $(4, 0)_0$ | $(5, 1)_0$ |
|  | $(3, -1)_0$ | $(5, 0)_0$ |
|  | $(2, -1)_0$ | $(1, -1)_0$ |
| $(1, -1)_0$ | $(2, -1)_0$ | $(3, 0)_0$ |
|  | $(1, -2)_0$ | $(5, 0)_0$ |
|  | $(0, -2)_0$ | $(-1, -2)_0$ |
| $(-1, -2)_0$ | $(0, -2)_0$ | $(1, -1)_0$ |
|  | $(-1, -3)_0$ | $(5, 0)_0$ |
|  | $(-2, -3)_0$ | $(-3, -3)_0$ |
| $(-3, -3)_0$ | $(-2, -3)_0$ | $(-1, -2)_0$ |
|  | $(-3, -4)_0$ | $(5, 0)_0$ |
|  | $(-4, -4)_0$ | $(5, 1)_0$ |
| $(5, 3)_0$ | $(6, 3)_0$ | $(-4, -2)_0$ |
|  | $(6, 4)_0$ | $(-4, -1)_0$ |
| $(5, 2)_0$ | $(6, 2)_0$ | $(-4, -3)_0$ |
|  | $(6, 3)_0$ | $(-4, -2)_0$ |
| $(-4, -2)_0$ | $(-5, -2)_0$ | $(5, 3)_0$ |
|  | $(-5, -3)_0$ | $(5, 2)_0$ |
| $(-4, -3)_0$ | $(-5, -3)_0$ | $(5, 2)_0$ |
|  | $(-5, -4)_0$ | $(5, 1)_0$ |
| $(-4, 0)_0$ | $(-3, 0)_0$ | $(-2, 0)_0$ |
|  | $(-5, -4)_0$ | $(5, 1)_0$ |
|  | $(-5, -4)_0$ | $(5, 1)_0$ |
|  | $(-5, -4)_0$ | $(5, 1)_0$ |
| $(5, 0)_0$ | $(-3, 0)_0$ | $(-2, 0)_0$ |
|  | $(-5, -4)_0$ | $(5, 1)_0$ |
|  | $(-5, -4)_0$ | $(5, 1)_0$ |

Converting PYXIS Indexing to Integer-Based Indexing

In some cases, it may be desirable for the indexing above to be translated to PYXIS indexing disclosed in U.S. Pat. No. 8,018,458 and vice versa.

In the PYXIS indexing, every cell is indexed using its parent's index and appending a digit associated with the direction of the cell to its parent. Every cell indexed by PYXIS method has a integer-based index from the first resolution and a direction denoted by an identifying value such as a number between 1 and 6, which refers to corresponding vectors in hexagonal coordinates (identifier "0" represents a centroid child therefore no vector in hexagonal coordinates is necessary). Based on these, a first resolution cell may be directed through the associated vectors to find the corresponding integer-based indexing.

Figure 25:
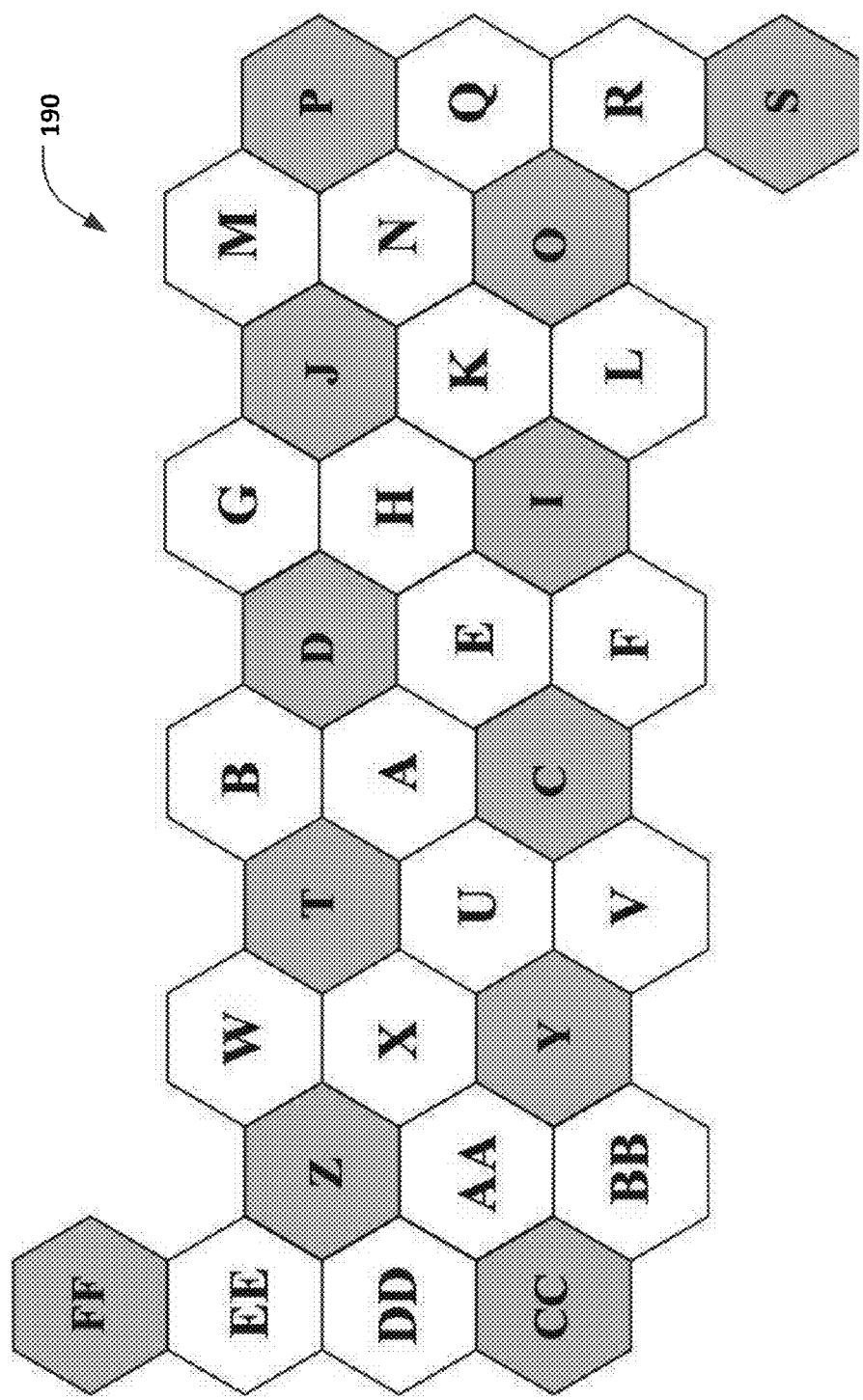
FIG. 25 is a schematic diagram illustrating aperture three hexagonal cell partitions in a first resolution of the unfolded truncated icoshedral shown in FIG. 1 assigned with PYXIS unique identifiers.

Referring now to FIG. 25, illustrated therein is unfolded truncated icosahedron for the first resolution tessellation 190 cells that are assigned exemplary PYXIS identifiers. The cell indexed by "A" in PYXIS method could be assigned a first identifier value $(0,0)_0$, similar to the same cell shown in FIG. 19.

Figure 26:
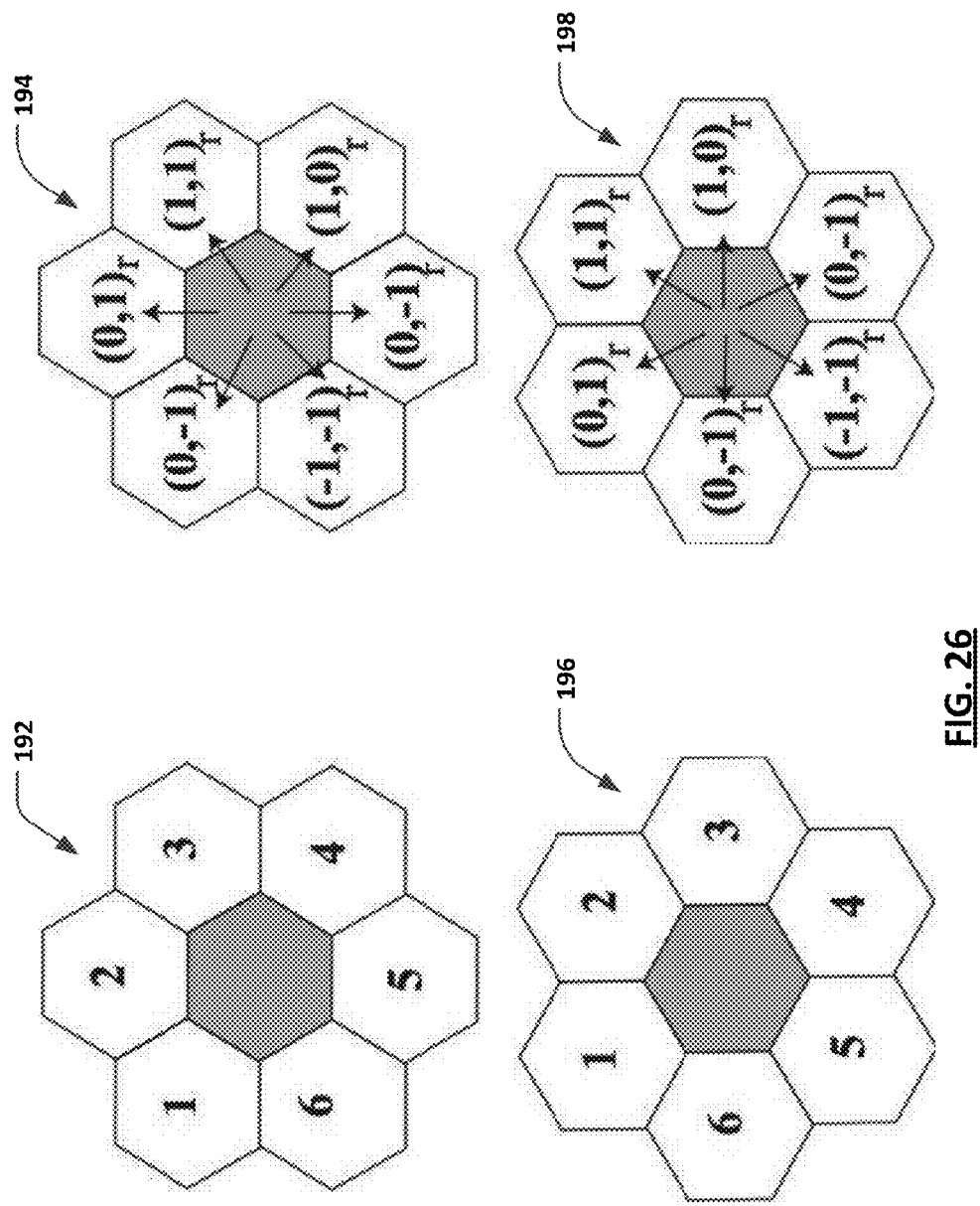
FIG. 26 is a schematic diagram illustrating the relationship between exemplary identifier PYXIS digits and the vectors in the integer-based identification system at odd and even resolutions.

The six digits used by PYXIS indexing can be interpreted as six vectors at odd and even resolutions. FIG. 26 illustrates the relationship between PYXIS digits and their equivalent vectors at odd and even resolution. The cells indicated by reference numeral 192 shows the PYXIS indexing in an even resolution tessellation and the cells indicated by reference numeral 194 shows the integer-based indexing described herein above in the even resolution. Similarly, the cells 196 shows the PYXIS indexing in an odd resolution tessellation and the cells 198 shows the integer-based indexing described herein above in the odd resolution.

To convert the PYXIS index to the integer-based index, the integer-based index corresponding to the first element of the PYXIS indexing is first determined. Then, since every digit appearing after the first element of PYXIS indexing represents a vector in the integer-based indexing, each vector is converted to the integer-based indexing until appropriate integer-based identifier for the cell is obtained.

Figure 27:
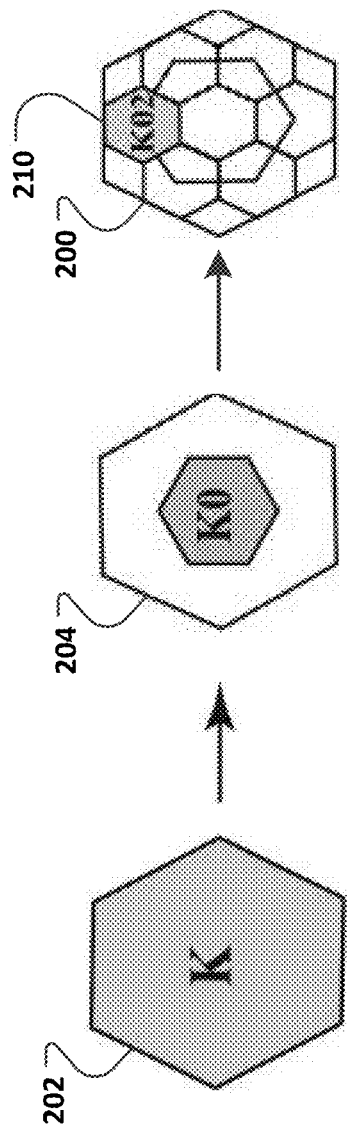
FIG. 27 is a schematic diagram illustrating three resolutions of cells assigned with PYXIS identifiers.

Referring now to FIG. 27, illustrated therein are three resolutions of cells assigned with PYXIS identifiers. It is possible to efficiently determine which resolution the cell is in due to the nature of PYXIS indexing. For example, the cell 200 with the identifying value K02 is at the third resolution since the length of the index is three (I.e. has three characters). The identifier "K" indicates the starting cell 202 at the first resolution. From the identifying value "0", it can be determined that the cell 204 is a centroid child of cell "K". The cell 200 is one more resolution finer than cell 204 and it is a vertex child located in the direction associated with the identifier "2" as shown in the cells 192 in FIG. 26.

Figure 28:
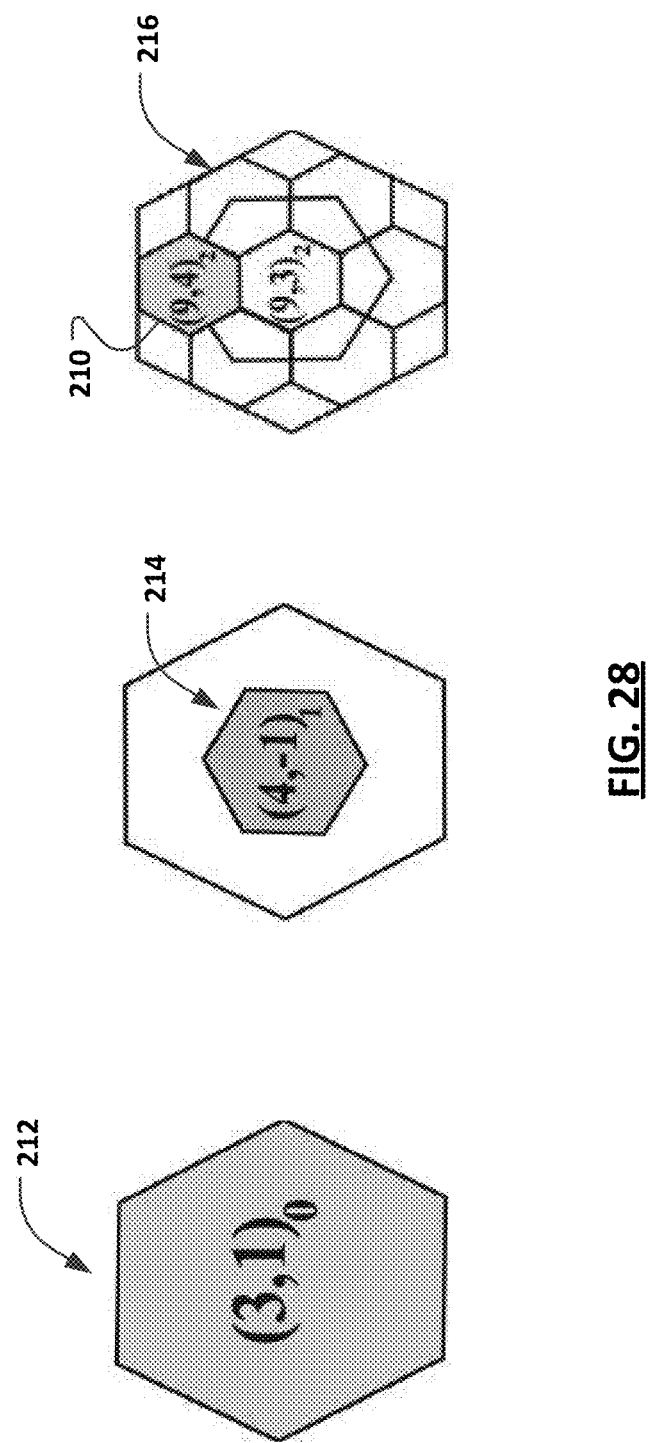
FIG. 28 is a schematic diagram illustrating the cells shown in FIG. 27 with integer-based identifiers corresponding to the PYXIS identifiers.

An exemplary translation from the PYXIS index to the integer-based index will now be described with reference to FIGS. 27 and 28. To find the equivalent integer-based index form a PYXIS index, the first element of the PYXIS index is mapped to the corresponding integer-based index (e.g. as shown in FIGS. 19 and 25). For example, for given a cell 210 with the PYXIS identifier "K02". In the first resolution tessellation 212, it can be determined that the identifier "K" corresponds to cell $(3,1)_0$. In the second resolution tessellation 214, as the identifier "0" is associated with hierarchical down traversal to the centroid child, it is possible to use the equation (12) to find the integer-based index $(4,-1)_1$. In the third resolution tessellation 216, the identifier "2" suggests that the cell is a vertex child cell whose centroid is at a vertex corresponding to the associated "2". As such, it is possible to determine the integer-based index corresponding to the identifier "2" by adding an appropriate vector. The equation (15) can be executed to traverse down to centroid cell $(9,3)_2$ and then direction vector $(0, 1)_2$ from FIG. 26 can be added to obtain the integer-based identifying value $(9, 4)_2$ for the cell.

PYXIS indexing works based on the fractals that every coarse cell makes. Every cell is indexed based on the first resolution shape. Since some of the PYXIS fractals expand more than one coarse cell, they might be out of the first resolution faces of the truncated icosahedron. Therefore using the above conversion, the obtained integer-based indexing $(i, j)_r$ may not be a valid index. To avoid this issue, after finding the integer-based index, an additional determination is made as to whether $(i, j)_r$ is covered by the first resolution faces of truncated icosahedron. Although the PYXIS fractals may expand more than one coarse cell, they do not expand more than two cells. Therefore, if $(i, j)_r$ is not covered by a first resolution cell, it must be covered by a coarse cell $(a, b)_0$ for which there is a virtual position $(c, d)_0$. The Table 1 can be utilized to find $(c, d)_0$ based on $(a, b)_0$. The vector connecting the centroid of $(a, b)_0$ to the centroid of $(i, j)_r$ is then determined. Then the cell whose centroid is the addition of this vector to the centroid of $(c, d)_0$ is determined.

Figure 29:
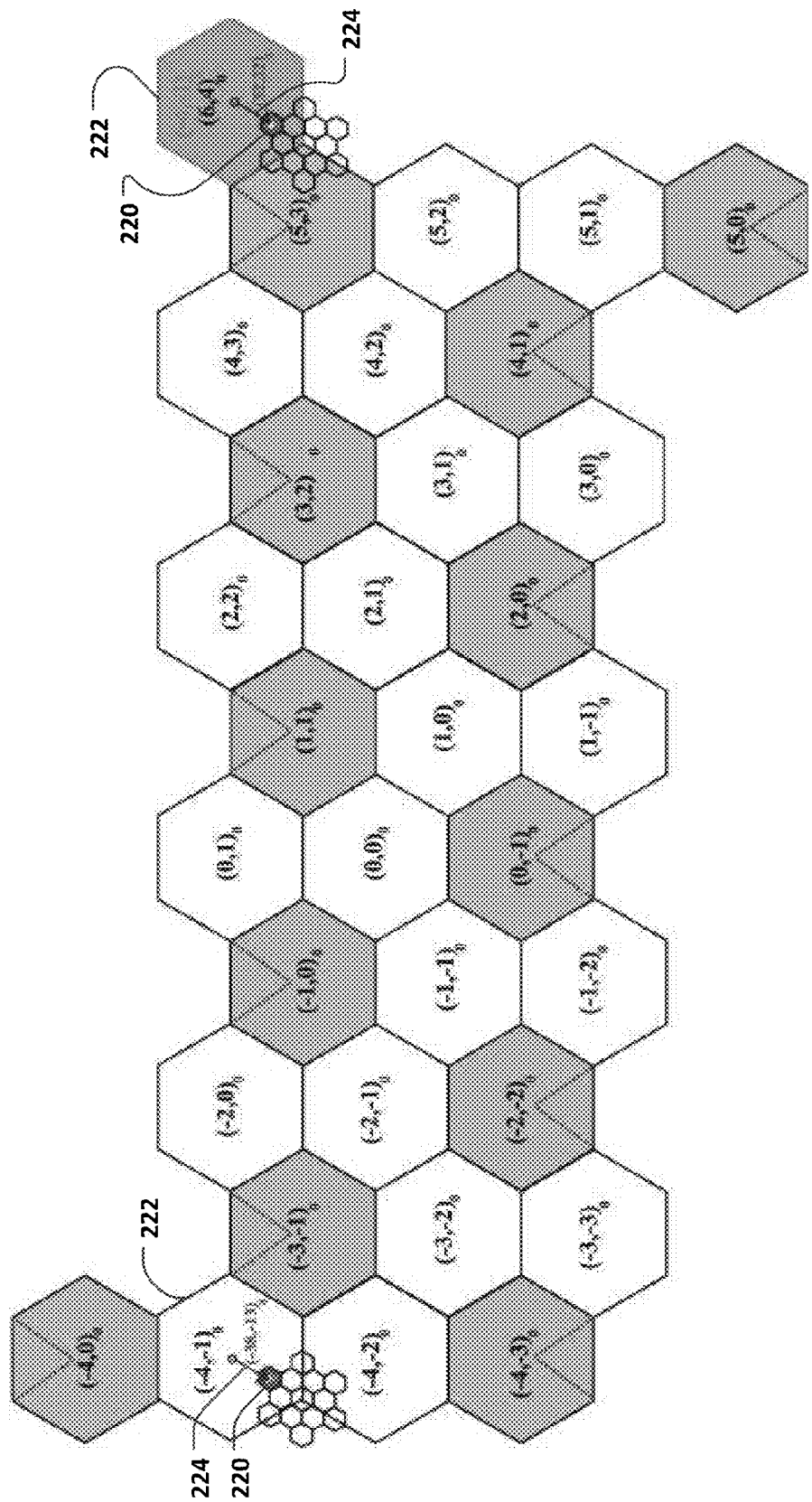
FIG. 29 is a schematic diagram illustrating an exemplary scenario where the location-based identifier for a cell may invalid due to fractals of PYXIS indexing.

FIG. 29 illustrates the above scenario. In this example, let cell 220 with the integer-based index $(52, 32)_4$ be the identifier $(i, j)_r$. This cell 220 is covered by cell 222 whose integer-based index is $(6,4)_0$. The cell 222 has a virtual position $(-4, -1)_0$. The vector 224 connecting the centroid of $(6,4)_0$ and centroid of $(52, 32)_4$ is determined. This vector is added to the centroid of $(-4, -1)_0$ and the index covering the resulting point at resolution r=4 is determined using the equations (8) and (9) to obtain the identifying value $(-38, -13)_4$.

Converting PYXIS Indexing to Integer-Based Indexing

In some cases, it may be necessary to convert a given cell with a integer-based identifying value to obtain a corresponding PYXIS identifying value. Consider a given integer-based index $(a, b)_r$ that is to be converted to corresponding PYXIX claim. It is possible to convert this integer-based index to a corresponding PYXIS index by recognizing the following two properties of the integer-based indexing described below. These properties help identify types A and B in the aperture 3 hexagon tessellations.

The first property of the integer-based indexing states that a cell with index $(c, d)_{r+1}$ is a centroid child if and only if $(c+d) \equiv 0 \pmod 3$.

Proof: Assume that $(c, d)_{r+1}$ is a centroid child. It must be demonstrated that $(c+d) \equiv 0 \pmod 3$. Given $(c, d)_{r+1}$ is a centroid child, it must have a single parent cell which shall be denoted as $(a, b)_{r-1}$. First consider the case where "r" is even. Based on the equation 12, it can be determined that:

$$(a,b)_r = (a+b, 2b-a)_{r+1} = (c,d)_{r+1}$$

The index of its centroid child for a cell with index $(a, b)_r$ is equal to $(c, d)_{r+1} = (a+b, 2b-1)_{r+1}$. As a result:

$$c+d=(a+b)+(2b-a)=3b$$

Clearly, $3b \equiv 0 \pmod 3$.

Similar reasoning could be applied for the odd resolution tessellations. Based on the equation (15), it can be determined that:

$$c+d=(2a-b, a+b)_{r+1}=3a$$

Clearly, $3a \equiv 0 \pmod 3$. Therefore every centroid cell with index $(c, d)_r$, r>1 satisfies the equation $(c+d) \equiv 0 \pmod 3$.

It is also necessary to show that any index $(c, d)_{r+1}$, r>1 satisfying $(c+d) \equiv 0 \pmod 3$ belongs to a centroid child. As such, it must be shown that combination of vectors creating an index $(c, d)_{r+1}$, r>1 such that $(c+d) \equiv 0 \pmod 3$, is a vector connecting the centroids of two centroid children. It is known that $(0, 0)_{r+1}$, r>1 is a centroid child of the cell $(0, 0)_r$ because their centroids are the same point at the origin.

All vectors $(g, h)_{r+1}$ that can be added to $(0,0)_{r+1}$ and relation $(g+h) \equiv 0 \pmod 3$ is still valid are the combinations of vectors $(1,2)_{r+1}$, $(2,1)_{r+1}$, $(1, -1)_{r+1}$, $(-1, 1)_{r+1}$, $(-1, -2)_{r+1}$, and $(-2, -1)_{r+1}$.

Consequently, if $(c+d) \equiv 0 \pmod 3$, it can be written as the combination of these six vectors. Based on the equations (10), (11), (13) and (14), the cells with the indices of these six vectors are centroid children of the cells with the indices of $(0, 1)_r$, $(1,0)_r$, $(1, 1)_r$, $(-1, 0)_r$, $(-1, -1)_r$ and $(0, -1)_r$ (e.g. see FIG. 27). As a result, every cell with an index $(c, d)_{r+1}$, r>1 such that $(c+d) \equiv 0 \pmod 3$ belongs to a centroid child.

The second property of the integer-based indexing states that a cell with index $(e, f)_{r+2}$ r>2 such that $e \equiv f \equiv 0 \pmod 3$ is a centroid child and creates seven children in the PYXIS method.

Proof: All vectors at resolution r can be written as the combination of vectors $(0, 1)_r$ and $(1, 0)_r$. It could be determined using the equation (16) that $(0, 1)_r = (0,3)_{r+2}$ and $(1, 0)_r = (3,0)_{r+2}$. Since all the vectors satisfying the relation $e \equiv f \equiv 0 \pmod 3$ are made from the combinations of $(0, 3)_{r+2}$ and $(3,0)_r$, it can be concluded that every cell with index satisfying $e \equiv f \equiv 0 \pmod 3$ has a parent including its centroid at resolution r. In other words, it is the centroid grandchild of a cell at resolution r. Therefore, at resolution r+1, there must be a cell that is the centroid child of a cell at resolution r and the parent of the cell at resolution r+2 satisfying $e \equiv f \equiv 0 \pmod 3$.

Consequently, every cell with an index $(e, f)_r$, r>1 and $e+f \equiv 0 \pmod 3$ is a centroid child, and every cell with the index $(e, 1)r$, r>1 such that $e+f \equiv 0 \pmod 3$ is a centroid child whose parent is also a centroid child and the parent of 7 children in PYXIS method.

The above two properties could be utilized to convert identifying values in integer-based indexing to PYXIS indexing. Given a cell with the integer-based index $(a, b)_r$, the traversal sequence necessary for PYXIS indexing will now be determined to find the corresponding PYXIS indexing. To find the corresponding PYXIS index for $(a, b)_r$, it is sufficient to find the direction vectors and transitions between $(a, b)_r$ and $(e, f)_0$, which is the PYXIS parent of $(a, b)_r$ at the first resolution.

From the two properties and the equations (12) and (15), if $(a+b) \equiv 0 \pmod 3$, then the parent of cell $(a, b)_r$ is $(c, d)_{r-1}$ such that:

$$(c, d)_{r-1} = \left(\frac{2a-b}{3}, \frac{a+b}{3}\right)_{r-1} \text{ where } r-1 \text{ is even} \quad (17)$$

$$(c, d)_{r-1} = \left(\frac{a+b}{3}, \frac{2b-a}{3}\right)_{r-1} \text{ where } r-1 \text{ is odd} \quad (18)$$

In order to find the sequence of PYXIS indexing from $(a, b)_r$, the elements of PYXIS indexing from the cell in the finest resolution to the first is determined. In every step, the current element of the PYXIS indexing is determined based on the transition vectors. When the first resolution (i.e. resolution "0") is reached, an identifying value such as a letter or number corresponding to the appropriate integer-based index at the first resolution is determined. The identifying value "0" in PYXIS indexing is associated with a transition between a centroid of a cell in the finer resolution tessellation to a cell in the adjacent coarser resolution tessellation. Consequently if $(a+b) \equiv 0 \pmod 3$, then the identifier "0" (or any other PYXIS identifier that represent this property) should be appended to the sequence of PYXIS indexing.

If $(a+b) \equiv 0 \pmod 3$, then this cell is a vertex child and has been indexed by a centroid child. Therefore there exists a cell in its neighbourhood with index $(c, d)_r$ such that $c \equiv d \equiv 0 \pmod 3$. Consequently, in order to find the parent of the cell with such index, its neighbourhood is searched and the vector connecting this cell to $(c, d)_r$ is added to the sequence for PYXIS indexing.

This process continues iteratively until the first resolution is reached. At the first resolution, we have a cell with index $(e, f)_0$. Based on FIGS. 19 and 25, the last entity of PYXIS indexing is the letter or element which is equivalent to $(e, f)_0$. The reverse of the sequence of the elements obtained by the above method is the PYXIS indexing.

Figure 30:
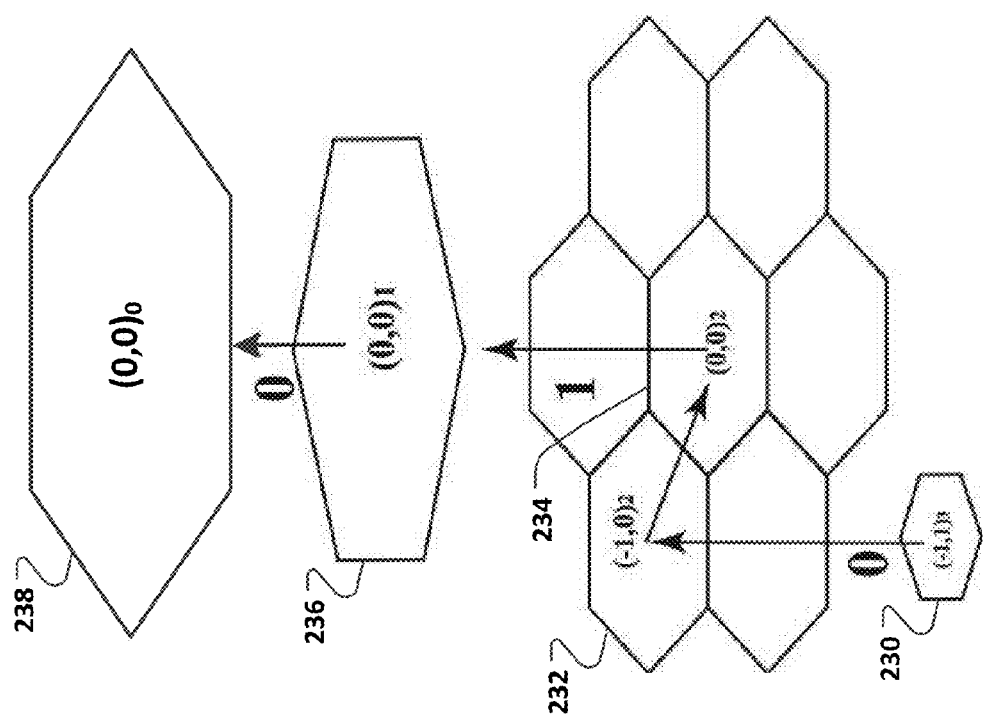
FIG. 30 is a schematic diagram illustrating how to determine a corresponding PYXIS identifier from a given integer-based identifier.

An exemplary determination of corresponding PYXIS index based upon a given integer-based indexing will now be described with reference to FIG. 30. The exemplary integer-based identifying value for the given cell 230 is $(-1, 1)_3$. The identifying value for the parent cell 232 of the given cell 230 can be determined based on the equation (17). In this case, the parent cell 232 has an identifying value of $(-1, 0)_2$. Therefore a zero must be appended to the PYXIS indexing. The cell $(-1, 0)_2$ is a vertex child and has a centroid child 234 in its neighbourhood with the index of $(0, 0)_2$. Based on FIG. 26, the element which must be attached is '1'. The equation (17) is utilized again to determine the parent cell 236 of the cell $(0,0)_2$, which has an index of $(0, 0)_1$. As the cell 234 is a centroid child and its parent is found, and a "0" is appended to the PYXIS identifier sequence. Similarly the parent cell 238 of cell 236 is determined using the equation (17) and another "0" is added to the PYXIS identifier sequence. In the next step, a corresponding PYXIS identifier for cell $(0,0)_0$ is determined. Based on FIGS. 19 and 25, the cell $(0, 0)_0$ is equivalent to "A". Therefore "A" is appended to the PYXIS identifier sequence. The sequence is reversed and the PYXIS index of A010 is then obtained. Accordingly, the integer-based index $(-1,1)_3$ corresponds to PYXIS index of A010.

Indexes of the Pentagons

In PYXIS indexing, pentagonal cells are indexed using a similar process to hexagonal cells. In this indexing, pentagons have five children that are indexed using their parents' indices appended by a number between 1 and 5. Correspondence between vectors and elements of PYXIS indexing for hexagons illustrated in FIG. 26 is similar for pentagons.

Figure 31:
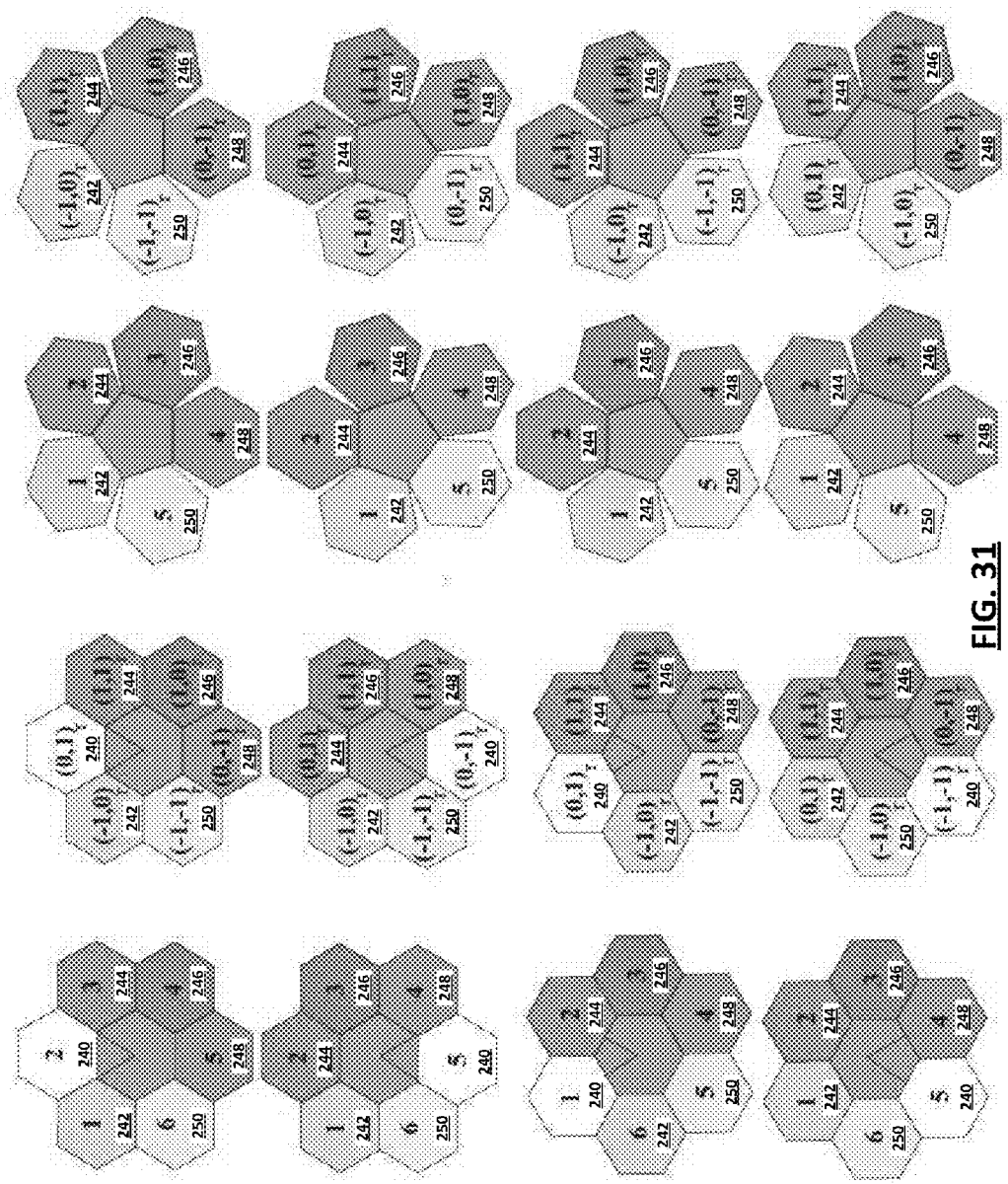
FIG. 31 is a schematic diagram illustrating conversion vectors for pentagonal faces represented by hexagons in 2D domain.

The vectors of hexagonal coordinates are not generally applicable for pentagons. However, the pentagon cells are treated as virtual hexagons on 2D domain (i.e. in the unfolded truncated icoshedral plane), it is possible to treat pentagons as hexagons and apply hexagonal vectors for them. However, using this vectors' adaptation, one of the vectors is undefined for pentagons. This undefined vector varies at odd and even resolution tessellations. It also differs for pentagons represented by a hexagon missing a top or bottom edge. In FIG. 31, undefined vectors are illustrated using a white hexagon 240. Note that for hexagons representing the odd resolution, half of two edges are missed. Since both located vectors on these two edges result in partial hexagons of the same full hexagon on 3D truncated icosahedron, one of them may be arbitrarily chosen. Therefore, for odd resolution pentagons represented by a hexagon missing a top edge, there is no difference between $(0, 1)_r$ and $(1, 1)_r$. However, for the consistency of presentation, identifier $(0, 1)_r$ is selected.

Referring now to FIG. 31, illustrated therein are the exemplary identifier digits of pentagons and hexagon with a missing edge. Hexagons 242, 244, 246, 248, 250, shown in the first column of FIG. 31 are equivalent to the hexagons with the same reference numeral in the third column. Hexagons 240 represents the undefined vectors and thus they do not have a corresponding hexagon in the pentagons of the third column. For example, if after converting a integer-based indexing, a PYXIS index such as "J03" is obtained, a correction modifying "J03" to "J02" is applied based upon the first row of FIG. 31. This is because "3" in a hexagonal PYXIS index at an even resolution tessellation correspond to "2" in a pentagonal PYXIS index.

Therefore, to convert a PYXIS indexing starting with an element representing a pentagon at the first resolution such as 'J' in FIG. 25, instead of using vectors of FIG. 26, the vectors of FIG. 31 are utilized. For example, a PYXIS index "J04" has an equivalent integer-based indexing with index $(9,5)_2$. "J" represents $(3,2)_0$ and "J0" is equal to $(5, 1)_1$, which is still a pentagon. The "4" in "J04" refers to one step going down and adding vector $(0, -1)_2$ to the result. Therefore, the result is $(9, 6)_2+(0, -1)_2=(9, 5)_2$.

To find the PYXIS indexing generated by a pentagon from a given integer-based indexing, the converted PYXIS indexing is first located. Then it is determined whether it is indexed by a pentagon or not. If it has been indexed by a pentagon, a correction is applied to the index. This requires finding the first non-zero element appended to a pentagon's index. This element is a number between 1 and 6. This number is replaced with its appropriate number between 1 and 5.

Figure 32:
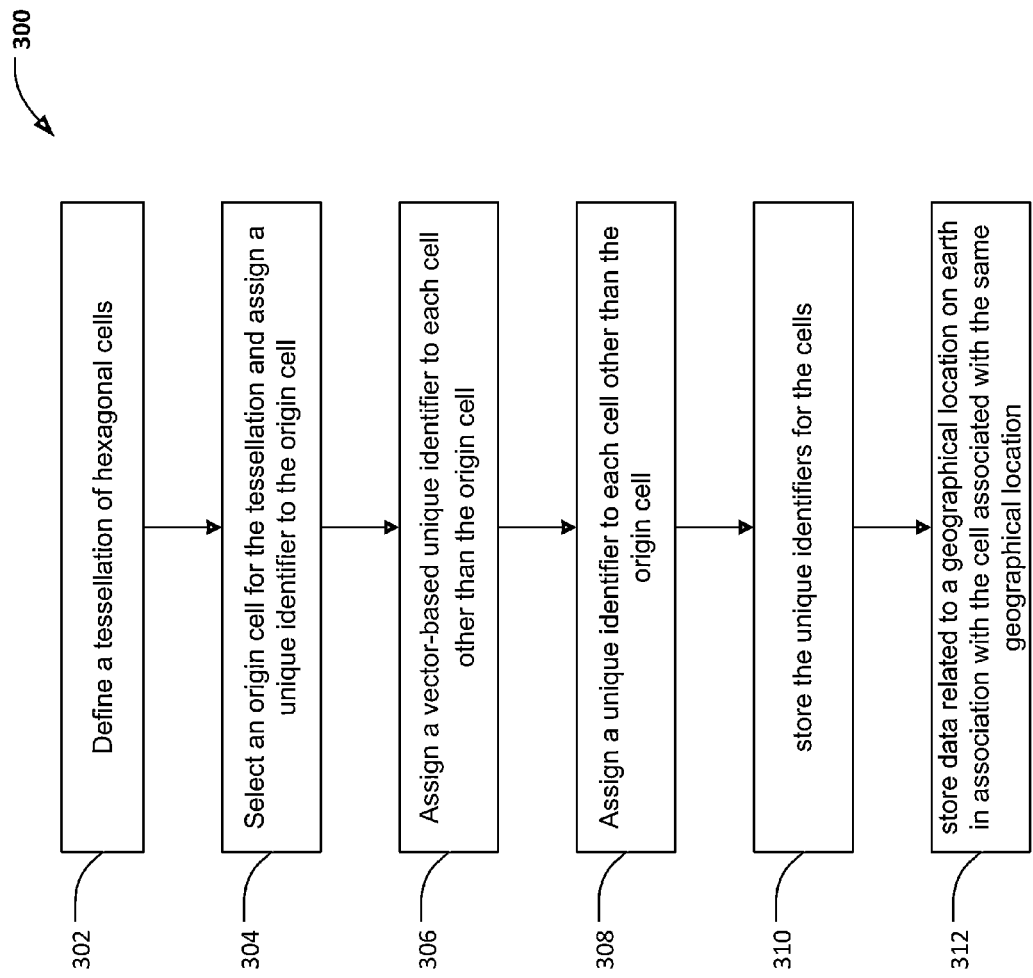
FIG. 32 is a flow chart illustrating a method for storing data related to geographical locations according to some embodiments.

Referring now to FIG. 32, illustrated therein is a method 300 for identifying cells in a geographical information system according to some other embodiments. The server 52 or one or more another processor may be configured to execute the method 300.

At step 302, a hierarchical series of additional tessellations of successive resolutions is defined. Each resolution is indicative of an area of each cell in the tessellation of the resolution. Each tessellation has a first axis and a second axis. The first axis is perpendicular to a first side of the hexagonal cells and the second axis is 120 degrees from the first axis and is perpendicular to a second side of the hexagonal cells.

At step 304, an origin cell for each of the additional tessellations is selected. The origin cell has the same centroid as the origin cell in the tessellation of a previous resolution.

At step 306, a unique identifier is assigned to each of the origin cells. The unique identifier for each of these cells includes the identifier for the origin cell in the tessellation of the previous resolution and a resolution value indicative of the resolution of each origin cell.

At step 308, a unique identifier is assigned to each cell other than the origin cell. The unique identifier for each of these cells includes a first vector value, a second value, and a resolution value. The first vector value and the second vector value are indicative of the location of the cell to the origin cell in the same tessellation along the first and second axis respectively. The resolution value is indicative of the resolution of the cell.

At step 310, the unique identifiers for the cells are stored in the data storage device.

At step 312, data related to a geographical location on Earth are stored in association with the cell associated with the same geographical location in the data storage device.

In some embodiments, hexagonal indexing for various refinements may be conducted as described in the section entitled "Multiresolution Hexagonal Coordinate System" hereinbelow. This section also describes packing of hexagonal cells using diamonds and unfolding different polyhedrons onto 2D domains.

Multiresolution Hexagonal Coordinate System

In this section, we present our hexagonal coordinate system and describe how it is used for indexing. We then establish a hierarchical relationship between resolutions of the hexagonal refinements.

Multiresolution Relation Among Hexagons

To define a multiresolution relationship between hexagonal cells, we first index children at fine resolutions and then define algebraic relationships between hexagonal coordinates at successive resolutions. We use the concept of hexagonal lattices to define such a relationship. Each type of hexagonal refinement can define a coordinate system for a fine hexagonal lattice. We find the algebraic relationship of the coarse and fine coordinate systems and then show how by smartly choosing coordinate systems for hexagons, multiresolution relationships are obtained that are just scaling matrices running in constant time.

When a refinement is applied to a lattice $L_0$, a new lattice $L_1$ is created by a transformation/$T_{ref}$ which can be a combination of scaling, rotation, and translation ($L_0 = T_{ref} L_1$). A coordinate system for $L_1$ can be defined by applying the same transformation ($T_{ref}$) to the coordinate system of $L_0$. FIG. 33(a) illustrates the application of the dual 1-to-4 refinement and resulting lattices. In this case, $T_{ref}$ simply scales by ½. To achieve integer coordinates for centroids of lattice $L_1$, unit vectors of $L_1$ have half the length of $L_0$. This results in the coordinate system illustrated in FIG. 33(b). Notice coordinate systems of two successive resolutions have the same origin O.

Figure 33:
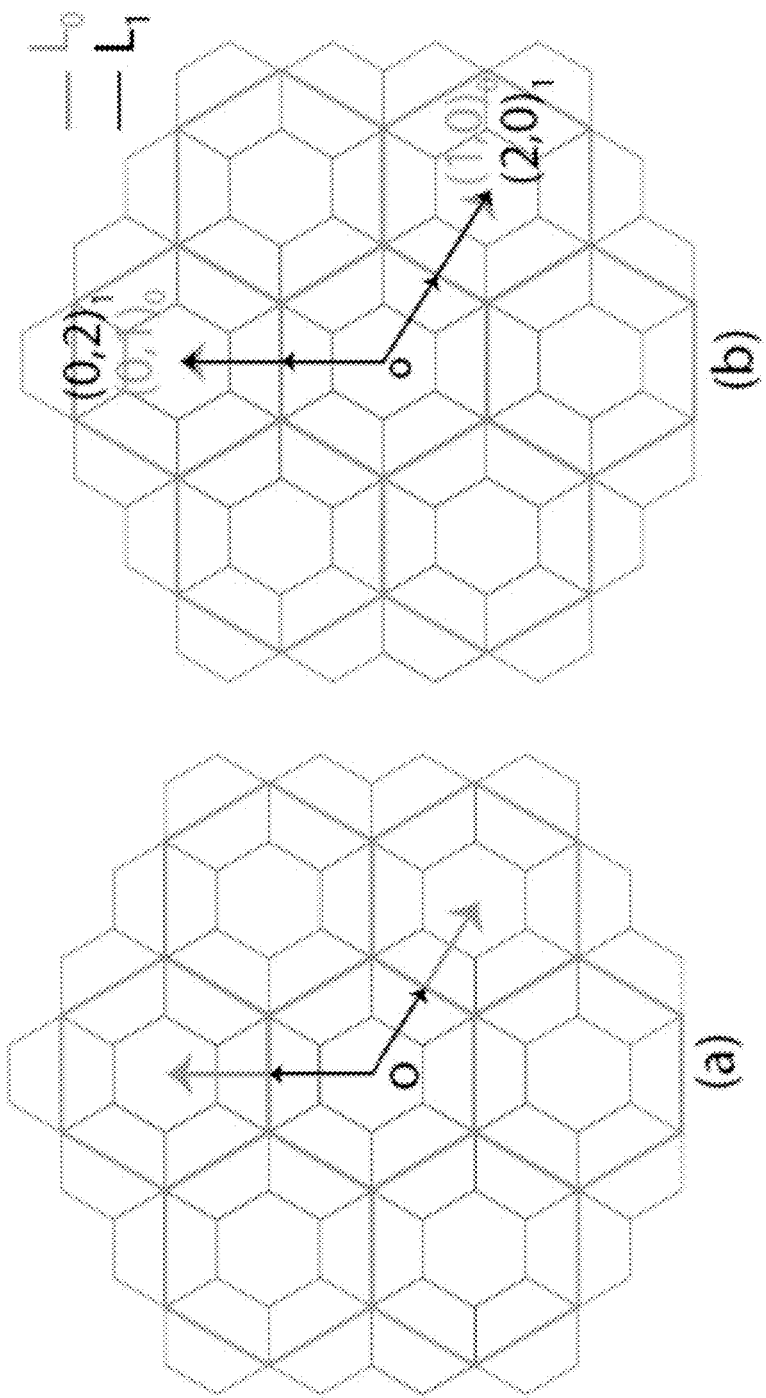
FIG. 33 is a schematic diagram that (a) shows coordinate systems of lattices $L_0$ and $L_1$ at two successive resolutions, and (b) indicates that $(1,0)_0=(2,0)_1$, $(0,1)_0=(0,2)_1$.

In FIG. 33, (a) shows coordinate systems of lattices $L_0$ and $L_1$ at two successive resolutions, and (b) indicates that $(1,0)_0 = (2,0)_1$ $(0,1)_0 = (0,2)_1$.

By indexing hexagons this way, some hexagons in $L_1$ get the same index as others in $L_0$. To distinguish hexagons at different resolutions, a subscript is added to each index indicating its resolution.

To establish a multiresolution relationship between hexagons, the index of the reference child of a hexagon with index $(a,b)_0$ is found. To do so, we find equivalent vectors to basis vectors $(1,0)_0$ and $(0,1)_0$ of $L_0$ at the next resolution $L_1$. Let $(1,0)_0 = (m,n)_1$ and $(1,0)_0 = (p,q)_1$. Then, in which R is the refinement matrix. We can generalize this formula to k by applying $R^k$ to $(a,b)_0$.

For instance, in dual 1-to-4 refinement as illustrated in FIG. 1(b), $(1,0)_0 = (2,0)_1$ and $(0,1)_0 = (0,2)_1$. Thus, $$R = \begin{pmatrix} 2 & 0 \\ 0 & 2 \end{pmatrix}$$

and consequently $(a,b)_0 = 2^k (a,b)_k$ or in general $(a,b)_r = 2^k (a,b)_{r+k}$. In the following, we discuss how to find matrix R for the other hexagonal refinements.

Dual 1-to-3 Refinement

In 1-to-3 refinement, hexagons are scaled by $$\frac{1}{\sqrt{3}}$$

and rotated by $$\frac{\pi}{6}.$$

Figure 34:
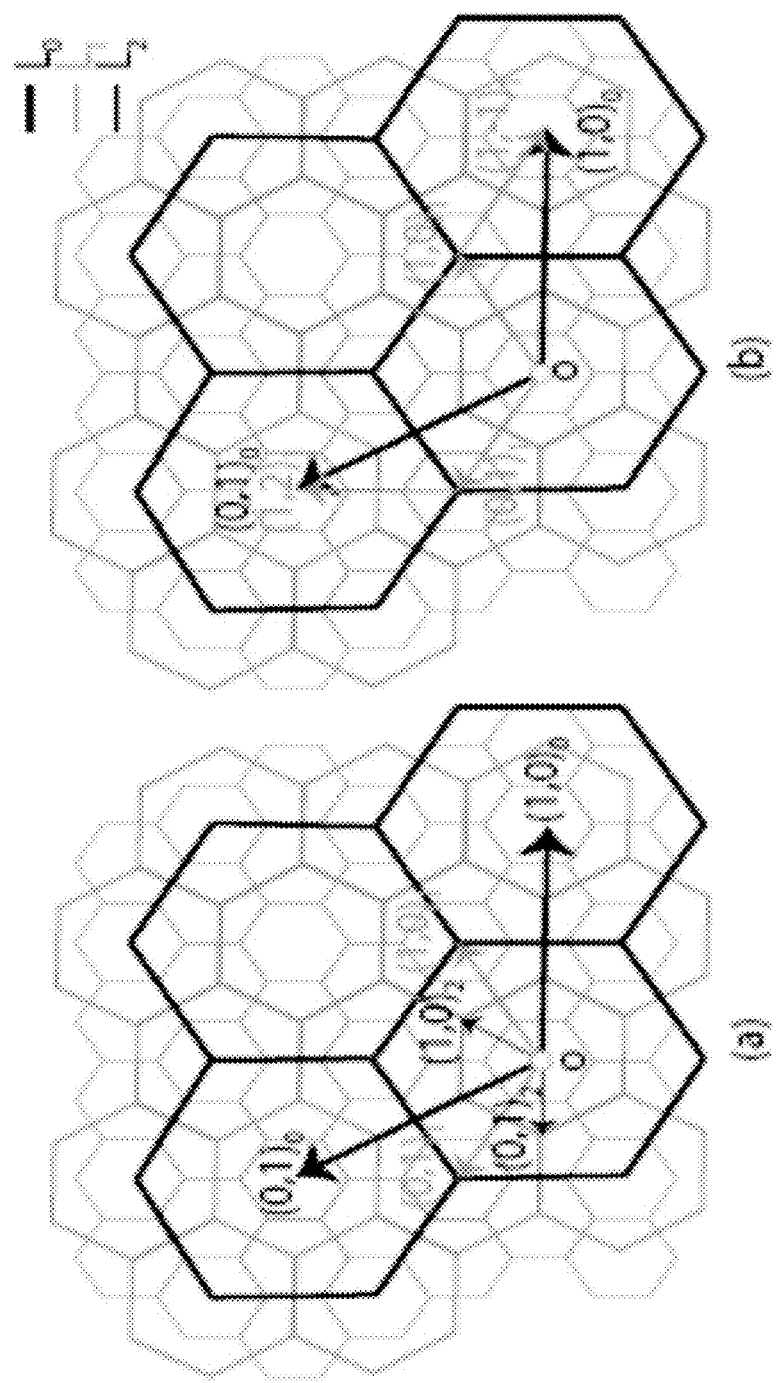
FIG. 34 is a schematic diagram that (a) shows the coordinate system of lattices at three successive resolutions of the dual 1-to-3 refinement, where O is the origin, and (b) shows that a combination of vectors at $L_1$ makes $(1,0)_0$ and $(0,1)_0$.

If we consider the same origin for two successive resolutions and apply the $$T_{ref} = \frac{1}{\sqrt{3}} rot(\frac{\pi}{6})$$

to the coordinate system, we can define the basis vectors for a fine resolution. Then, we again find the corresponding vectors to $(1,0)_0$ and $(0,1)_0$ in $L_1$. As illustrated in FIG. 34, $(1,0)_0 = (1,-1)_1$ and $(0,1)_0 = (1,2)_1$. Thus, $$R = \begin{pmatrix} 1 & 1 \\ -1 & 2 \end{pmatrix}$$

and in general, $(a,b)_r^T = R^k (a,b)_{r+k}^T$.

In FIG. 34, (a) shows the coordinate system of lattices at three successive resolutions of the dual 1-to-3 refinement, where O is the origin, and (b) shows that a combination of vectors at $L_1$ makes $(1,0)_0$ and $(0,1)_0$.

Figure 35:
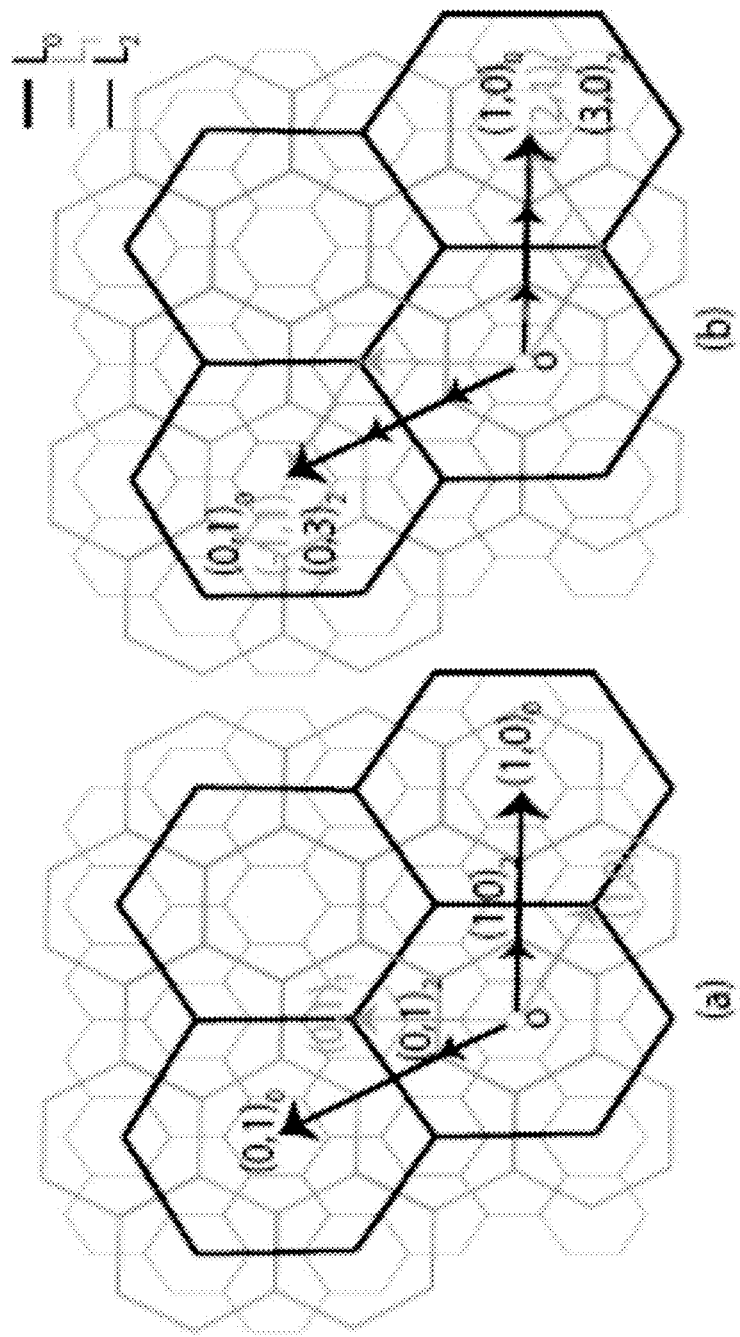
FIG. 35 is a schematic diagram that (a) shows $L_0$, $L_1$, and $L_2$ and their coordinate systems, where O is the origin, lattices and coordinate systems have similar color and thickness and (b) shows that a combination of vectors at $L_1$ and $L_2$ makes $(1,0)_0$ and $(0,1)_0$.

Note that choosing the hexagonal coordinate systems can be arbitrary. Different coordinate system for each resolution leads to different basis functions and consequently a different R. For instance, an alternative for dual 1-to-3 refinement is to choose a coordinate system for $L_2$ aligned with the coordinate system of $L_0$ (FIG. 35). In this way, we attain two different matrices in transitioning between even and odd resolutions ($R_{e \to o}$), and odd and even resolutions ($R_{o \to e}$). Such a coordinate system results in $(1,0)_0 = (2,1)_1$ $(0,1)_0 = (-1,1)_1$, $(1,0)_1 = (1,-1)_2$, and $(0,1)_1 = (1,2)_2$.

In FIG. 35, (a) shows $L_0$, $L_1$, and $L_2$ and their coordinate systems, where O is the origin, lattices and coordinate systems have similar color and thickness and (b) shows that a combination of vectors at $L_1$ and $L_2$ makes $(1,0)_0$ and $(0,1)_0$.

If we choose the coordinate systems of even and odd resolutions aligned with $L_0$ and $L_1$ respectively, with the same origin, we have:

$$R_{o \to e} = \begin{pmatrix} 1 & 1 \\ -1 & 2 \end{pmatrix}, \text{ and } R_{e \to o} = \begin{pmatrix} 2 & -1 \\ 1 & 1 \end{pmatrix}.$$

Notice that $$R_{o \to e} R_{o \to e} = \begin{pmatrix} 3 & 0 \\ 0 & 3 \end{pmatrix}$$

which is in fact just a scaling factor. Therefore, by cleverly choosing the coordinate systems illustrated in FIG. 34, after two levels of refinement the indices of hexagons are scaled by three and rotation is not needed anymore. Having scalar factors instead of matrices for hierarchical transition speeds up the computation process since we can discard matrix multiplications. Consequently, to compute the index of the reference child we simply use the following:

$$(a, b)_r = \begin{cases} 3^{\frac{k}{2}} (a, b)_{r+k}^T & \text{if } \lfloor \frac{k}{2} \rfloor = \frac{k}{2} \\ 3^{\frac{k-1}{2}} R_{e \to o} (a, b)_{r+k}^T & \text{otherwise} \end{cases} \quad (1)$$

Dual 1-to-7 Refinement 1-to-7 refinement introduces $$a\sin\left(\sqrt{\frac{3}{28}}\right) \approx 19°$$

rotation and $\sqrt{7}$ scaling in the hexagonal lattice. Two types of lattices can be generated by 1-to-7 refinement when $L_1$ is rotated by $\pm 19°$. We call the refinement matrix with $+19°$ rotation, $R_+$ and the refinement matrix with $-19°$, $R_-$.

Figure 36:
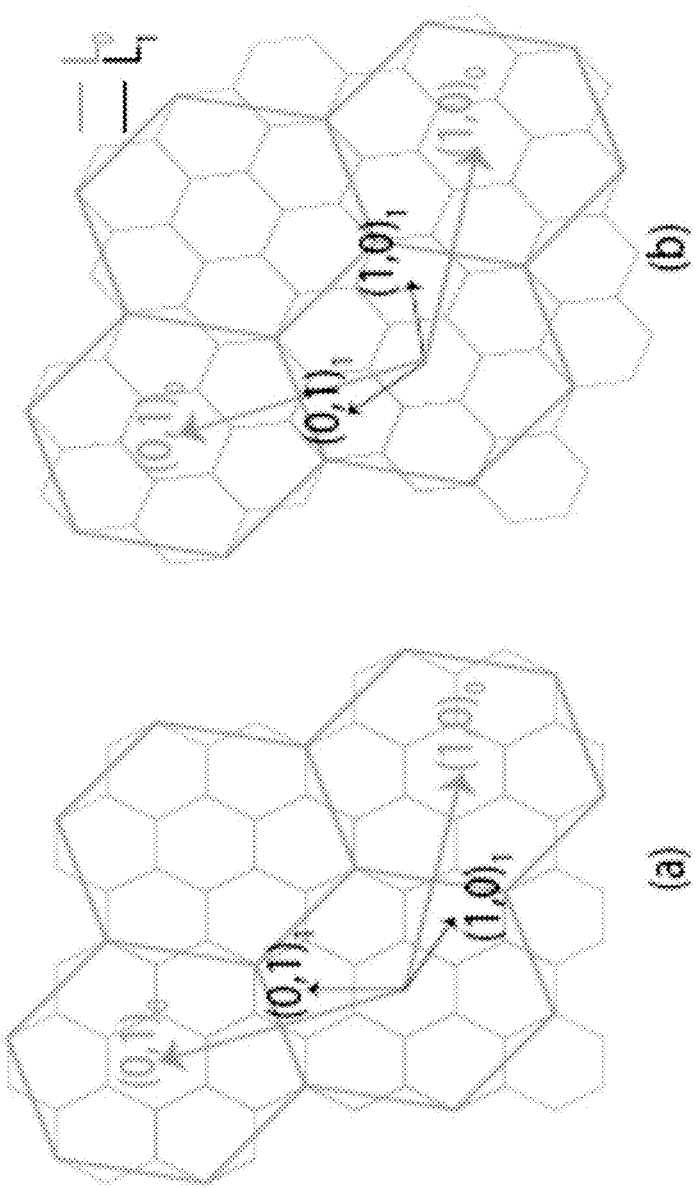
FIG. 36 is a schematic diagram that (a) shows matrix $R_-$, and (b) shows matrix $R_+$.

In FIG. 36, (a) shows matrix $R_-$, and (b) shows matrix $R_+$.

If we apply the transformation $T_{ref} = \sqrt{7} rot(\pm 19°)$ to the axes of coordinate systems, matrices $R_+$ and $R_-$ are defined. As illustrated in FIG. 36, $(1,0)_0=(2,-1)_1$ and $(0,1)_0=(1,3)_1$ in R. As a result, $$R_+ = \begin{pmatrix} 2 & 1 \\ -1 & 3 \end{pmatrix} R_-$$

is also constructed by relations $(1,0)_0=(3,1)_1$, and $(0,1)_0=(-1,2)_1$. Then $$R = \begin{pmatrix} 3 & -1 \\ 1 & 2 \end{pmatrix}$$

with this approach, we have $(a,b)_r^T = R_+^k(a,b)_{r+k}^T$ or $(a,b)_r^T = R_-^k(a,b)_{r+k}^T$. Lattices resulted from $R_+$ or $R_-$ do not align with $L_0$ since $k \times 19° \neq 360°$ when $k \in Z$ and $k \neq 0$ or 360. Consequently, it is not possible to extract a scalar from the multiplications of refinement matrices $R_+$ and therefore handling multiresolution queries at resolution r needs O(r) matrix multiplications. However, notice that $$R_+R_- = R_-R_+ = \begin{pmatrix} 7 & 0 \\ 0 & 7 \end{pmatrix}$$

which is just a scaling factor without rotation. This is due to the cancellation of −19° and +19° rotations. As a result, if we apply 1-to-7 refinements with positive and negative rotations alternatively, we can get the same scaling factor for the refined resolutions and have aligned axes between alternating resolutions (see FIG. 37). Discarding the matrix multiplication, multiresolution relationships are simplified to the following closed forms that run in constant time:

$$(a,b)_r = \begin{cases} 7^{\frac{k}{2}}(a,b)_{r+k}^T & \text{if } \lfloor \frac{k}{2} \rfloor = \frac{k}{2} \\ 7^{\frac{k-1}{2}}(R_+ \vee R_-)(a,b)_{r+k}^T & \text{otherwise} \end{cases} \quad (2)$$

Figure 37:
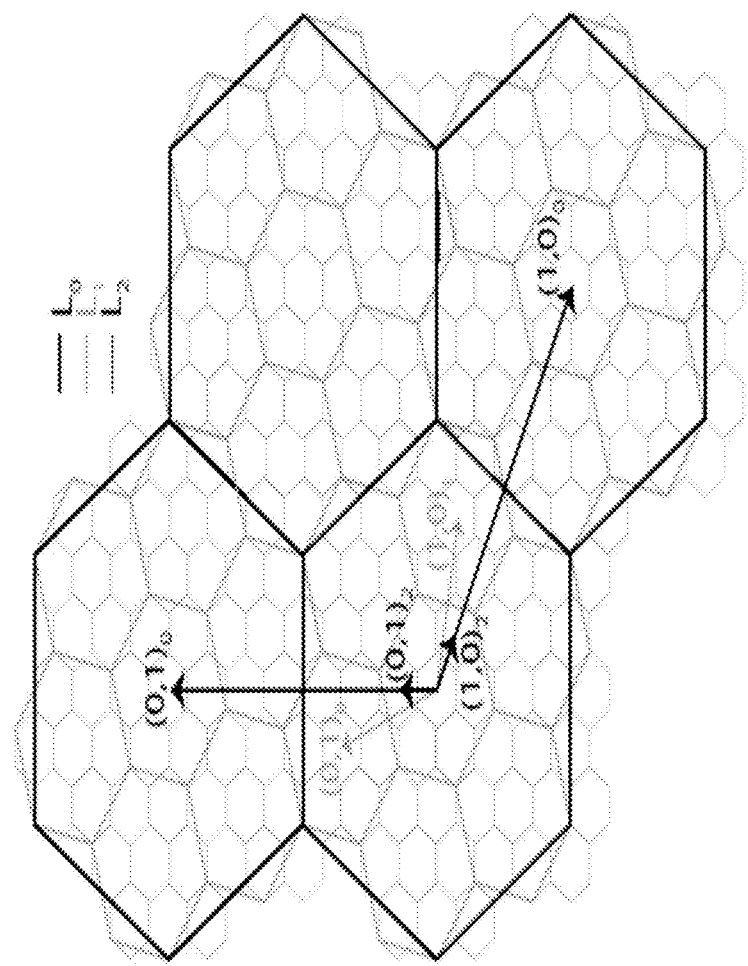
FIG. 37 is a schematic diagram that shows that applying one step of $R_+$ along with one step of $R_-$ leads to aligned coordinate systems for $L_0$ and $L_2$.

FIG. 37 shows that applying one step of $R_+$ along with one step of $R_-$ leads to aligned coordinate systems for $L_0$ and $L_2$.

In general, for a refinement with factor of i, we can alternately apply a 1-to-i refinement having +θ rotation and −θ rotation. This way, after two resolutions, we only have i scaling and no rotation. Therefore, multiresolution relationships can be simplified to scalar multiplications running in constant time instead of matrix multiplications running linearly based on the resolution.

Primal 1-to-3 Refinement

Figure 38:
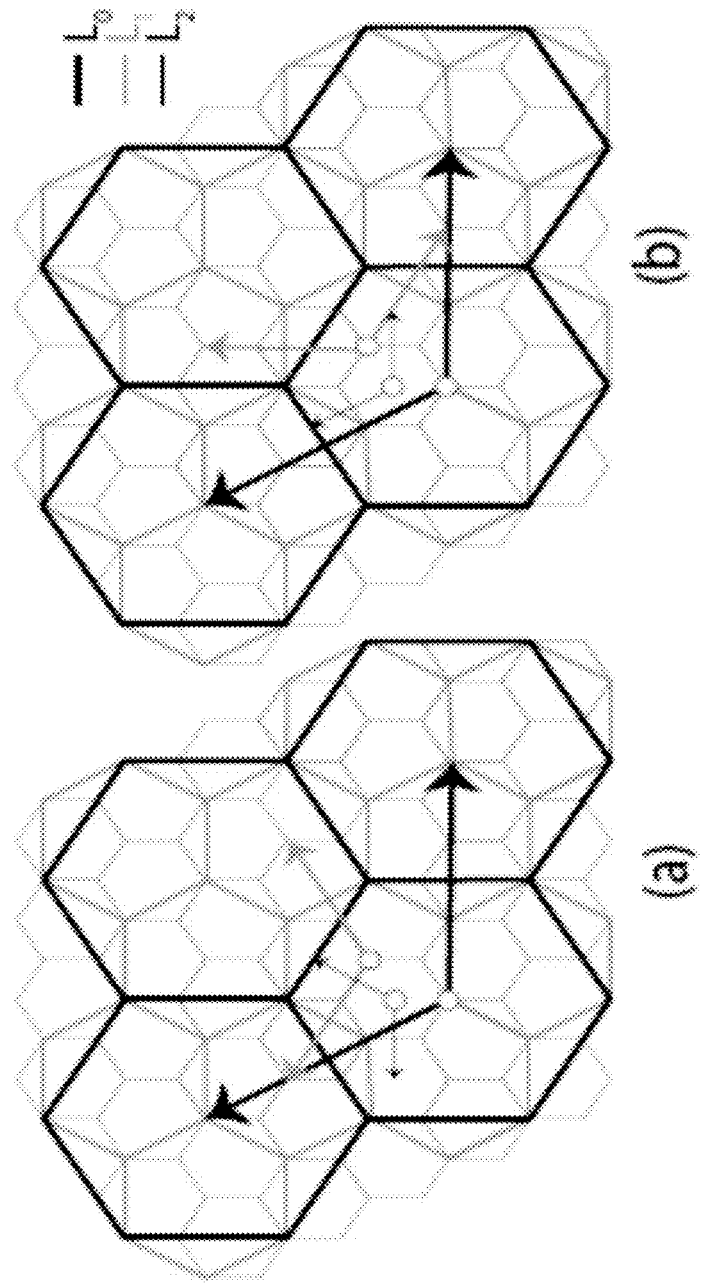
FIG. 38 is a schematic diagram that (a) shows that $T_{ref}$ is applied on the coordinate systems. and (b) shows that after two resolutions, coordinates are aligned.

In primal refinements, centroids of hexagons at two successive resolutions are not aligned (see FIG. 38). As a result, their reference child is not the centroid child. In these refinements, we choose the reference child as one of the fine hexagons whose centroid falls in the coarse hexagon. The same matrices proposed in the sub-section entitled "Dual 1-to-7 Refinement" give the index of the reference child. Consequently, from the location of the origin, which is the centroid of the reference child of $(0,0)_r$ and the refinement matrix R, the indices of hexagons' children at resolution r+1 can be computed.

To align lattices $L_0$ and $L_1$ of a primal 1-to-3 refinement, a translation is incorporated as illustrated in FIG. 38. As a result, a translation difference exists between the origin of $L_0$ and $L_1$. Using a predetermined pattern for choosing the origin helps to find a closed form for computing the locus of a given resolutions.

For instance, we choose $$\frac{1}{3}(1,1)_r$$

for the origin of resolution r+1 when r is even, and $$\frac{1}{3}(-1,-1)_r$$

for odd r. FIG. 38(b) illustrates such origins for $L_1$ and $L_2$. This way, we have the origin at $$\frac{1}{3}[(1,1)_0 + (-1,-1)_1 + (1,1)_2 + \ldots + (\pm 1, \pm 1)_{0/1}]$$

for $r \geq 1$. Since $$(1,1)_{2i} = \frac{1}{3^i}(1,1)_1$$

and similarly $$(-1,-1)_{2i} = \frac{1}{3^i}(-1,-1)_1.$$

We have $$\frac{1}{3}\left[(1,1)_0 + (-1,-1)_1 + \frac{1}{9}(1,1)_0 + \frac{1}{9}(-1,-1)_1 + \ldots + \frac{1}{3^r}(\pm 1, \pm 1)_{0/1}\right].$$

From the sum of the first n terms of this geometric series, the locus of the origin is $$\frac{1}{3}\left[\frac{1-\left(\frac{1}{9}\right)^{n+1}}{1-\frac{1}{9}}(1,1)_0 + \frac{1-\left(\frac{1}{9}\right)^{r-n}}{1-\frac{1}{9}}(-1,-1)_1\right], \quad n = \lceil \frac{r}{2} \rceil.$$

This is one possibility for determining the origin of the next resolutions. Alternative origins may be leads to different but closed form formulae.

Now referring to FIG. 38, FIG. 38(a) $T_{ref}$ is applied on the coordinate systems. FIG. 38(b) after two resolutions, coordinates are aligned.

Primal 1-to-4 Refinement

In the primal 1-to-4 refinement, centroids of hexagons become aligned after two resolutions. Therefore, it is possible to have one origin for odd resolutions and one for even resolutions. Let the origin of even resolutions be located at $(0,0)_0$. Then, the origin of odd resolutions are located at $$\left(\frac{1}{6}, \frac{1}{3}\right)_0.$$

Since the factor of refinement of primal and dual 1-to-4 refinement is the same, the same matrix $$R_- = \begin{pmatrix} 2 & 0 \\ 0 & 2 \end{pmatrix}$$

is used. Applying R to $(a,b)_r$ gives the index of $(a,b)_r$'s child whit a translation difference of $$\left(\frac{1}{6}, \frac{1}{3}\right)_0$$

with the centroid of $(a,b)_r$ (FIG. 39(a)).

Figure 39:
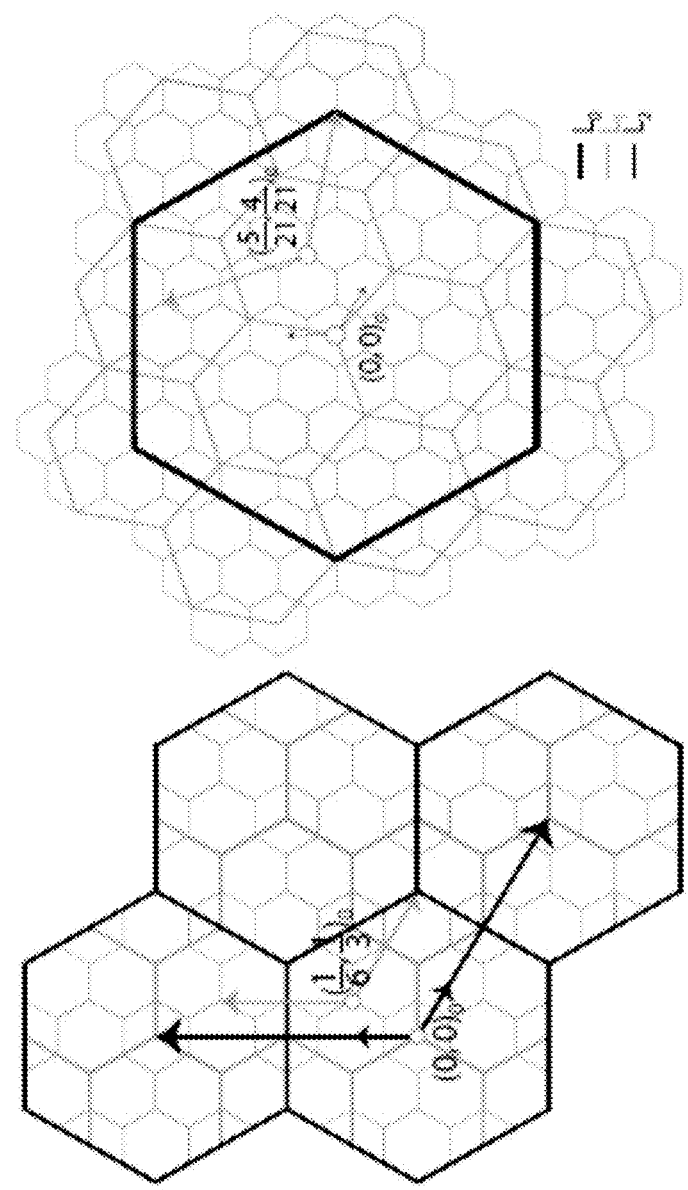
FIG. 39 is a schematic diagram that (a) shows primal 1-to-4 refinement and its coordinate systems in three successive resolutions, and (b) shows primal 1-to-7 refinement and its coordinate systems in three successive resolutions.

In FIG. 39, (a) shows primal 1-to-4 refinement and its coordinate systems in three successive resolutions. After two resolutions centroids of hexagons are aligned. (b) shows primal 1-to-7 refinement and its coordinate systems in three successive resolutions. After two resolutions centroids of hexagons are also aligned.

Primal 1-to-7 Refinement

Similar to primal 1-to-4 refinement, centroids of hexagons in dual 1-to-7 refinement are aligned after two resolutions (FIG. 39(b)). Therefore, we simply choose $(0,0)_0$ as the origin of even resolutions and $$\left(\frac{5}{21}, \frac{4}{21}\right)_0$$

for odd resolutions. We apply the same matrix discussed in the sub-section entitled "Dual 1-to-7 Refinement" on a hexagon with index $(a,b)_r$ to get its child with a translation difference of $$\left(\frac{5}{21}, \frac{4}{21}\right)_r$$

with $(a,b)_r$'s centroid.

Reverse Relations

For any refinement, a matrix R exists and issued for finding the reference child of a hexagon at subsequent resolutions. A relation to traverse back through the resolutions and find the parent of a hexagon is desired.

Figure 40:
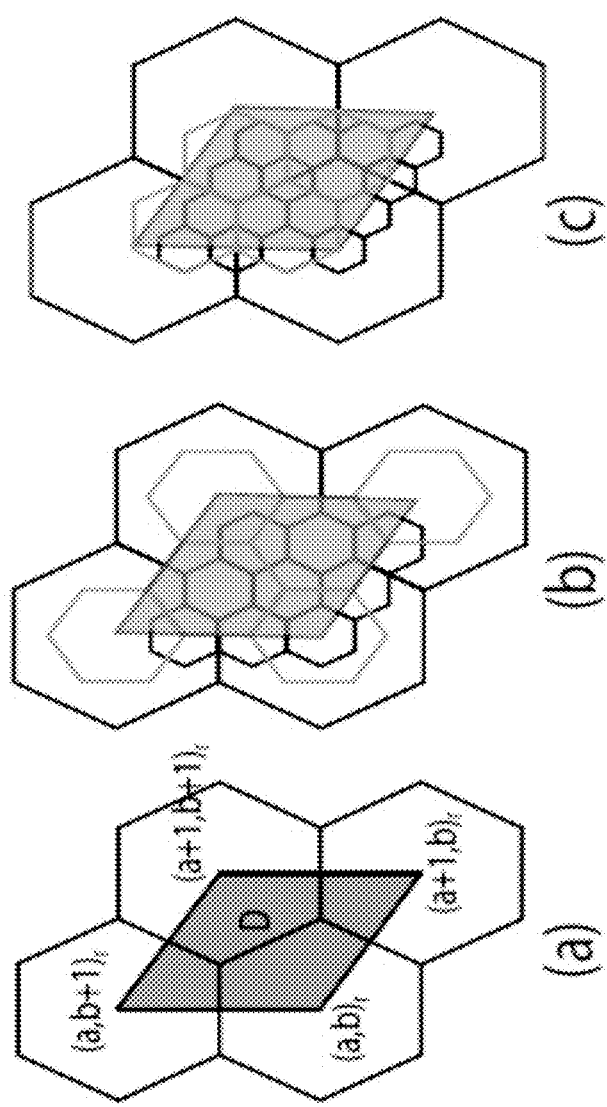
FIG. 40 is a schematic diagram that (a) shows Diamond D is at $(a,b)_r$, and (b), (c) show the Hexagons are covered by D in dual 1-to-3 and primal 1-to-4 refinements respectively for two successive resolutions.

If we apply $R^{-1}$ to the index of a reference child of hexagon $(a,b)_r$, the result would be $(a,b)_r$. However, if we apply $(R^{-1})^k$ on an arbitrary hexagon $(c,d)_{r+k}$, it gives index $(á,'b)_r$ in which á and 'b are not necessarily integers. To obtain a valid integer index at resolution r, we use $([á], ['b])_r=(a,b)_r$. Due to the application of the floor function, all hexagons falling in diamond D are mapped to $(a,b)_r$ as illustrated in FIG. 40. This leads to a diamond based hierarchy for hexagonal cells.

We consider all the hexagons that are covered by a diamond length at $(a,b)_r$ as the children of a hexagon with index $(a,b)_r$. FIG. 40 illustrates such a diamond and hexagons that it covers for dual 1-to-3 and primal 1-to-4 as two examples. This type of hierarchy is easier to handle rather than other fractal based hierarchies due to its simple boundary and coverage. We use diamonds for covering the surface of initial polyhedra and a diamond-based hierarchy to index subsequent resolutions.

In FIG. 40, (a) shows Diamond D is at $(a,b)_r$, and (b), (c) show the Hexagons are covered by D in dual 1-to-3 and primal 1-to-4 refinements respectively for two successive resolutions.

Indexing Polyhedra

So far, we have discussed how to index planar hexagons on lattices resulting from different types of hexagonal refinements. To apply this indexing method to polyhedra, a 2D coordinate system must be defined for the polyhedron. Therefore, we need to unfold the polyhedron.

From existing polyhedra, refining the tetrahedron, octahedron, icosahedron, and truncated icosahedron creates regular hexagons. The unfolded pattern of the truncated icosahedron is also created using the pattern of icosahedron since truncated icosahedron is actually the refined version of an icosahedron. As a result, we provide the 2D patterns of tetrahedron, octahedron, and icosahedron in this section and we discuss how our proposed indexing works for them.

Polyhedra can be unfolded in many ways. However, any refined polyhedron creates singular (non-hexagonal) faces that deviates from a regular lattice based indexing. To avoid such an issue, the unfolding is selected to ensure that these singular faces are located on the boundary. This way, we treat them like hexagons while tracking their indices for taking care of their irregular behaviors.

Each polyhedron can be divided into diamonds by joining two adjacent equilateral triangles corresponding to the faces of the polyhedron. Each diamond has its own coordinate system. The coordinate system of diamond is used to define its boundary. It is desired to have hexagonal coordinate systems aligned with the coordinate system of diamonds since it eases further calculations such as neighborhood finding of hexagons at boundaries.

Figure 41:
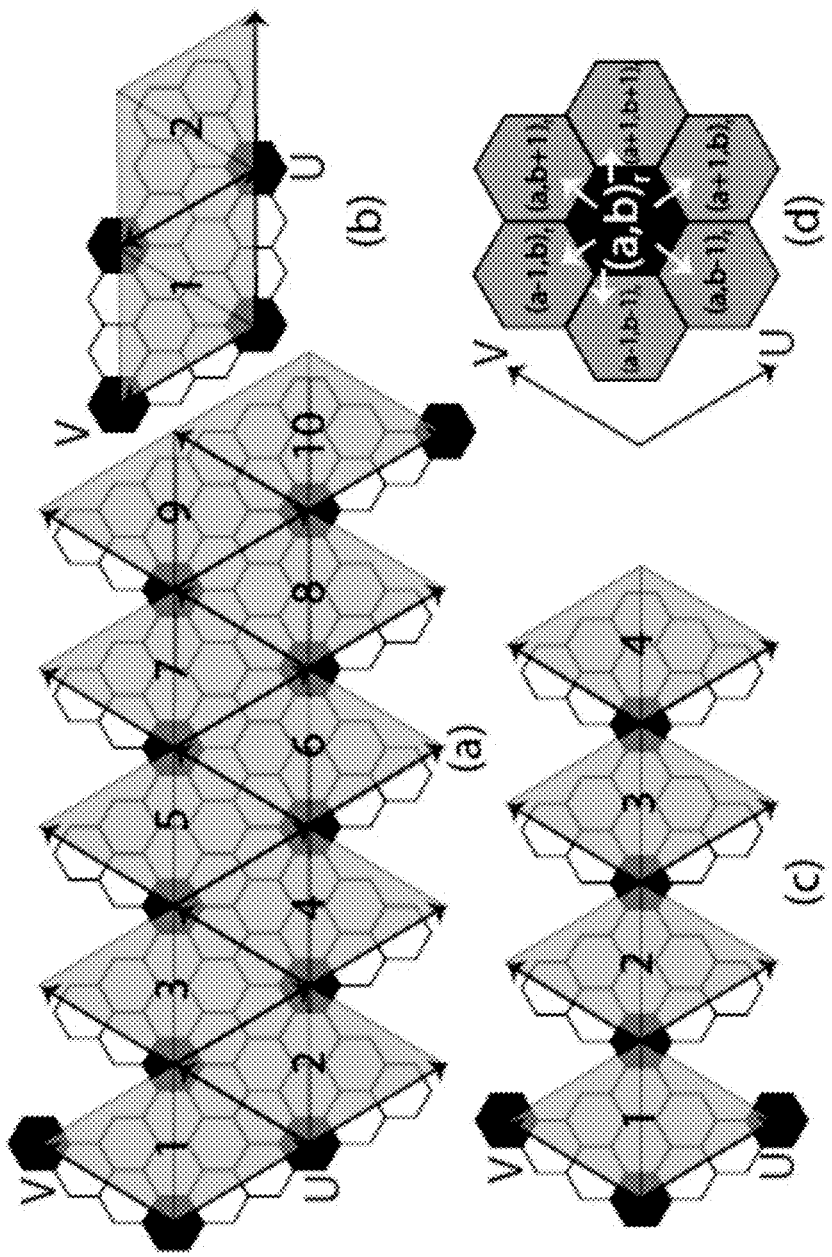
FIG. 41 is a schematic diagram that shows unfolded patterns of the icosahedron (a), octahedron (b) and tetrahedron (c), and that (d) shows hexagon $(a,b)_r$ and its neighborhood vectors based on the illustrated U-V coordinate system.

The initial polyhedron is very coarse for the initial resolution of the Earth, therefore we refine the polyhedron two times by the dual 1-to-3 refinement and then unfold the polyhedron. This way, we have a finer initial representation for the Earth and a coordinate system for hexagons aligned with that of the diamonds. FIG. 41 illustrates unfolded polyhedra after two refinements by the dual 1-to-3 method. Diamonds creating a polyhedron are distinguished by numbers (FIG. 41). A hexagon which falls in diamond d with index $(a,b)_r$ gets index $[d,(a,b)_r]$.

FIG. 41 shows unfolded patterns of the icosahedron (a), octahedron (b) and tetrahedron (c). Red coordinate axes U-V determine the coordinate systems of each diamond. (d) shows hexagon $(a,b)_r$ and its neighborhood vectors based on the illustrated U-V coordinate system.

From the index of a hexagon, we find its neighbors using neighborhood vectors. Neighborhood vectors are added to the index of a hexagon and the result is the indices of its neighbors. FIG. 41 (d) illustrates the neighborhood vectors. Some hexagons exist whose neighbors are located in multiple diamonds. To find all neighbors of such hexagons, we need to determine hexagons covered by a diamond.

Consider the hexagons in FIG. 41 at the initial resolution, r=0. A hexagon with index $(a,b)_0$ is in diamond d if $0 \le a,b < 3$, $a,b \in N$. This coverage relation can be extended for subsequent resolutions. If the coordinate systems of hexagons at the next resolutions are also aligned with coordinate systems of diamonds, maintaining this coverage relation is just the matter of multiplication. We discussed how to obtain aligned coordinate systems in the previous section for each refinement. Coverage relations can be extended for any resolution as shown in Table 2. Note that the initial coverage of diamonds for a tetrahedron is different as illustrated in FIG. 41 (b). In a tetrahedron, diamond 1 covers hexagons with index (a,b)$_0$ if 0≤a,b≤3, a,b∈N while diamond 2 covers hexagons (a,b)$_r$ when 0<b<3 and 0≤a<3. Despite this difference, we can extend these relations based on the refinements similar to Table 2.

TABLE 2

Type of refinements and their effects on the coverage relation of a diamond. Note that in 1-to-7 refinements, $R_+$ and $R_-$ are used alternating.

| Type | Constraint | Including Conditions |
|---|---|---|
| D/P 1-to-4 | N/A | $0 \leq a, b < 3 \times 2^r$ |
| D/P 1-to-7 | $\lfloor \frac{r}{2} \rfloor = \frac{r}{2}$ | $0 \leq a, b < 3 \times 7^r$ |
| D/P 1-to-3 | $\lfloor \frac{r}{2} \rfloor = \frac{r}{2}$ | $0 \leq a, b < 3^{r+1}$ |

Except for 1-to-4 refinement, the coordinate system of diamonds is not aligned with coordinate system of hexagons at odd resolutions. In this case, to detect hexagons covered by a diamond, indices of hexagons are mapped to the coarser even resolution by $R_{e \to o}^{-1}$. Then, the resulting index is checked based on the rules of Table 2 to detect whether it is covered by the diamond.

Figure 42:
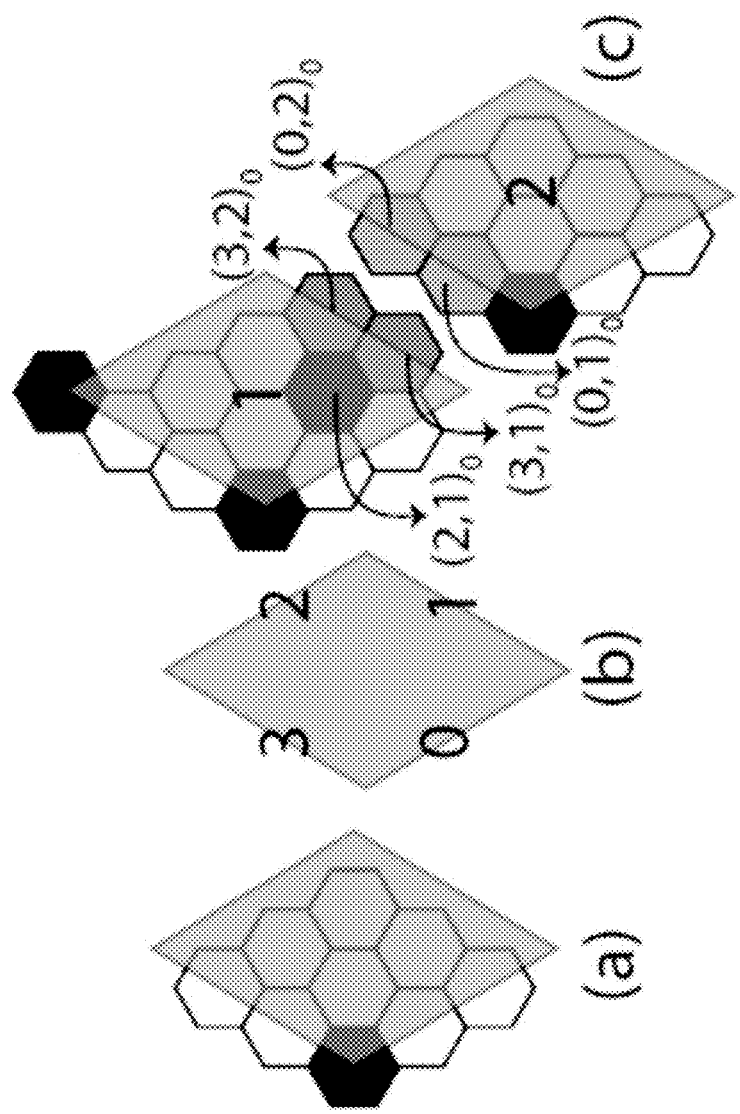
FIG. 42 is a schematic diagram that (a) shows hexagons assigned to a diamond of an icosahedron or octahedron, (b) shows encoding edges of a diamond, and (c) shows finding the hexagons that are out of diamond 1. Neighbors of red hexagon $(2,1)_0$ is desired.

If one of the neighbors of hexagon [d,(a,b)$_r$] is not covered by d, it is located in a diamond connecting to d. For example, consider [1,(2,1)$_0$] in an icosahedron. If we add neighborhood vectors to (2,1)$_0$, its two neighbors (3,2)$_0$ and (3,1)$_0$ exist outside of diamond 1 (based on Table 2). To determine the diamonds' neighbors, we form a look-up table in which edges of diamonds are associated with their neighbors. We encode edges of a diamond using four numbers from 0 to 3 as illustrated in FIG. 42. Both (3,1)$_0$ and (3,2)$_0$ are located on edge 1 in diamond 1. In the look-up table, we have that diamond 1 at edge 1 is connected to diamond 2 at edge 3. From this information, we can map (3,1)$_0$ and (3,2)$_0$ in diamond 1 to (0,1)$_0$ and (0,2)$_0$ in diamond 2.

Note that non-hexagonal faces are also placed at computable locations. For instance, pentagons are located at (0,0)$_r$ in all diamonds of an icosahedron except diamonds 1 and 10 in which (0,max) is also pentagon. Note that the value of max can be obtained using Table 2. For instance, max=3×2$^r$ in D/P 1-to-4 refinement. To find the neighbors of non-hexagonal faces, we treat them like hexagons adding neighborhood vectors to the indices. Of the six neighbors generated for this non-hexagonal face, there will be a repetition of neighbors. We discard such duplicates.

In FIG. 42, (a) shows hexagons assigned to a diamond of an icosahedron or octahedron, (b) shows encoding edges of a diamond, (c) shows finding the hexagons that are out of diamond 1. Neighbors of red hexagon (2,1)$_0$ is desired. Blue hexagons (3,2)$_0$ and (3,1)$_0$ are obtained by adding neighborhood vectors to (2,1)$_0$ (red hexagon). Blue hexagons (3,2)$_0$ and (3,1)$_0$ are out of diamond 1. Blue hexagons (3,2)$_0$ and (3,1)$_0$ are mapped to valid green hexagons (0,1)$_0$ and (0,2)$_0$ of diamond 2.

While the above description provides examples of one or more apparatus, systems and methods, it will be appreciated that other apparatus, systems and methods may be within the scope of the present description as interpreted by one of skill in the art.

We claim:

1. A digital Earth information system based upon hexagonal subdivision of a polyhedron representation of the Earth comprising:
   (a) a data storage device;
   (b) at least one processor coupled to the data storage device, the processor being configured to:
      (i) define a hierarchical series of additional tessellations of successive resolutions, each resolution indicative of an area of each cell in the tessellation of the resolution, each tessellation having a first axis and a second axis, the first axis being perpendicular to a first side of the hexagonal cells, the second axis being 120 degrees from the first axis and being perpendicular to a second side of the hexagonal cells,
      (ii) select an origin cell for each of the additional tessellations, the origin cell having a same centroid as the origin cell in a tessellation of a previous resolution,
      (iii) assign a unique identifier to each of the origin cells, the unique identifier for each of these cells comprising the identifier for the origin cell in the tessellation of the previous resolution and a resolution value indicative of the resolution of each origin cell,
      (iv) assign a unique identifier to each cell other than the origin cell, the unique identifier for each of these cells comprising a first vector value, a second vector value, and a resolution value, the first vector value and the second vector value being indicative of the location of the cell relative to the origin cell in the same tessellation along the first and second axis respectively, and the resolution value being indicative of the resolution of the cell,
      (v) store the unique identifiers for the cells in the data storage device, and
      (vi) store data related to a geographical location on Earth in association with the cell associated with the same geographical location in the data storage device.

2. The digital Earth information system of claim 1, wherein the processor is further configured to, for a given cell, determine the assigned unique identifier of a neighbour cell of the given cell by adding six neighbour vectors of the tessellation of the given cell, the given cell comprising either an origin cell or a cell other than an origin cell.

* * * * *